US012333462B2

(12) United States Patent
Nair et al.

(10) Patent No.: US 12,333,462 B2
(45) Date of Patent: *Jun. 17, 2025

(54) CLOUD-BASED FLEET AND ASSET MANAGEMENT FOR EDGE COMPUTING OF MACHINE LEARNING AND ARTIFICIAL INTELLIGENCE WORKLOADS

(71) Applicant: Armada Systems Inc., Greebrae, CA (US)

(72) Inventors: Pradeep Nair, Greebrae, CA (US); Pragyana K Mishra, Seattle, WA (US); Anish Swaminathan, Greebrae, CA (US); Janardhan Prabhakara, Greebrae, CA (US)

(73) Assignee: Armada Systems Inc., Greebrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,208

(22) Filed: Apr. 3, 2024

(65) Prior Publication Data

US 2025/0077992 A1    Mar. 6, 2025

Related U.S. Application Data

(63) Continuation of application No. 18/461,470, filed on Sep. 5, 2023, now Pat. No. 12,014,219.

(51) Int. Cl.
*G06Q 10/0631* (2023.01)
*G06N 20/00* (2019.01)

(52) U.S. Cl.
CPC ....... *G06Q 10/06311* (2013.01); *G06N 20/00* (2019.01)

(58) Field of Classification Search
CPC .................. G06Q 10/06311; G06N 20/00
See application file for complete search history.

(56) References Cited

U.S. PATENT DOCUMENTS

| 11,145,208 | B1 | 10/2021 | Nanda et al. |
| 11,201,939 | B1 | 12/2021 | Mokashi et al. |
| 11,238,849 | B1 | 2/2022 | Mimassi |

(Continued)

OTHER PUBLICATIONS

Abbas, Khizar, et al. "Network slice lifesycle management for 5g mobile networks: An intent-based networking approach." IEEE Access 9: 80128-80146. (Year: 2021).

(Continued)

*Primary Examiner* — Eric C Wai
(74) *Attorney, Agent, or Firm* — Polsinelli PC

(57) ABSTRACT

A method can include receiving monitoring information associated with a machine learning (ML) or artificial intelligence (AI) workload implemented by an edge compute unit of a plurality of edge compute units. Status information corresponding to a plurality of connected edge assets can be received, the plurality of edge compute units and connected edge assets included in a fleet of edge devices. A remote fleet management graphical user interface (GUI) can display a portion of the monitoring or status information for a subset of the fleet of edge devices, based on a user selection input, and can receive a user configuration input indicative of an updated configuration associated with at least one edge compute unit of the fleet. A cloud computing environment can transmit control information corresponding to the updated configuration to the at least one edge compute unit.

20 Claims, 10 Drawing Sheets

(56) References Cited

U.S. PATENT DOCUMENTS

| | | |
|---|---|---|
| 11,405,801 B1 | 8/2022 | Qureshi et al. |
| 11,410,423 B1 | 8/2022 | Naslavsky et al. |
| 11,695,632 B1 | 7/2023 | Zoualfaghari et al. |
| 11,741,760 B1 | 8/2023 | Dubin et al. |
| 11,876,858 B1 | 1/2024 | Nair et al. |
| 11,907,093 B1 | 2/2024 | Nair et al. |
| 2005/0156715 A1 | 7/2005 | Zou et al. |
| 2009/0079555 A1 | 3/2009 | Aguirre De Carcer et al. |
| 2009/0249215 A1 | 10/2009 | Paek |
| 2012/0123951 A1 | 5/2012 | Hyatt et al. |
| 2015/0120749 A1 | 4/2015 | Phanishayee et al. |
| 2016/0093119 A1 | 3/2016 | Ahn et al. |
| 2016/0117059 A1 | 4/2016 | Folken et al. |
| 2017/0285623 A1 | 10/2017 | Figoli et al. |
| 2018/0025304 A1 | 1/2018 | Fisher et al. |
| 2018/0032915 A1 | 2/2018 | Nagaraju et al. |
| 2018/0082152 A1 | 3/2018 | Katz et al. |
| 2018/0341720 A1 | 11/2018 | Bhatia et al. |
| 2019/0156246 A1 | 5/2019 | Kuo et al. |
| 2019/0212754 A1 | 7/2019 | Smith |
| 2019/0258747 A1 | 8/2019 | Milev |
| 2019/0370686 A1 | 12/2019 | Pezzillo et al. |
| 2020/0027033 A1 | 1/2020 | Garg et al. |
| 2020/0112612 A1 | 4/2020 | Chandaria |
| 2020/0136994 A1 | 4/2020 | Doshi et al. |
| 2020/0153623 A1 | 5/2020 | Asanghanwa et al. |
| 2020/0160207 A1 | 5/2020 | Song et al. |
| 2020/0267053 A1 | 8/2020 | Zheng et al. |
| 2020/0286020 A1 | 9/2020 | Kobayashi et al. |
| 2020/0349852 A1 | 11/2020 | DiCosola |
| 2020/0374974 A1 | 11/2020 | Sun et al. |
| 2020/0379805 A1 | 12/2020 | Porter et al. |
| 2020/0401891 A1 | 12/2020 | Xu et al. |
| 2021/0108937 A1 | 4/2021 | Fox et al. |
| 2021/0112441 A1 | 4/2021 | Sabella et al. |
| 2021/0117859 A1 | 4/2021 | Rogers et al. |
| 2021/0136869 A1 | 5/2021 | Radmand et al. |
| 2021/0243232 A1 | 8/2021 | Verma et al. |
| 2021/0266225 A1 | 8/2021 | Kozhaya et al. |
| 2021/0304418 A1 | 9/2021 | Soon-Shiong |
| 2021/0360070 A1 | 11/2021 | Cella et al. |
| 2021/0392049 A1 | 12/2021 | Jeuk et al. |
| 2022/0015269 A1 | 1/2022 | Xu et al. |
| 2022/0019422 A1 | 1/2022 | Anderson |
| 2022/0035878 A1 | 2/2022 | Sarah et al. |
| 2022/0060455 A1 | 2/2022 | Rosenstein et al. |
| 2022/0121556 A1 | 4/2022 | Guim Bernat et al. |
| 2022/0150125 A1 | 5/2022 | Kumar et al. |
| 2022/0197304 A1 | 6/2022 | Cochran et al. |
| 2022/0345518 A1 | 10/2022 | Sgobba et al. |
| 2022/0353732 A1 | 11/2022 | Filippou et al. |
| 2022/0360957 A1 | 11/2022 | Seawall et al. |
| 2022/0383859 A1 | 12/2022 | Mimassi |
| 2022/0405157 A1 | 12/2022 | Bender |
| 2022/0410750 A1 | 12/2022 | Mangal et al. |
| 2023/0021216 A1 | 1/2023 | Shilawat et al. |
| 2023/0028338 A1 | 1/2023 | Samuelsson et al. |
| 2023/0044620 A1 | 2/2023 | Shochat et al. |
| 2023/0064472 A1 | 3/2023 | Endel et al. |
| 2023/0066765 A1 | 3/2023 | Thomas et al. |
| 2023/0101308 A1 | 3/2023 | Amano |
| 2023/0141055 A1 | 5/2023 | Kim et al. |
| 2023/0147814 A1 | 5/2023 | Carver et al. |
| 2023/0164033 A1 | 5/2023 | Lee et al. |
| 2023/0171235 A1 | 6/2023 | Chhibber et al. |
| 2023/0205606 A1 | 6/2023 | Palermo et al. |
| 2023/0205994 A1 | 6/2023 | Wei et al. |
| 2023/0244470 A1 | 8/2023 | Shimon et al. |
| 2023/0280059 A1 | 9/2023 | Khan et al. |
| 2023/0300195 A1 | 9/2023 | Sharma et al. |
| 2023/0316927 A1 | 10/2023 | Kumavat et al. |
| 2023/0325725 A1 | 10/2023 | Lester et al. |
| 2023/0359600 A1 | 11/2023 | Donthireddy et al. |
| 2023/0360679 A1 | 11/2023 | Sharma et al. |
| 2023/0368281 A1 | 11/2023 | Kobel et al. |
| 2023/0368637 A1 | 11/2023 | Ngala-Ngala et al. |

OTHER PUBLICATIONS

Hsu, Tz-Heng, Zhi-Hao Wang, & Aaron Raymond See, "A cloud-edge-smart IoT architecture for speeding up the deployment of neural network models wih transfer learning techniques." Electronics 11.14: 2255. (Year: 2002).

Huang, Lei, "Armada: A Robust Latency-Sensitive Edge Cloud in Heterogeneous Edge-Dense Environments" Jul. 2021.

Huang, Lei, "Armada: A Robust Latency-Sensitive Edge Cloud in Heterogeneous Edge-Dense Environments" Nov. 23, 2021.

Sharma, Divyasheel, et al. "Enabling Inference and Training of Deep Learning Models for AI Applications on IoT Edge Devices", Atrificial Intelligence-based Internet of THings Systems: 267-283. (Year: 2022).

Wang, Hao, et al.; "Optimizing federated learning on non-iid data with reinforcement learning." IEEE INFOCOM 2020—IEEE Conference in Computer Communications. IEEE (Year: 2020)v.

Wang, Nan, et al., "ENORM: A framework for edge node resource management." IEEE transactions on services computing 13.6: 1086-1099. (Year: 2017).

Xu, Wenyuan, et al. "Accelerating federated learning for Iot iot in big data analytics with pruning, quantization and elective updating." IEEE Access 9: 38457-38466. (Year: 2021).

Huang, Lei, et al. "Towards Elasticity in Heterogeneours Edge-dense Environemtns." 2022 IEEE 42nd International Conference on Distributed Computing Systems (ICDCS). IEEE. (Year: 2022).

CLOUD-BASED FLEET AND ASSET MANAGEMENT FOR EDGE COMPUTING OF MACHINE LEARNING AND ARTIFICIAL INTELLIGENCE WORKLOADS

CROSS REFERENCE TO RELATED APPLICATIONS

This application is a continuation of U.S. application Ser. No. 18/461,470, filed Sep. 5, 2023, which is hereby incorporated by reference, in its entirety and for all purposes.

TECHNICAL FIELD

The present disclosure pertains to edge computing, and more specifically pertains to systems and techniques for high-performance edge computing and management thereof.

BACKGROUND

Edge computing is a distributed computing paradigm that can be used to decentralize data processing and other computational operations by bringing compute capability and data storage closer to the edge (e.g., the location where the compute and/or data storage is needed, often at the "edge" of a network such as the internet). Edge computing systems are often provided in the same location where input data is generated and/or in the same location where an output result of the computational operations is needed. The use of edge computing systems can reduce latency and bandwidth usage, as data is ingested and processed locally at the edge and rather than being transmitted to a more centralized location for processing.

In many existing cloud computing architectures, data generated at endpoints (e.g., mobile devices, Internet of Things (IoT) sensors, robots, industrial automation systems, security cameras, etc., among various other edge devices and sensors) is transmitted to centralized data centers for processing. The processed results are then transmitted from the centralized data centers to the endpoints requesting the processed results. The centralized processing approach may present challenges for growing use cases, such as for real-time applications and/or artificial intelligence (AI) and machine learning (ML) workloads. For instance, centralized processing models and conventional cloud computing architectures can face constraints in the areas of latency, availability, bandwidth usage, data privacy, network security, and the capacity to process large volumes of data in a timely manner.

In the context of edge computing, the "edge" refers to the edge of the network, close to the endpoint devices and the sources of data. In an edge computing architecture, computation and data storage are distributed across a network of edge nodes that are near the endpoint devices and sources of data. The edge nodes can be configured to perform various tasks relating to data processing, storage, analysis, etc. Based on using the edge nodes to process data locally, the amount of data that is transferred from the edge to the cloud (or other centralized data center) can be significantly reduced. Accordingly, the use of edge computing has become increasingly popular for implementing a diverse range of AI and ML applications, as well as for serving other use cases that demand real-time processing, minimal latency, high availability, and high reliability. In general, such applications and use cases may rely on high-bandwidth sensors that have the ability to generate data at massive rates (e.g., on the order of 50 Gbit/sec or 22 TB/hr).

BRIEF SUMMARY

In some examples, systems and techniques are described for implementing fleet management (e.g., a fleet of edge compute units) and/or asset management (e.g., connected sensors and other assets at the edge) for high-performance edge computing, including edge computing for machine learning (ML) and/or artificial intelligence (AI) deployments and/or workloads.

According to at least one illustrative example, a method is provided, the method including: receiving monitoring information from each respective edge compute unit of a plurality of edge compute units, wherein the monitoring information includes information associated with one or more machine learning (ML) or artificial intelligence (AI) workloads implemented by the respective edge compute unit; receiving respective status information corresponding to a plurality of connected edge assets, wherein each connected edge asset is associated with one or more edge compute units of the plurality of edge compute units, and wherein the plurality of edge compute units and the plurality of connected edge assets are included in a fleet of edge devices; displaying, using a remote fleet management graphical user interface (GUI), at least a portion of the monitoring information or the status information corresponding to a selected subset of the fleet of edge devices, wherein the selected subset is determined based on one or more user selection inputs to the remote fleet management GUI; receiving, using the remote fleet management GUI, one or more user configuration inputs indicative of an updated configuration associated with at least one edge compute unit of the selected subset of the fleet of edge devices; and transmitting, from a cloud computing environment associated with the remote fleet management GUI, control information corresponding to the updated configuration, wherein the control information is transmitted to the at least one edge compute unit of the selected subset.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), robotic system (e.g., autonomous passenger vehicle, unmanned aircraft system (UAS), uncrewed ground vehicle (UGV), mobile robotic platform, uncrewed submersible, biped or multi-legged robot, cobot, industrial automation, articulated arm, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "connected device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

The term "network entity" or "base station" may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of a base station (e.g., satellite constellation ground station/internet gateway) corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Because a TRP is the point from which a base station transmits and receives wireless signals, as used herein, references to transmission from or reception at a base station are to be understood as referring to a particular TRP of the base station.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The use of a same reference numbers in different drawings indicates similar or identical items or features. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
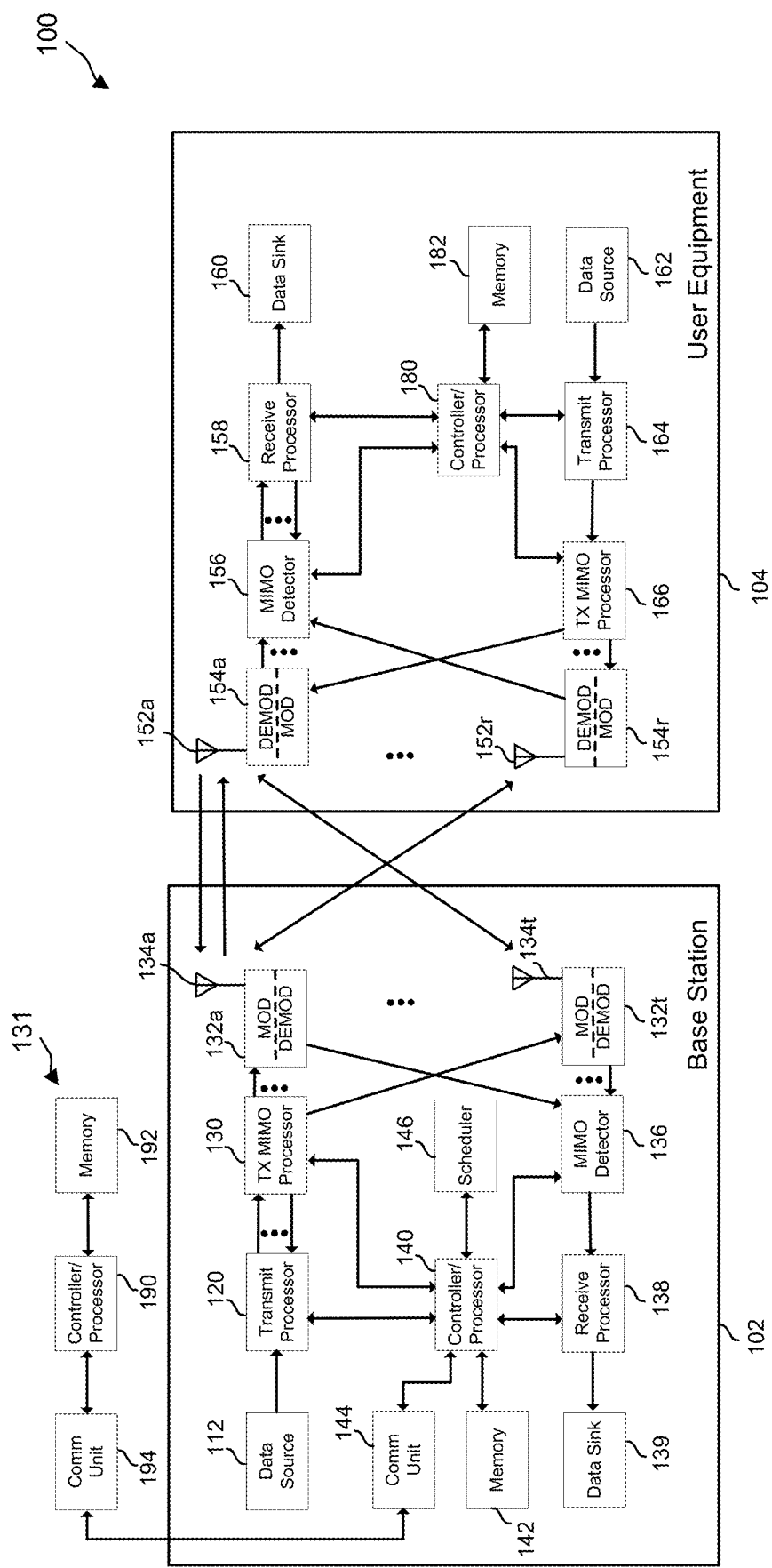
FIG. 1 depicts an example design of a base station and a user equipment (UE) for transmission and processing of signals exchanged between the UE and the base station, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Overview

Systems, apparatuses, methods (also referred to as processes), and computer-readable media (collectively referred to herein as "systems and techniques") are described herein for high-performance edge computing for machine learning (ML) and artificial intelligence (AI) workloads. As used herein, reference to an "ML workload" includes both workloads implemented using a trained machine learning model and workloads implemented using a trained artificial intelligence model. Similarly, reference to an "AI workload" includes both workloads implemented using a trained artificial intelligence model and workloads implemented using a trained machine learning model.

In some aspects, one or more edge compute units (also referred to as a "fleet" of edge compute units) can be used to implement high-performance edge computing for ML and AI workloads. The edge compute unit can include modular and/or configurable compute hardware units (e.g., CPUs, GPUs, TPUs, NPUs, accelerators, memory, storage, etc.) for running the trained ML or AI models. In some cases, the edge compute unit can be a data center unit that is deployable to the edge. An edge compute unit (e.g., containerized data center or containerized compute unit) can be configured according to an intended use case and/or according to one or more deployment site location characteristics. For example, the edge compute unit can be a containerized data center having various hardware configurations (e.g., CPU-centric or GPU-centric compute hardware configuration; urban location or remote location configuration; private electrical/data network or utility electrical/data network connectivity configuration; etc.).

The containerized edge compute unit can be deployed to a user-determined (e.g., enterprise-determined) site location. The enterprise site location may have varying levels of existing infrastructure availability, based upon which the containerized edge compute unit can be correspondingly configured. For example, the containerized edge compute unit can be configured based at least in part on the electrical infrastructure and data connectivity infrastructure availability at the enterprise site location. The containerized edge compute unit can be pre-configured (at the time of deployment to the enterprise site location) with hardware infrastructure, data connectivity, and critical environmental systems fully or partially integrated.

In one illustrative example, the containerized edge compute unit can be pre-configured (e.g., pre-loaded) with a fleet management, knowledge bases, predetermined datasets and trained ML/AI models and application software stack for edge computing AI and ML workloads, such as the fleet management and application software stack that is the subject of this disclosure and will be described in greater depth below.

Figure 5:
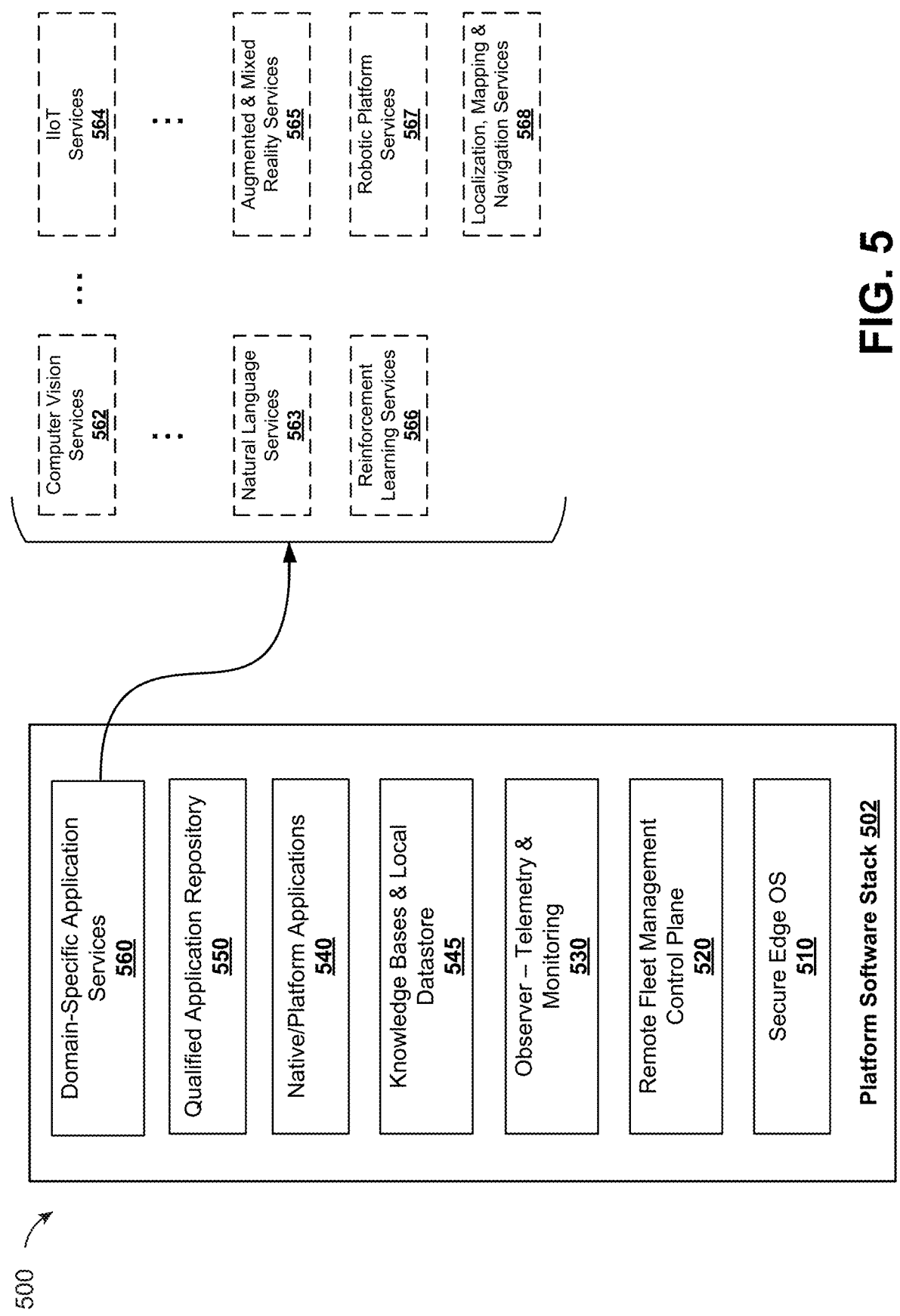
FIG. 5 is a diagram illustrating an example software stack associated with implementing an edge computing system for ML and/or AI workloads, in accordance with some examples.
Figure 6:
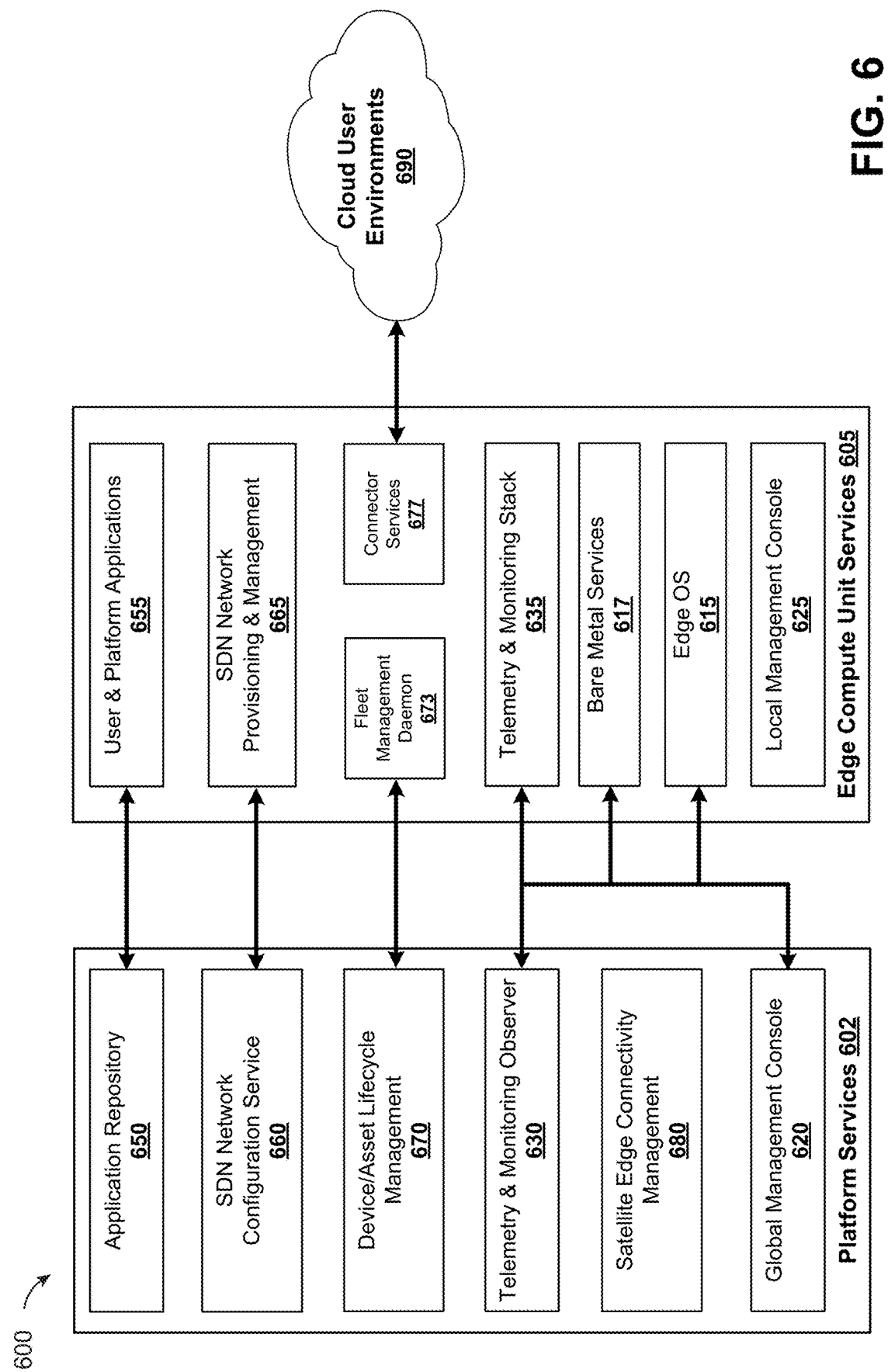
FIG. 6 is a diagram illustrating an example architecture for implementing global services and edge compute services of an edge computing system for ML and/or AI workloads, in accordance with some examples.
Figure 7:
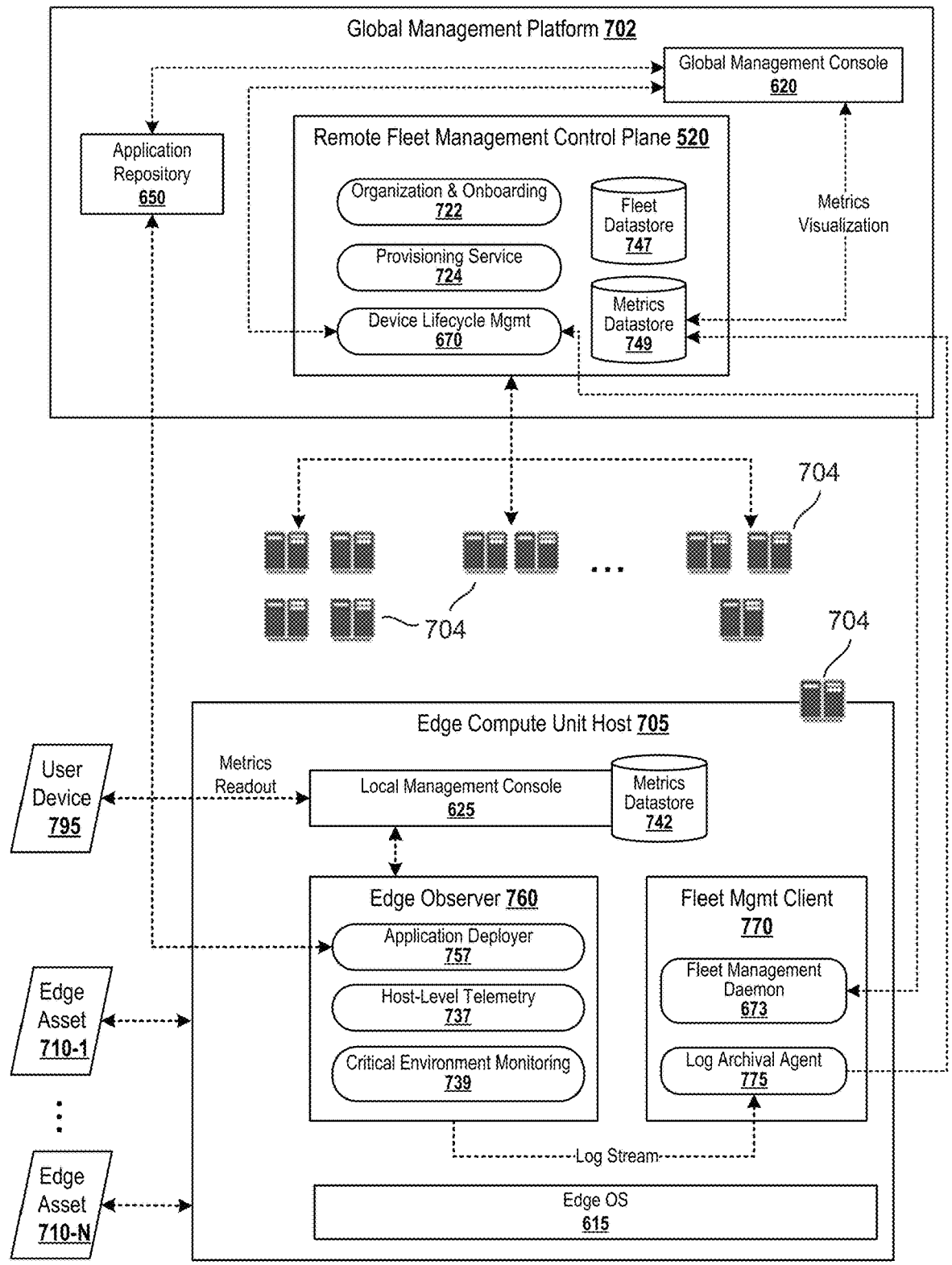
FIG. 7 is a diagram illustrating an example infrastructure and architecture for implementing an edge compute unit of an edge computing system for ML and/or AI workloads, in accordance with some examples.

The presently disclosed fleet management and application software stack is also referred to herein as an "edge ML/AI platform" or an "edge ML/AI management system." In some embodiments, the edge ML/AI platform can include at least a remote fleet management engine, a telemetry and monitoring observation engine, a platform application orchestration engine, and a deployable application repository, each of which are described in greater detail with respect to the figures, and with particular reference to the examples of FIGS. 5-7.

In one illustrative example, the remote fleet management (e.g., command) engine, telemetry and monitoring (e.g., observation) engine, platform application orchestration engine, and deployable application repository can be implemented using a single, global management console of the presently disclosed edge ML/AI platform. For instance, the global management console can be configured to provide a single pane of glass interface that provides a unified data presentation view and bidirectional interaction across the various sources and constituent engines included in or otherwise associated with the presently disclosed edge ML/AI platform. As used herein, the global management "console" can also be referred to as a global management "portal." Further details of the global management console are described below with respect to the figures, and with particular reference to the examples of FIGS. 8 and 9.

In some embodiments, the presently disclosed edge ML/AI platform can be used to implement a connected edge and cloud for ML and AI workloads. For instance, many ML and AI workloads, applications, and/or models are data-intensive and benefit from continual (or relatively frequent) retraining to account for data drift and model degradation. In some cases, the ML and AI workloads may require monitoring of model degradation in conjunction with regular training (e.g., retraining, fine tuning, instruction tuning, continual learning, etc.) with new data, model parameters, model hyperparameters, etc., as appropriate. In one illustrative example, the systems and techniques described herein can be used to provide an edge ML/AI monitoring and management platform configured to provide streamlined and efficient operations for deploying, maintaining, and updating ML and AI workloads or models to the edge.

As described in greater detail herein, the edge ML/AI monitoring and management platform can be implemented for a fleet of edge compute units (e.g., the containerized edge compute units described above) and a plurality of connected sensors and/or edge assets associated with at least one edge compute unit of the fleet. The containerized edge compute units of the fleet can be used to provide local (e.g., edge) storage, inference, prediction, response, etc. using trained ML and/or AI models from a centralized or cloud distribution source, where the trained models are trained or fine-tuned remotely from the edge compute unit. For instance, the edge ML/AI monitoring and management platform can be used to implement or otherwise interface to ML/AI training clusters running in the cloud. The edge compute units can subsequently run or implement their respective trained models locally (e.g., onboard the edge compute unit), using as input the data obtained from local sensors or other endpoint assets associated with the edge compute unit.

In some embodiments, the edge ML/AI monitoring and management platform can be used to implement and/or orchestrate a hub-and-spoke architecture for efficient ML/AI inferencing at the edge. For instance, ML and AI model training often necessitates massive amounts of data and processing power, with the resultant trained model quality being highly correlated with the size and diversity of the training and test data. Training large models can require running thousands of GPUs and ingesting hundreds of terabytes of data, over the course of several weeks. Accordingly, large-scale ML and AI model training may be better suited for deployment on cloud and/or on-premises infrastructure (e.g., centralized large-scale compute infrastructure). By comparison, ML and AI inferencing (e.g., performing inference using a trained ML or AI model) utilizes a relatively smaller amount of compute resources (e.g., CPU, GPU, memory, etc.) and can be performed efficiently at the edge—which often is also the location where the input data for the ML or AI inferencing originates and is collected. Accordingly, performing inference at the edge provides the benefit of better latency (e.g., lower latency, higher frame rate, lower response time, larger sampling frequency), as the input data does not need to first transit over to a cloud region prior to inference. In some aspects, trained ML or AI models (generated in the cloud or on-premises) can be optimized and compressed significantly prior to delivery or distribution to some (or all) of the edge locations, ultimately enabling the trained model to be distributed to a greater quantity and range of edge locations, and in a more efficient manner.

In one illustrative example, the systems and techniques described herein can be used to implement a hub-and-spoke architecture for efficient ML/AI inferencing at the edge, based on training (or retraining/finetuning) performed at a centralized cloud or on-premises location. The hub-and-spoke architecture can be orchestrated and managed using the presently disclosed edge ML/AI monitoring and management platform. In some embodiments, a continuous feedback loop can be used to capture data locally (e.g., at the containerized edge compute units managed by the edge ML/AI monitoring and management platform), perform inference, and respond locally. In some aspects, inference results and/or features from the source data can be compressed and transmitted from the edge to the ML/AI monitoring platform. For instance, the containerized edge compute units can be used to compress and transmit inference results and/or source data features back to the presently disclosed ML/AI monitoring platform (and/or other centralized management location). Training and finetuning can be performed in the cloud or using a centralized on-premises infrastructure, in both cases with training or finetuning operations mediated and managed by the edge ML/AI monitoring platform. The edge ML/AI monitoring platform can subsequently transmit or otherwise distribute the new or updated ML and AI models back to the edge (e.g., back to some or all of the edge compute units included in a fleet of edge compute units managed by the presently disclosed edge ML/AI monitoring and management platform). In some aspects, the edge ML/AI monitoring and management platform can be configured to optimize the usage of cloud, edge, and bandwidth resources for performing ML and/or AI workloads at the edge. The edge ML/AI monitoring and management platform can be further configured to ensure privacy and security of data generated at the edge (e.g., financial records and transactions, personal identifiable information, protected health information, proprietary images and videos, etc.).

Further details regarding the systems and techniques described herein will be discussed below with respect to the figures.

FIG. 1 shows a block diagram of a design of a base station 102 and a UE 104 that enable transmission and processing of signals exchanged between the UE and the base station, in accordance with some aspects of the present disclosure. Design 100 includes components of a base station 102 and a UE 104. In some examples, the architecture of base station 102 can be the same as or similar to an architecture used to implement a satellite constellation ground station (e.g., internet gateway for providing internet connectivity via a satellite constellation). In some examples, the architecture of base station 102 can be the same as or similar to an architecture used to implement a satellite of a satellite constellation and/or a network entity in communication with a satellite constellation (e.g., such as the satellite constellations and/or networks depicted in FIGS. 2 and 3).

As illustrated in FIG. 1, base station 102 may be equipped with T antennas 134a through 134t, and UE 104 may be equipped with R antennas 152a through 152r, where in general T≥1 and R≥1. At base station 102, a transmit processor 120 may receive data from a data source 112 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 120 may also process system information (e.g., for semi-static resource partitioning information (SRPI) and/or the like) and control information (e.g., CQI requests, grants, upper layer signaling, and/or the like) and provide overhead symbols and control symbols. Transmit processor 120 may also generate reference symbols for reference signals (e.g., the cell-specific reference signal (CRS)) and synchronization signals (e.g., the primary synchronization signal (PSS) and secondary synchronization signal (SSS))). A transmit (TX) multiple-input multiple-output (MIMO) processor 130 may perform spatial processing (e.g., precoding) on the data symbols, the control symbols, the overhead symbols, and/or the reference symbols, if applicable, and may provide T output symbol streams to T modulators (MODs) 132a through 132t. The modulators 132a through 132t are shown as a combined modulator-demodulator (MOD-DEMOD). In some cases, the modulators and demodulators can be separate components. Each modulator of the modulators 132a to 132t may process a respective output symbol stream, e.g., for an orthogonal frequency-division multiplexing (OFDM) scheme and/or the like, to obtain an output sample stream. Each modulator of the modulators 132a to 132t may further process (e.g., convert to analog, amplify, filter, and upconvert) the output sample stream to obtain a downlink signal. T downlink signals may be transmitted from modulators 132a to 132t via T antennas 134a through 134t, respectively. According to certain aspects described in more detail below, the synchronization signals can be generated with location encoding to convey additional information.

At UE 104, antennas 152a through 152r may receive the downlink signals from base station 102 and/or other base stations and may provide received signals to demodulators (DEMODs) 154a through 154r, respectively. The demodulators 154a through 154r are shown as a combined modulator-demodulator (MOD-DEMOD). In some cases, the modulators and demodulators can be separate components. Each demodulator of the demodulators 154a through 154r may condition (e.g., filter, amplify, downconvert, and digitize) a received signal to obtain input samples. Each demodulator of the demodulators 154a through 154r may further process the input samples (e.g., for OFDM and/or the like) to obtain received symbols. A MIMO detector 156 may obtain received symbols from all R demodulators 154a through 154r, perform MIMO detection on the received symbols if applicable, and provide detected symbols. A receive processor 158 may process (e.g., demodulate and decode) the detected symbols, provide decoded data for UE 104 to a data sink 160, and provide decoded control information and system information to a controller/processor 180. A channel processor may determine reference signal received power (RSRP), received signal strength indicator (RSSI), reference signal received quality (RSRQ), channel quality indicator (CQI), and/or the like.

On the uplink, at UE 104, a transmit processor 164 may receive and process data from a data source 162 and control information (e.g., for reports comprising RSRP, RSSI, RSRQ, CQI, and/or the like) from controller/processor 180. Transmit processor 164 may also generate reference symbols for one or more reference signals (e.g., based at least in part on a beta value or a set of beta values associated with the one or more reference signals). The symbols from transmit processor 164 may be precoded by a TX-MIMO processor 166 if application, further processed by modulators 154a through 154r (e.g., for DFT-s-OFDM, CP-OFDM, and/or the like), and transmitted to base station 102. At base station 102, the uplink signals from UE 104 and other UEs may be received by antennas 134a through 134t, processed by demodulators 132a through 132t, detected by a MIMO detector 136 if applicable, and further processed by a receive processor 138 to obtain decoded data and control information sent by UE 104. Receive processor 138 may provide the decoded data to a data sink 139 and the decoded control information to controller (e.g., processor) 140. Base station 102 may include communication unit 144 and communicate to a network controller 131 via communication unit 144. Network controller 131 may include communication unit 194, controller/processor 190, and memory 192. In some aspects, one or more components of UE 104 may be included in a housing. Memories 142 and 182 may store data and program codes for the base station 102 and the UE 104, respectively. A scheduler 146 may schedule UEs for data transmission on the downlink, uplink, and/or sidelink.

Data Network Connectivity Using Satellite Constellations

As noted previously, low-orbit satellite constellation systems have been rapidly developed and deployed to provide wireless communications and data network connectivity. A fleet of discrete satellites (also referred to as "birds") can be arranged as a global satellite constellation that provides at least periodic or intermittent coverage to a large portion of the Earth's surface. In many cases, at least certain areas of the Earth's service may have continuous or near-continuous coverage from at least one bird of the satellite constellation. For instance, a global satellite constellation can be formed based on a stable (and therefore predictable) space geometric configuration, in which the fleet of birds maintain fixed space-time relationships with one another. A satellite constellation be used to provide data network connectivity to ground-based devices and/or other terrestrial receivers. For example, a satellite constellation can be integrated with or otherwise provide connectivity to one or more terrestrial (e.g., on-ground) data networks, such as the internet, a 4G/LTE network, and/or a 5G/NR network, among various others. In one illustrative example, a satellite internet constellation system can include a plurality of discrete satellites arranged in a low-earth orbit and used to provide data network connectivity to the internet.

To implement an internet satellite constellation, the discrete satellites can be used as space-based communication nodes that couple terrestrial devices to terrestrial internet gateways. The terrestrial internet gateways may also be referred to as ground stations, and are used to provide connectivity to the internet backbone. For instance, a given satellite can provide a first communication link to a terrestrial device and a second communication link to a ground station that is connected to an internet service provider (ISP). The terrestrial device can transmit data and/or data requests to the satellite over the first communication link, with the satellite subsequently forwarding the transmission to the ground station internet gateway (from which point onward the transmission from the device is handled as a normal internet transmission). The terrestrial device can receive data and/or requests using the reverse process, in which the satellite receives a transmission from the ground station internet gateway via the second communication link and then forwards the transmission to the terrestrial device using the first communication link.

Although an internet satellite constellation includes a fleet of discrete satellites, in some cases terrestrial devices connected with a satellite may communicate with a ground station/internet gateway that is also able to communicate with the same satellite. In other words, it is typically the case that the first and second communication links described above must be established with the same satellite of the satellite constellation. A user connecting to any particular satellite is therefore limited by the ground station/internet gateways that are visible to that particular satellite. For instance, a user connected to a satellite that is unable to establish a communication link with a ground station/internet gateway is therefore unable to connect to the internet—although the fleet of satellites is a global network in terms of spatial diversity and arrangement, the individual satellites function as standalone internet relay nodes unless an inter-satellite link capability is provided.

In some cases, inter-satellite links can allow point to point communications between the individual satellites included in a satellite constellation. For instance, data can travel at the speed of light from one satellite to another, resulting in a fully interconnected global mesh network that allows access to the internet as long as the terrestrial device can establish communication with at least one satellite of the satellite internet constellation. In one illustrative example, a satellite internet constellation can implement inter-satellite links as optical communication links. For example, optical space lasers can be used to implement optical intersatellite links (ISLs) between some (or all) of the individual birds of a satellite constellation. In this manner, the satellite internet constellation can be used to transmit data without the use of local ground stations, and may be seen to provide truly global coverage.

For instance, optical laser links between individual satellites in a satellite constellation can reduce long-distance latency by as much as 50%. Additionally, optical laser links (e.g., ISLs) can enable the more efficient sharing of capacity by utilizing the otherwise wasted satellite capacity over regions without ground station internet gateways. Moreover, optical laser links allow the satellite constellation to provide internet service (or other data network connectivity) to areas where ground stations are not present and/or are impossible to install.

To implement a satellite constellation, one or more satellites may be integrated with the terrestrial infrastructure of a wireless communication system. In general, satellites may refer to Low Earth Orbit (LEO) devices, Medium Earth Orbit (MEO) devices, Geostationary Earth Orbit (GEO) devices, and/or Highly Elliptical Orbit (HEO) devices. In some aspects, a satellite constellation can be included in or used to implement a non-terrestrial network (NTN). A non-terrestrial network (NTN) may refer to a network, or a segment of a network, that uses an airborne or spaceborne vehicle for transmission. For instance, spaceborne vehicles can refer to various ones of the satellites described above. An airborne vehicle may refer to High Altitude Platforms (HAPs) including Unmanned Aircraft Systems (UAS). An NTN may be configured to help to provide wireless communication in un-served or underserved areas to upgrade the performance of terrestrial networks. For example, a communication satellite (e.g., of a satellite constellation) may provide coverage to a larger geographic region than a terrestrial network base station. The NTN may also reinforce service reliability by providing service continuity for UEs or for moving platforms (e.g., passenger vehicles-aircraft, ships, high speed trains, buses). The NTN may also increase service availability, including critical communications. The NTN may also enable network scalability through the provision of efficient multicast/broadcast resources for data delivery towards the network edges or even directly to the user equipment.

Figure 2:
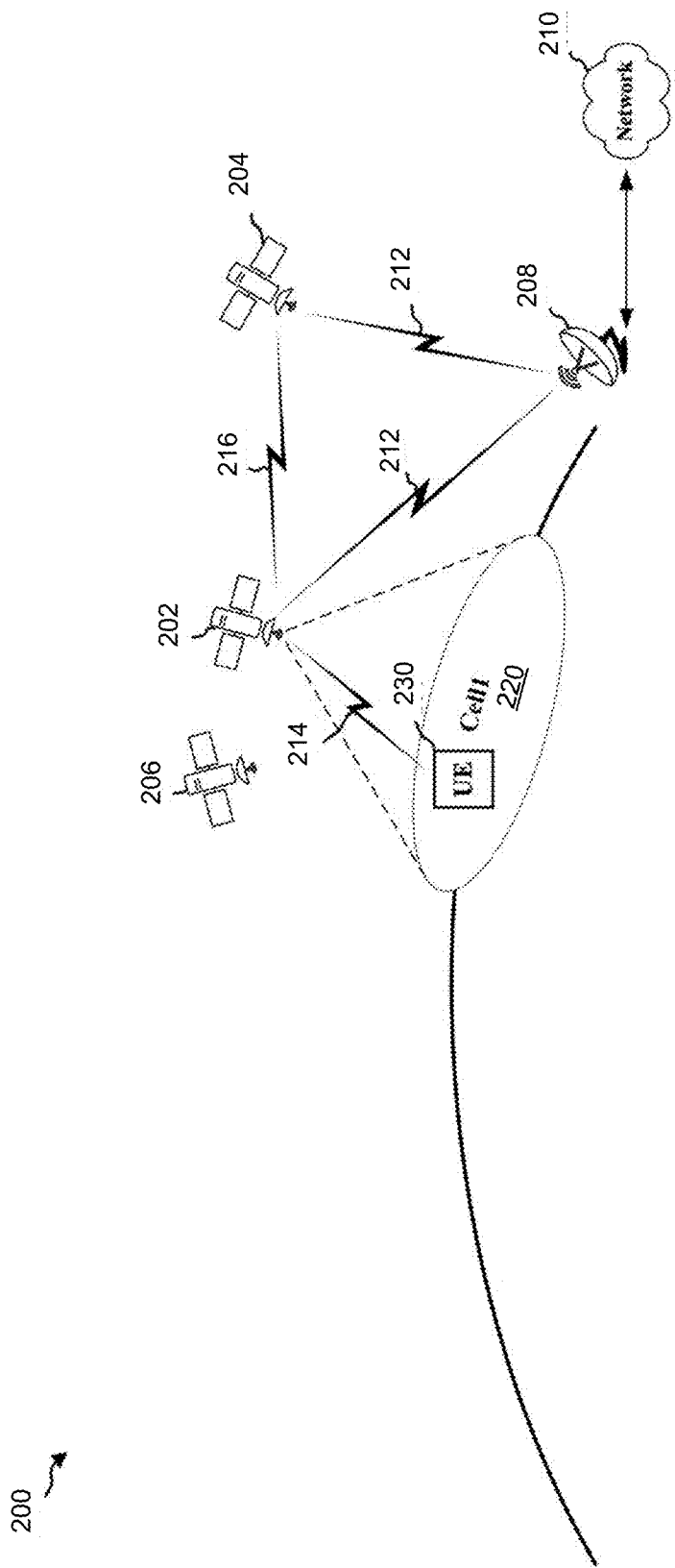
FIG. 2 is a diagram illustrating an example configuration of a Non-Terrestrial Network (NTN) for providing data network connectivity to terrestrial (ground-based) devices, in accordance with some examples.

FIG. 2 is a diagram illustrating an example configuration 200 of an NTN for providing data network connectivity to terrestrial (ground-based) devices. In one illustrative example, the NTN can be a satellite internet constellation, although various other NTNs and/or satellite constellation data network connectivity types may also be utilized without departing from the scope of the present disclosure. As used herein, the terms "NTN" and "satellite constellation" may be used interchangeably.

An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as an LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA) (e.g., in altitudes typically between 8 and 50 km including High Altitude Platforms (HAPs)).

A satellite constellation can include a plurality of satellites, such as the satellites 202, 204, and 206 depicted in FIG. 2. The plurality of satellites can include satellites that are the same as one another and/or can include satellites that are different from one another. A terrestrial gateway 208 can be used to provide data connectivity to a data network 210. For instance, the terrestrial gateway 208 can be a ground station (e.g., internet gateway) for providing data connectivity to the internet. Also depicted in FIG. 2 is a UE 230 located on the surface of the earth, within a cell coverage area of the first satellite 202. In some aspects, the UE 230 can include various devices capable of connecting to the NTN 200 and/or the satellite constellation thereof for wireless communication.

The gateway 208 may be included in one or more terrestrial gateways that are used to connect the NTN 200 and/or satellite constellation thereof to a public data network such as the internet. In some examples, the gateway 208 may support functions to forward a signal from the satellite constellation to a Uu interface, such as an NR-Uu interface. In other examples, the gateway 208 may provide a transport network layer node, and may support various transport protocols, such as those associated with providing an IP router functionality. A satellite radio interface (SRI) may provide IP trunk connections between the gateway 208 and various satellites (e.g., satellites 202-206) to transport NG or F1 interfaces, respectively.

Satellites within the satellite constellation that are within connection range of the gateway 208 (e.g., within line-of-sight of, etc.) may be fed by the gateway 208. The individual satellites of the satellite constellation can be deployed across a satellite-targeted coverage area, which can correspond to regional, continental, or even global coverage. The satellites of the satellite constellation may be served successively by one or more gateways at a time. The NTN 200 associated with the satellite constellation can be configured to provide service and feeder link continuity between the successive serving gateways 208 with time duration to perform mobility anchoring and handover.

In one illustrative example, the first satellite 202 may communicate with the data network 210 (e.g., the internet) through a feeder link 212 established between the first satellite 202 and the gateway 208. The feeder link 212 can be used to provide bidirectional communications between the first satellite 202 and the internet backbone coupled to or otherwise provided by gateway 208. The first satellite 202 can communicate with the UE 230 using a service link 214 established within the cell coverage (e.g., field-of-view) area of an NTN cell 220. The NTN cell 220 corresponds to the first satellite 202. In particular, the first satellite 202 and/or service link 214 can be used to communicate with different devices or UEs that are located within the corresponding NTN cell 220 of first satellite 202.

More generally, a feeder link (such as feeder link 212) may refer to a wireless link between a gateway and a particular satellite of a satellite constellation. A service link (such as service link 214) may refer to a wireless link between a UE and particular satellite of a satellite constellation. In some examples, one or more (or all) of the satellites of a satellite constellation can use one or more directional beams (e.g., beamforming) to communicate with the UE 230 via service link 214 and/or to communicate with the ground station/internet gateway 208 via feeder link 212. For instance, the first satellite 202 may use directional beams (beamforming) to communicate with UE 230 via service link 214 and/or to communicate with gateway 208 via feeder link 212. A beam may refer to a wireless communication beam generated by an antenna on-board a satellite.

In some examples, the UE 230 may communicate with the first satellite 202 via the service link 214, as described above. Rather than the first satellite 202 then using the feeder link 212 to forward the UE communications to internet gateway 208, the first satellite 202 may instead relay the communication to second satellite 204 through an inter-satellite link (ISL) 216. The second satellite 204 can subsequently communicate with the data network 210 (e.g., internet) through a feeder link 212 established between the second satellite 204 and the internet gateway 208. In some aspects, the ISL links can be provided between a constellation of satellites and may involve the use of transparent payloads on-board the satellites. The ISL link may operate in an RF frequency or an optical band. In one illustrative example, the ISL links between satellites of a satellite constellation can be implemented as optical laser links (e.g., using optical space laser transceivers provided on the satellites), as was noted previously above.

In the illustrated example of FIG. 2, the first satellite 202 may provide the NTN cell 220 with a first physical cell ID (PCI). In some examples, a constellation of satellites may provide coverage to the NTN cell 220. For example, the first satellite 202 may include a non-GEO device that does not appear stationary with respect to the Earth. For instance, the first satellite 202 can be a low-earth orbit (LEO) satellite included in a LEO satellite constellation for providing data network connectivity. As such, a satellite constellation (e.g., one or more satellites) may be configured to provide coverage to the NTN cell 220. For example, the first satellite 202, second satellite 204, and third satellite 206 may be part of a satellite constellation that provides coverage to the NTN cell 220.

In some examples, satellite constellation deployment may provide different services based on the type of payload onboard the satellite(s). The type of payload may determine whether the satellite acts as a relay node or a base station. For example, a transparent payload is associated with the satellite acting as a relay node, while a non-transparent payload is associated with the satellite acting as a base station. A transparent payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station (e.g., internet gateway 208) without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

A non-transparent payload may receive UL signals and demodulate or decode the UL signal before generating a DL signal. For instance, the first satellite 202 may receive UL signals from one or more served UEs (e.g., within the cell 220) and subsequently demodulate or decode the UL signals prior to generating one or more corresponding DL signals to the internet gateway 208. Similarly, the first satellite 202 may receive UL signals from the internet gateway 208 and subsequently demodulate or decode the UL signals prior to generating one or more corresponding DL signals to the served UEs within cell 220.

Satellite Internet Constellations

A satellite internet constellation is a fleet of satellite internet constellation satellites (also referred to as "birds") arranged in a low-earth orbit (LEO). Satellite internet constellations can be implemented based on the idea that, with a sufficiently large constellation, at any given time at least one satellite should be sufficiently close to communicate with both a user satellite dish and a satellite dish at an internet gateway. In such implementations, the internet gateway satellite dish is typically located in the same general vicinity (e.g., geographic area) as the user satellite dish because, as noted previously above, the same satellite is used to communicate with both the internet gateway and the user. Based on the same satellite communicating with both the user and the internet gateway, the satellite can be used to route (e.g., relay) internet traffic between the customer and the internet via the internet gateway.

Advantageously, users of such satellite internet constellations can connect to the internet without the requirement of having a physical connection to the internet gateway (although it is noted that the description herein may be applied equally to standalone satellite internet connectivity and/or satellite internet connectivity that is combined with other connectivity means such as WiFi/wireless, cellular, fiber optic and other wired connections, etc.) Satellite internet users are typically connected to an internet gateway via a series of intermediate connections (also referred to as hops). In many cases, the direct physical connections between internet users and internet gateways are provided via internet service providers (ISPs), for example over fiber optic cables or copper lines. Satellite internet constellations (and the associated satellite internet service thereof) can be valuable for users for whom direct physical connections to an internet gateway are unavailable or otherwise prohibitively expensive. For instance, in some cases, users in rural or low density areas may not have access to the internet and/or may not have access to high-speed (e.g., fiber) internet because the cost of a ground-based physical connection to a gateway cannot be amortized over a sufficiently large quantity of users to justify the expense (e.g., as physical internet infrastructure is often built out by ISPs with the expectation of recouping the buildout cost via monthly internet service fees charged to its customers).

Satellite internet constellations and the associated satellite internet service (also referred to as "satellite internet connectivity" or "satellite connectivity") can also be valuable as a backup or secondary communication link. For instance, satellite connectivity can be used to augment communications performed over a direct physical connections such as fiber, with a portion of communications routed over a fiber link and a portion of communications routed over a satellite connectivity link. The satellite connectivity link can be configured as a secondary link, a primary link, etc. The satellite connectivity link can additionally, or alternatively, be configured as a backup link for communications failover or fallback in case of a degradation or other interruption to a primary communication link (e.g., a primary finer link, etc.).

Satellite internet constellations can provide internet access to both users who are adequately served by conventional/existing physical ground-based internet connections and to users who are not adequately served (if served at all) by the existing physical ground-based internet connections. In some cases, geographic considerations beyond population density can also be an impediment to providing ground-based internet connectivity. For instance, island or archipelago geographies may be densely populated but have a landmass that is spread across numerous islands—in this case, it is logistically challenging and financially cumbersome to run fiber connections to all of the islands. Accordingly, geographic considerations can also act as a barrier to using conventional ground-based physical connections between users and internet gateways.

Figure 3:
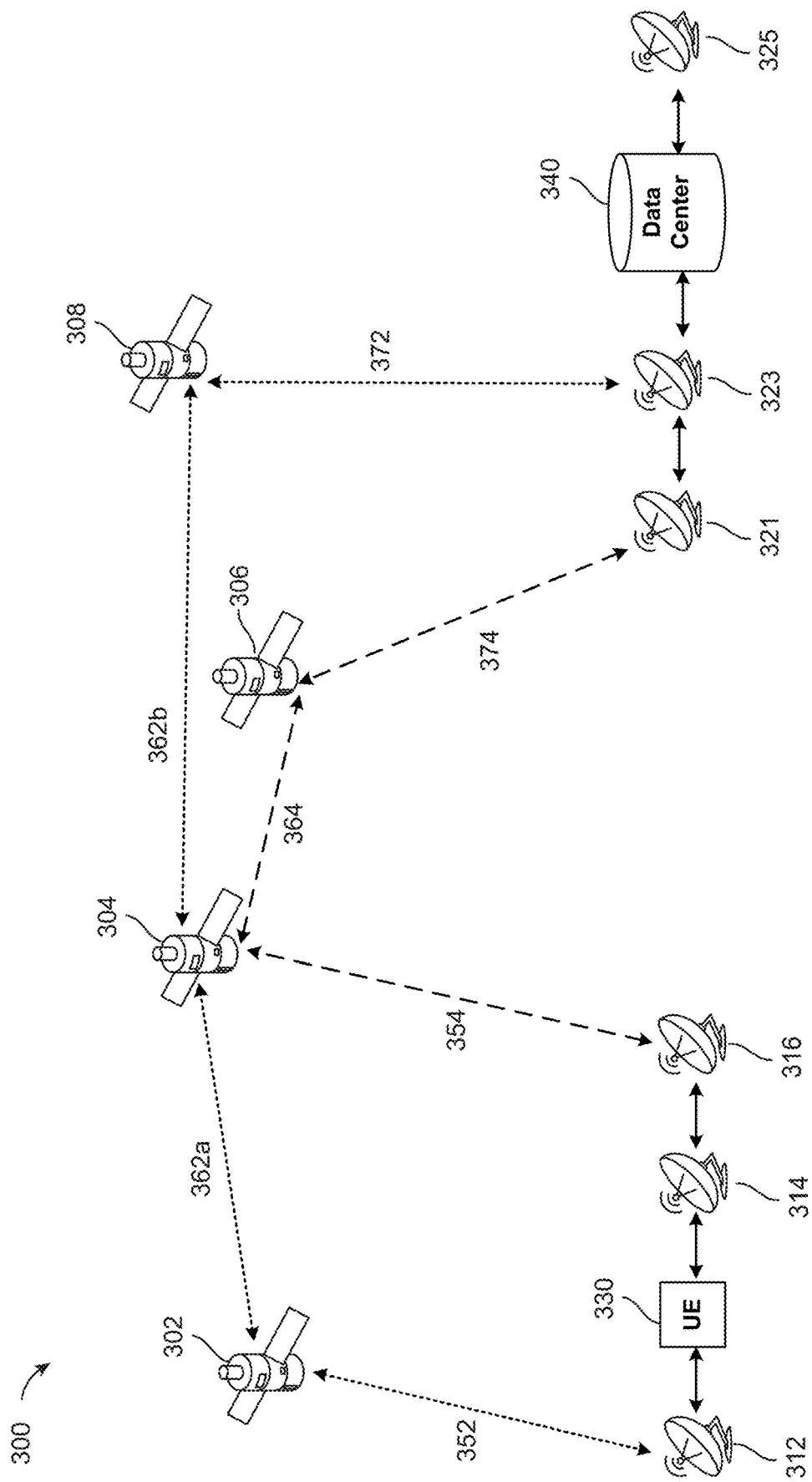
FIG. 3 is a diagram illustrating an example of a satellite internet constellation network that can be used to provide low latency satellite internet connectivity, in accordance with some examples.

FIG. 3 is a diagram illustrating an example of a satellite internet constellation network 300, which in some aspects can be used to provide low latency satellite internet connectivity to a plurality of users. The plurality of users can be associated with a corresponding plurality of UEs, such as the UE 330 depicted in FIG. 3. The UE(s) 330 can include various different computing devices and/or networking devices. In some embodiments, the UEs 330 can include any electronic device capable of connecting to a data network such as the internet.

The UE 330 can be associated with a plurality of client-side satellite internet constellation dishes, shown here as the satellite dishes 312, 314, and 316, although it is noted that a greater or lesser quantity of satellite dishes can be used without departing from the scope of the disclosure. In one illustrative example, the UE 330 and the satellite dishes 312, 314, 316 can be associated with one another based on a common or proximate geographic location, area, region, etc. In other words, it is contemplated that a plurality of client-side satellite internet constellation dishes can be deployed to serve (e.g., provide connectivity to the satellite internet constellation) various different geographic areas, with various granularities as desired. For example, a group of satellite dishes can be deployed in and around a city, a town, a region, etc. The groups of satellite dishes can also be deployed in rural areas (e.g., lower-density concentrations of users).

Multiple satellite dishes may be connected the same Edge Compute Unit to offer redundancy and resilience against outage, high latency, or low bandwidth.

In some cases, one or more satellite dishes (and/or groups thereof) can be deployed in remote areas that are distant from population centers, and in particular, that are distant from various types of infrastructure (e.g., including but not limited to electrical/power connectivity, internet and/or communication networking, compute capacity, reach of skilled personnel, access to road transportation, etc.).

The client-side satellite dishes 312, 314, 316 can communicate with a satellite internet constellation, shown in FIG. 3 as including a first satellite 302, a second satellite 304, a third satellite 306, and a fourth satellite 304. However, it is noted that a greater quantity of satellites can be used to implement the satellite internet constellation, with FIG. 3 presenting a simplified example for purposes of clarity of explanation.

Similarly, a plurality of server-side satellite internet constellation dishes 321, 323, 325 can be provided in association with various different gateways, such as the gateway 340 depicted in FIG. 3. In some embodiments, the gateway 340 can be an internet gateway that provides connectivity to an internet backbone. In some aspects, the gateway 340 can be a data center or CDN that caches, hosts, stores, serves, or otherwise provides web content in response to receiving corresponding client requests for the content. It is again noted that a greater or lesser quantity of server-side satellite dishes can be utilized without departing from the scope of the present disclosure. As was described above with respect to the client-side satellite dishes 312, 314, 316, the server-side satellite dishes 321, 323, 325 can be associated to a respective data center 340 based on a common or proximate geographic location, area, region, etc. In one illustrative example, the server-side satellite dishes 321, 323, 325 can be located at varying levels of proximity to the respective data center 340. For instance, an inner layer of server-side satellite dishes can include the satellite dishes 323 and 325, which may be provided at the closest physical distance to the data center 340. An outer layer of server-side satellite dishes can include at least the satellite dish 321, which is located at a greater distance away from the data center 340 relative to the inner layer dishes 323 and 325. In some embodiments, the outer layer satellite dishes can be communicatively coupled to the inner layer satellite dishes via a wired and/or wireless connection. For example, the outer layer server-side satellite dish 321 can be communicatively coupled to the inner layer server-side satellite dish 323 via a wireless microwave relay connection (among various other wireless/RF connections) and/or can be communicatively coupled to the inner layer server-side satellite dish 323 via a wired fiber connection.

By providing multiple different satellite dishes for communicating with the satellite internet constellation, at both the client-side associated with UE 330 and the server-side associated with datacenter 340, the systems and techniques described herein can increase the satellite constellation ground coverage area available to the UE 330 and to the datacenter 340. For instance, at the client-side associated with UE 330, the number of birds that are visible to or overhead the set of dishes 312, 314, 316 will almost always be greater than the number of birds that are visible to or otherwise overhead any individual one of the three client-side dishes 312, 314, 316. Similarly, at the server-side associated with datacenter 340, the number of birds that are visible to or otherwise overhead the set of the three dishes 321, 323, 325 will almost always be greater than the number of birds that are visible to or otherwise overhead any individual one of the three server-side dishes 321, 323, 325.

The interconnecting of the satellite dishes at each respective client location and at each respective server location, when combined with a satellite internet constellation implement optical space lasers or other ISLs, can enable more direct connectivity between the UE 330 and the datacenter 340. For instance, the UE 330 may use satellite dish 312 to communicate with satellite 302, via a service link 352. As illustrated, satellite 302 is out of range of the data center 340 (e.g., satellite 302 cannot establish a feeder link with any of the server-side dishes 321, 323, 325). In a conventional satellite internet constellation without ISLs, UE 330 would therefore be unable to use satellite 302 to obtain internet connectivity with data center 340 (based on the requirement in conventional satellite internet constellations that the same bird be used to connect the UE and an internet gateway).

Here, however, the UE 330 is able to establish internet connectivity with datacenter 340 via a first ISL 362*a* between satellite 302 and satellite 304, a second ISL 362*b* between satellite 304 and satellite 308, and a feeder link from satellite 308 to the server-side satellite dish 323. Notably, the UE 330 can establish internet connectivity with data center 340 via multiple different ISL-based paths through one different sets of birds of the satellite internet constellation. For instance, a first path from UE 330 to datacenter 340 is the combined path 352-362*a*-362*b*-372 described above. At least a second path from UE 330 to datacenter 340 may also be utilized. For example, the server-side dish 316 can communicate with satellite 304 via a service link 354, satellite 304 can communicate with satellite 306 via ISL 364, and satellite 306 can communicate with server-side dish 321 via feeder link 374.

Various other paths from the UE 330 to the datacenter 340 can also be utilized, with the two example paths of FIG. 3 provided for purposes of example and illustration, and not intended as limiting. For instance, the UE 330 can establish internet connectivity with datacenter 340 using a combination of: a particular service link selected from a plurality of available service links between one of the client-side dishes 312, 314, 316 to one of the birds of the constellation; one or more particular ISLs selected from a plurality of available ISLs between various combinations of two or more birds of the constellation; and a particular feeder link selected from a plurality of available feeder links between one of the birds of the constellation to one of the server-side dishes 321, 323, 325.

In some embodiments, the plurality of server-side satellite dishes (e.g., the dishes 321, 323, 325) can be located proximate to a datacenter, CDN, or other server-side proxy that serves internet content directly. In this example, the number of hops needed to provide internet connectivity to the UE 330 can be approximately equal to the 2+the number of ISLs in the path through the satellite constellation (e.g., 1x service link from UE 330 to the constellation, 1x feeder link from the constellation to the datacenter 340, and any ISLs taken between the service link satellite and the feeder link satellite).

In another example, the plurality of server-side satellite dishes (e.g., dishes 321, 323, 325) can be located proximate to a terrestrial internet gateway that connects via ground-based connections, such as fiber, to the corresponding datacenter, CDN, server-side proxy, etc., that hosts content requested by UE 330. For instance, one or more server-side satellite dishes can be provided proximate to multiple different terrestrial internet gateways. In this manner, the satellite internet constellation may, in some cases, analyze a client request from UE 330 to determine a particular terrestrial internet gateway that has the lowest latency to a proxy of the web server associated with the client request. Based on the analysis, the satellite internet constellation can determine one or more ISLs to route the client request to a bird that is overhead the identified gateway having the lowest latency to the proxy. In some examples, the satellite internet constellation can determine the lowest latency as the lowest latency from one of the terrestrial internet gateways to a proxy of the requested web server (e.g., without accounting for additional latency introduced by the number of ISLs or inter-satellite constellation hops needed to connect UE 330 to the lowest latency internet gateway). In other example, the satellite internet constellation can determine the lowest latency as being inclusive of both the latency through the ISL hops within the satellite constellation plus the latency through the one or more hops from a gateway to the proxy.

Notably, the systems and techniques described herein can be used to provide lower latency satellite internet by decoupling UE 330 from the limitation of only being able to connect to its local internet gateways. In some cases, the satellite internet constellation can receive signaling from one or more server-side proxies indicative of a current load, predicted load, etc., associated with each respective one of the server-side proxies. Based on the indicated load information for the proxies, the satellite internet constellation can more intelligently route internet traffic to gateways with proxies having sufficient capacity (and/or the most available capacity) to handle the traffic. For instance, the traffic-aware routing (e.g., load balancing) can be implemented in combination with the latency-based routing described above.

In some embodiments, the satellite internet constellation can be configured to inspect and/or analyze the contents of internet traffic from UE 330. For instance, if the satellite internet constellation is able to inspect the contents of client-side internet traffic, a web client (e.g., browser) and/or a satellite internet constellation client-side proxy can maintain a consistent/persistent secure connection with an appropriate gateway proxy, thereby reducing the number of roundtrips by approximately 60%. The roundtrip reduction of 60% may be in addition to the already reduced number of hops between the UE 330 and the datacenter 340.

Example Embodiments

As noted previously above, the use of edge computing has become increasingly popular for implementing a diverse range of AI and ML applications, as well as for serving other use cases that demand real-time processing, minimal latency, high availability, and high reliability. For example, such applications and use cases may rely on high-bandwidth sensors that have the ability to generate data at massive rates (e.g., on the order of 50 Gbit/sec or 22 TB/hr), and may be unsuitable for deployments based on the conventional edge-cloud-edge data transport paradigm.

Example Artificial Intelligence (AI) and Machine Learning (ML) Workloads at the Edge Various AI and ML applications (also referred to as workloads, workflows, tasks, etc.) can benefit from edge computing or otherwise being implemented at the edge. Edge computing can play an important role in providing a wide range of AI and ML applications, including (but not limited to) for use cases that utilize real-time processing, high reliability, high availability, and minimal latency—all of which are features of edge computing and the edge compute units described herein.

For example, edge-deployed AI and ML applications may make heavy use of one or more high-bandwidth sensors (e.g., such as high-speed and/or HD cameras, stereo cameras, lidar cameras and/or sensor systems, accelerometers and other inertial sensor packages, fiber optic sensor, radar, ultrasonic sensors, etc.). Additionally, multi-modal sensor packages may include multiple sensors operating over multiple different modalities and/or sensor domains. These multi-modal sensor packages can generate and/or stream data at rates that can exceed 50 Gbit/s (e.g., 22 TB/hr).

Sensor data streams, either high-bandwidth or otherwise, can be provided to one or more AI or ML models that are configured (e.g., trained) to process such sensor data for purposes such as real-time decision making and analytics (among various other purposes). For instance, ML and AI models that may be associated with ingesting and/or processing massive or high-bandwidth data streams can include, but are not limited to, deep neural networks (DNNs), convolutional neural networks (CNNs), region-based CNNs (R-CNNs), recurrent neural networks (RNNs), long short-term memory (LSTM) networks, vision transformers (ViTs), variational autoencoders (VAEs), generative adversarial networks (GANs), autoencoders, transformers, bidirectional encoder representations from transformers (BERT), stable diffusion, attention mechanisms, and/or large language models (LLMs), etc.

Processing high-bandwidth and other large data streams with an AI or ML model can require significant computational power, in some cases on the order of thousands of teraflops (TFLOPS). One teraflop represents one million million ($10^{12}$) floating-point operations per second.

As both the size and complexity of ML and AI models has increased, so too has the ability to deploy increasing numbers of increasingly high bandwidth sensors/sensor packages to generate the input data for inference using the ML and AI models. As such, there is an increasing need for systems and techniques that can be used to deploy and/or implement high-performance compute nodes (e.g., for running inference using trained AI or ML models) near the sources of sensor and other input data.

As the number of interconnected sensors and the corresponding volume of generated data continue to increase, the significance of edge computing becomes increasingly critical. In particular, it is observed that edge computing may act as an enabler for the evolution of intelligent applications and services (e.g., AI and/or ML models and workloads) that can be used to autonomously and continually learn, predict, and adapt using massive streams of unstructured data. For instance, by 2025, it is projected that the global data volume will reach 175 zettabytes (175 billion TB), with approximately 80% of this data being in an unstructured form.

Unstructured data and datasets have historically been underutilized—for example, it is estimated that on the order of 90% of unstructured datasets currently remain unanalyzed and unused. It is additionally noted that many of these unstructured datasets do not strictly require storage in their raw form, which may lack meaningful information. Nevertheless, many unstructured datasets exist, and can be challenging to integrate with existing computational workflows and/or pipelines, which are largely structured and designed for processing at least partially structured data. For example, even if all of the unstructured datasets were to be transferred to the cloud, conventional and existing cloud-based infrastructure is primarily configured to process data in batches—resulting in considerable time delays between data creation and the generation of corresponding insights or decisions based on the data.

In one illustrative example, a typical offshore drilling platform produces a substantial amount of data, ranging from 2-4 TB per day. Of this 2-4 TB of raw data generated each day, approximately 80% may remain unused (e.g., 1.6-3.2 TB/day). Even a solitary oil rig operating remotely in a northern environment can generate over 1 TB of data per day, and in this example, with less than 1% of that data being utilized for analytical and/or decision-making purposes. The challenges of generated data volume can become exponentially more difficult with the remoteness of the operating environment. In particular, the difficulty of managing and utilizing large volumes of generated sensor data can increase non-linearly with the separation distance from existing data networks and other communication infrastructure for uploading/transmitting the generated sensor data.

For instance, sensor data generated in remote operating environments often cannot be transmitted over conventional fiber optic or other physical/wired internet communication links, based in large part on the lack of such infrastructure in or near the remote operating environment. Consequently, sensor data generated in remote operating environments often must be transmitted over much slower (and often more expensive) wireless communication links, such as cellular and/or satellite communication links.

A satellite communication link with a 25 Mbps upload speed will take approximately 90 hours (approximately four straight days) to transmit 1 TB of data—meaning that the example oil rig generating 1 TB/day will quickly bottleneck any data upload from the oil rig to a data center. The challenge becomes more profound, and increasingly untenable, as the amount of generated data increases. For instance, a large-scale refinery can easily generate in excess of 10 TB of raw data each day.

One common type of unstructured data that may be generated on a daily (or other regular) basis is video data captured by cameras local to an operating site. Video data captured by cameras often falls into the category of unstructured data because such video data comprises raw visual information without a pre-defined structure or format. The increased use and availability of high-resolution cameras for tasks such as video-based monitoring, scene understanding, and/or navigation applications, etc., has led to a surge in unstructured video data generation. For instance, a 4K camera capturing 30 frames-per-second (fps) generates 5.4 TB of uncompressed video data within a single hour.

Similar increases in raw data generation can be seen in the context of autonomous vehicles (AVs) that are each equipped with multiple cameras and sensor packages (e.g., lidar, radar, ultrasonic sensors, IMUs/INSs, GPS, etc.). The data generation rate of a single AV can reach or exceed 50 Gbit/sec. In the AV use case, a significant portion of this 50 Gbit/sec raw data generation can necessitate local and real-time processing in order to enable low-latency decision making for the navigation and control of the AV as the AV moves through its environment. Notably, even a single IP camera can make an appreciable contribution to the overall sensor data firehose described above—streaming at rates ranging from 0.01-1.20 Mbit/sec, a single IP camera can generate anywhere between 5-500 MB of data per hour.

Sensors such as IP cameras are often deployed in large quantities, and consequently these deployments of seemingly low bandwidth contributors can have significant impacts when considered as a whole. Consider the example of a stadium that equips IP cameras as part of an extensive security or monitoring system, with a total deployment count of 900 IP cameras. In just a single hour, the 900 IP camera security system can generate half a terabyte (0.5 TB) of video data alone. In the security and monitoring scenario, the IP camera video data needs to be processed in substantially real-time for purposes such as event logistics, threat detection, safety monitoring, etc. While it is possible for various forms of unstructured data (e.g., such as the IP camera video data) to be indexed and stored for later retrieval, the common use cases for such unstructured data are often themselves the primary driver of the need for substantially real-time processing and analytical capabilities.

Table 1, below, summarizes various example scenarios/use cases for AI and ML applications in the context of edge computing. Also presented in Table 1 are example requirements for respective sensing, bandwidth, compute, and storage corresponding to each example use case (although it is noted that the information of Table 1 is provided for purposes of illustration and example, and is not intended to be construed as limiting):

TABLE 1

Example use case scenarios and corresponding compute requirements and parameters for various AI and ML applications at the edge.

| Industry | Sensors | Bandwidth | Compute (AI/ML) Applications | Storage |
|---|---|---|---|---|
| Energy (offshore oil drilling) | Fiber optic sensors, cameras, pressure, temperature, flow, ultrasonic sensors | 0.2-0.4 Gbit/sec | 40-300 TOPS (drilling productivity, fault detection, real-time drilling analytics, GIS/mapping, rig performance analyses, etc.) | 2-4 TB/day |
| Energy (oil refinery) | Fiber optic pressure and strain sensors, valve, IR cameras, thermal and electrochemical sensors | 0.5-1 Gbit/sec | 40-300 TOPS (predictive analytics, equipment performance and monitoring, oil quality grading, etc.) | 5-10 TB/day |
| Logistics, Agriculture (autonomous vehicles) | 5-10 cameras, 4-6 radar, 2-4 lidar, 10-18 ultrasonic, GPS, INS/IMU, odometry | 2-50 Gbit/sec | 150-800 TOPS (navigation, real-time obstacle detection, path and route planning, localization and mapping/SLAM, etc.) | 1-22 TB/hour (~0.8 TB/hour stored) |
| Media and Entertainment (security camera network, AR/VR) | 500-1200 IP cameras (panoramic, fisheye, IR/night | 0.6-1.4 Gbit/sec | 80-400 TOPS (real-time object detection and tracking, activity recognition, event classification, crowd analyses, etc.) | 270-630 GB/hour |

TABLE 1-continued

Example use case scenarios and corresponding compute requirements and parameters for various AI and ML applications at the edge.

| Industry | Sensors | Bandwidth | Compute (AI/ML) Applications | Storage |
|---|---|---|---|---|
| Manufacturing (aviation, warehouse automation, robotics) | vision, motion detection) Cameras, stereo and depth sensors, F/T sensors, position and angle sensing, odometry | 0.5-2 Gbit/sec (per workcell or robot) | 50-200 TOPS per workcell/robot (object detection, barcode scanning, pick and place, sortation, inspection, manipulation, palletization/depalletization, etc.) | 0.25-1 TB/hour |
| Retail and Supply Chain (logistics, last mile, fulfillment) | POS, cameras, RFIS, WiFi positioning, IPS | 0.5-2 Gbit/sec | 30-80 TOPS (real-time customer analytics, personalization and recommendation, inventory management and replenishment, shrinkage, etc.) | 0.1-0.5 TB/hour |
| Sustainability | Energy monitors, infrared cameras, temperature and current sensors, flow meters | 0.1-1 Gbit/sec | 10-40 TOPS (real-time energy usage monitoring, energy management, distributed power generation and storage, automated controls, predictive maintenance, etc.) | 0.5 TB/day |
| Healthcare | Wearable ECG and BP monitors, glucometers, biosensors, fitness trackers, cameras | 0.1-1 Gbit/sec | 20-50 TOPS (real-time health monitoring, personalized care, predictive health analytics, privacy and security of healthcare apps) | 0.5 TB/day |

Table 2, below, summarizes various edge ML/AI applications that can be deployed in the context of various example industries. It is again noted that the information of Table 2, as with Table 1, is provided for purposes of illustration and example, and is not intended to be construed as limiting:

TABLE 2

Example edge ML/AI applications that can be deployed in the context of various example industries and industry use-case impacts.

| Industry | Example ML/AI Edge Applications | Industry Use-Case Impact |
|---|---|---|
| Energy (offshore oil drilling) | Real-time monitoring and anomaly detection; predictive and prescriptive analytics; assistive visual inspection; GIS/mapping of drilling environments. | Maintain and increase drilling productivity; uninterrupted drilling due to preemptive maintenance; reduce time to map and discover oil and gas sites; assistive and guided repair, inspection, and QA. |
| Energy (oil refinery) | Predictive and prescriptive analytics; chemical process monitoring; oil quality grading; refinery equipment inspection; pressure, temperature, and flow monitoring. | Oil and chemical quality control; increase productivity and reduce downtime; optimize refinery processes and efficiencies, flow control; detect leaks and gas concentrations; safety and proactive maintenance schedules. |
| Logistics, Agriculture (railroad transportation) | Visual inspection and detection of defects (rail, locomotive, wheel); yard monitoring and management-schedule fueling and maintenance, container placement and tracking. | Automated yard and terminal management; predictive maintenance; increase capacity utilization; increase safety and security by timely interventions; minimize safety risks; increase visibility, reliability/predictability of transportation. |
| Manufacturing (aviation systems) | Aerodynamic simulation, structural stability, and vibration analysis, FEA, accelerated life-cycle testing, digital twin modeling, high-resolution structural inspection. | Reduce defects; minimize scrap and rework rates; lower lead times, drive compliance and safety certification; quicker simulation and testing cycles; improve aerodynamic modeling and validation against wind-tunnel data. |
| Manufacturing (warehouse automation, robotics) | Pick and place; binning/sortation; palletization/depalletization; inventory control and quality assurance; object detection and manipulation; package scanning and inspection. | Increase throughput, inbound and outbound efficiencies; lower defect rates and sidelines; 24/7 lights-out operation, savings in labor and variable costs. |
| Media and Entertainment (security camera network) | Real-time object detection and recognition; activity recognition; crowd monitoring; event classification; biometric and facial recognition. | Reduce safety risks and incidents; streamline flow and minimize wait times and crowding; automated check-ins and just-walk-in-and-out technology; incident visibility and forensics; reduce costs and insurance premiums; lower incident-response time. |

As contemplated herein, the disclosed systems and techniques can be used to provide fleet and asset management for edge computing of various ML and/or AI workloads, including one or more (or all) of the examples presented above in Table 1. More generally, it is contemplated that the systems and techniques described herein can be used to provide edge compute units and management thereof configured for low latency, high availability, real-time processing, and local operation (e.g., edge operation) with minimal dependence on remote, cloud, or on-premises infrastructure. Described below are additional details of example ML and AI workloads that can be implemented at the edge according to the presently disclosed systems and techniques for fleet and asset management for edge computing of ML and AI workloads.

Example 1: Object Detection and Recognition

Object detection and recognition tasks can be performed using various ML and/or AI models, architectures, etc. Common object detection and recognition tasks can include, but are not limited to, tasks such as identifying objects, people, or specific events in video streams. Object detection and recognition tasks often require (and/or benefit from) real-time or near-real-time response. By performing the processing of the underlying input data for the object detection and recognition task (e.g., video or camera data, etc.) at the edge, the processing is performed closer to the data-generating source (e.g., cameras or other sensors), and the latency of the task can be significantly reduced. Advantageously, reducing the latency of object detection and recognition tasks can be seen to enable faster decision-making, for instance allowing for immediate actions and/or alerts to be triggered based on detected objects (e.g., such as in security systems, AVs, and/or industrial robot use cases, etc.).

Object detection and recognition tasks are typically performed based on analyzing large amounts of data, such as video streams or high-resolution images (e.g., with a single IP camera capable of generating 500 GB/hour, or more, as described previously above). Transferring object detection and recognition tasks from the cloud or other central location (e.g., on-premises location) to the edge can reduce the latency associated with receiving the object detection and recognition output at the edge, and can additionally reduce the bandwidth utilized for uplink and downlink communications at the edge. For instance, the use of edge computing allows for local video and image analysis, reducing the amount of data that needs to be transmitted and stored to a location that is remote from the edge (e.g., cloud, on-premises location/data center, etc.), and thereby optimizing bandwidth usage while reducing network and storage costs. Edge computing for object detection and recognition tasks can also be seen to decrease the conventional dependency on stable and high-bandwidth internet connections, cloud service availability, and potential latency issues associated with cloud-based processing. Moreover, transferring object detection and recognition tasks to being implemented and managed at the edge can also be seen to provide a system with increased autonomy and resilience, making such an edge computing system suitable for detection and tracking applications that require continuous functionality and uninterrupted performance, especially in remote or offline settings.

In one illustrative example, consider an object detection and recognition task that is performed based on raw video data comprising surveillance footage captured by one or more drones. In this example, it is desirable for vehicles within the drone surveillance footage to be detected and classified by type in real-time. For instance, the vehicle classification types can include 'car,' 'truck,' 'van,' 'bus,' 'autorickshaw,' etc., among various others. Once detected or otherwise identified by an input, a selected vehicle can be tracked across multiple video surveillance frames.

This capability of object detection, recognition, and tracking can be extended to include a plurality of additional surveillance cameras in a geographic region (e.g., neighborhood, etc.), where the additional surveillance cameras can also be drone-based and/or can be non-drone based. For instance, the object detection, recognition, and tracking capabilities can be extended to additional surveillance cameras in the same neighborhood as the drone-based surveillance camera, including surveillance cameras mounted on fixed placements, pan-tilt head cameras, and/or moving platform cameras, etc.

It is important to note that significant portions of the total surveillance camera footage captured by the system may lack meaningful or relevant information—many hours of video surveillance footage can include long periods of inactivity, empty scenes, uneventful situations, etc., and may be collectively referred to as "empty frames" or "non-actionable footage." In many examples, only a small percentage of the total captured surveillance video footage (e.g., from 1% to 20%) may contain events or activities that are relevant to the intended surveillance objectives.

In general, the percentage of raw data from surveillance cameras that contains meaningful or actionable information relevant to the current surveillance task or objective can depend on various factors, which can include (but are not limited to) the specific surveillance system, the camera placement, the scene dynamics, the surveillance purpose, goal, or objective, etc.

In some aspects, one or more AI or ML models or algorithms can be trained to detect and identify specific objects, events, and/or anomalies, etc., in an input comprising captured surveillance footage. The use of trained AI or ML models for such object detection, recognition, and tracking tasks can reduce the need for manual review of the vast amounts of raw surveillance footage, and can enable the surveillance system to focus on extracting meaningful information and alerting operators (and/or triggering appropriate remediation actions) when relevant events are detected to occur in real-time. Any stored footage may additionally be indexed for efficient querying and retrieval.

Some object detection applications or use cases (e.g., such as critical surveillance systems, smart cameras, etc.) can involve capturing sensitive or private data. In some aspects, performing the corresponding processing at the edge can be seen to minimize the need to transmit this sensitive or private data to an external or remote cloud server, thereby reducing privacy concerns while also enhancing data security. In some cases, privacy preservation and local handling of sensitive data can be of particular import in scenarios where strict data regulations and/or privacy requirements must be met (an increasing occurrence in various regulatory regimes around the world today).

Example 2: Sensor Integration and Scene Understanding

In some aspects, the use of edge computing (e.g., also referred to herein as "edge computation") can enable the integration of multiple sensors (e.g., such as cameras, lidar, radar, ultrasonic arrays, stereo rigs, range scanners, accelerometers, gyroscopes, and other IoT devices, etc.) in a distributed edge-computing environment. By using one or more edge compute units to process the respective data from these various sensors at the edge, it becomes possible to analyze and combine data from multimodal data sources in real-time. In some cases, sensor integration enabled by edge computing can be seen to enhance the overall understanding (e.g., analytical understanding and/or human understanding based on review of the analytical results) of the scene, for instance based at least in part on the use of the edge computation sensor integration to provide a more comprehensive and accurate view of the surrounding environment at the edge.

For example, cameras can be used to provide high-resolution shape, color, and texture information for object detection and recognition tasks applied to objects such as pedestrians, vehicles, and motorcyclists. While the resolution of a typical camera is considerably higher than that of conventional lidar sensors/systems, the typical camera has a limited field of view (FOV) and cannot precisely estimate the distance between the camera and one or more objects within the camera's FOV. Image data from a typical camera also cannot usually be used to perform depth estimation or otherwise calculate depth information corresponding to an object without being combined with image data of the same object, as captured by one or more additional cameras. More generally, depth estimation performed based on one or more cameras can often have a significantly lower precision than depth estimation performed using lidar (which is a remote sensing technique that uses light in the form of a pulsed laser to measure depth samples). In addition, a camera is relatively sensitive to light changes, ambient lighting, and scene reflectance, etc.—artifacts having a less prominent or negligible impact on lidar imaging of the same scene. However, lidar sensors and systems can have difficulty recognizing color and classifying objects in comparison to camera-based sensors and systems.

In one illustrative example, by using sensor integration, an edge compute unit (and/or other edge computing device(s) configured for operation with the presently disclosed systems and techniques for fleet and asset management for AI/ML edge computing) can acquire complementary information and/or sensor data streams corresponding to a surrounding environment. For example, the edge compute unit can use sensor data with different characteristics to obtain a more complete or comprehensive characterization of the surrounding environment. Multiple sensor data streams (obtained from multiple different sensors) can also be used to overcome limitations of individual sensors (e.g., such as the limitations described in the example above with respect to lidar and camera) and to reduce the uncertainty of individual sensors. Accordingly, use cases such as those relating to autonomous vehicles (AVs), robotics, and/or industrial automation, etc., may benefit from real-time sensor integration for safety and reliability. In some cases, real-time sensor integration can enable rapid scene understanding, object detection, and/or object tracking (among various other applications) to be implemented at the edge, while further enabling timely and appropriate actions to be taken based on the multimodal sensor inputs.

In one illustrative example, multimodal sensor inputs and/or sensor integration and scene understanding can be implemented based on receiving respective data streams from cameras (e.g., visual light cameras) and from lidar systems. For instance, respective data streams from one or more cameras and one or more lidars can be integrated on a locomotive and/or associated railway infrastructure, and used to monitor the railway or track ahead of the locomotive as it moves along the railway. In some examples, deep learning-based sensor integration models (e.g., such as PointNet, PTA-Det, etc.) can be deployed at the edge to combine raw point cloud data (e.g., derived from lidar data stream(s)) with image-based visual features (e.g., derived from image data). For instance, the one or more deep learning-based sensor integration models can be implemented and/or deployed using one or more of the edge compute units described herein. Additionally, the one or more edge compute units (and the deep learning-based sensor integration models implemented thereon) can be monitored and managed using the presently disclosed systems and techniques for fleet and asset management for ML/AI edge computing.

In some cases, the one or more deep learning-based sensor integration models deployed at the edge can be configured or used to combine the raw point cloud data with image-based visual features in order to detect specific objects that are relevant to train track safety (e.g., such as fallen trees, rocks, unauthorized personnel on the tracks in the scene, etc.). By analyzing the combined data streams locally (e.g., using one or more edge compute units), these relevant objects can be identified in substantially real-time, and can be used to trigger alerts and/or to initiate appropriate actions to ensure track clearance ahead of the locomotive. Monitoring the condition of the tracks in real-time (e.g., using an edge compute unit in the same geographic area as a section of tracks, and/or using an edge compute unit onboard the locomotive traversing the tracks, etc.) can enable immediate detection of any obstructions, debris, or hazards that may be present on the tracks.

Sensor integration can also be used to provide additional information about the track conditions, including, but not limited to, measurements of height, depth, curvature and/or any abnormalities that may affect train safety. The edge-based implementation of the deep learning-based sensor integration models (and any other ML or AI models) allows for immediate remediation action to be taken, such as alerting the train operator, signaling maintenance crews, and/or triggering automated safety measures, etc. In remote or rural areas with limited network connectivity, sensor integration at the edge enables real-time train-track monitoring and identification of clear tracks in the scene ahead of the locomotive, even in the absence of a stable internet connection. In such examples, local processing and real-time scene analysis (e.g., implemented using the edge compute unit(s)) can be used to ensure continuous monitoring and safety measures, regardless of (e.g., independent of) network availability (or lack thereof).

In some cases, given an emergency-braked deceleration of 1.5 m/s2 (0.15 g), the braking distance of a locomotive is approximately 260 meters at 100 km/h (60 mph) and 580 meters at 150 km/h (90 mph). Currently available ultra-long-range solid-state lidars can be configured with the capability to scan objects up to 600 meters away. These lidars provide a resolution of up to 700 lines at frame rates ranging from 1 to 30 fps, offering an angular resolution of 0.01° and a precision of ±2 cm. Such ultra-long range solid-state lidars may be frequently utilized in rail projects for accurate ranging and long-distance detection. With multiple lasers or channels (e.g., in some cases ranging from 8 to 32), these lidars can generate over 2 million data points per second, corresponding to a data generation rate of 32 Mbit/sec (equivalent to 14.4 GB/hr without compression). The 3D scans obtained from one or more lidars can be processed and combined with high-resolution images and odometry at the edge (e.g., using one or more edge compute units). This enables the prompt identification of potential obstacles, damage, or dangers on the train tracks. By leveraging edge computing, these lidar scans can be swiftly analyzed and utilized for enhanced safety measures, without ever leaving the edge location where the lidar sensor system is located and where the lidar scans were obtained/generated.

Example 3: Facial Recognition and Biometric Identification

In another illustrative example, performing facial recognition and biometric identification at the edge can be used to enhance privacy and security, of both the processing task itself and relating to the underlying or constituent data provided as input and used to perform the processing task. For instance, when an edge compute unit is used to implement a facial recognition or biometric identification task (e.g., performs inference using one or more facial recognition or biometric identification ML or AI models), the underlying input data will remain on the edge compute unit and its local network. Accordingly, the facial recognition or biometric identification task can be performed without any need to transmit sensitive biometric data to external servers or cloud platforms. This reduces the risk of data breaches and unauthorized access to personal information, ensuring better privacy protection for individuals. By performing processing locally at the edge, only relevant information, and in particular, only relevant output information (e.g., such as extracted features or identification results) needs to be transmitted off of the local edge compute unit and associated local network. The edge computation approach can be seen to reduce bandwidth consumption, alleviate network congestion, and save on data transmission costs. Moreover, edge processing enables facial recognition and biometric identification systems to operate even in scenarios with limited or intermittent network connectivity. The processing algorithms and models are deployed directly on the edge devices, allowing for offline operation without relying on constant cloud connectivity. This ensures continuous functionality and uninterrupted identification capabilities, which can be particularly beneficial in remote or offline environments. In some cases, commonly employed biometric identification methods include facial, fingerprint, iris, voice, palmprint, retina, vein, signature recognition; gait analysis; body thermal signature; and/or DNA biometrics—each of which may be implemented fully or in part on a local edge compute unit.

For example, consider a railway tunnel that is monitored using one or more forward looking infrared (FLIR) cameras or FLIR devices. In this example, a FLIR camera can capture thermal images (e.g., as still frames or as frames of video data) that can be processed locally at the edge in real-time for detecting people or other foreign/unauthorized objects in the railway tunnel. The use of edge computation/edge analysis can also enable quick identification (e.g., substantially real-time identification) of individuals based on the individual's respective thermal signature and gait pattern, thereby distinguishing authorized personnel from those who should not be near the tracks.

For instance, a FUR camera image captured at time ti may include a single individual, who is tagged and identified as authorized personnel. The authorized individual can be identified and recognized at different time instances (e.g., a plurality of time instances, including at the time instance ti) from their gait and thermal signature patterns. By processing the FLIR data locally at the edge, identification results can be generated without relying on cloud infrastructure or distant processing centers that must first receive the FUR camera images or other sensitive data transmitted over a public network. In some examples, the reduction in latency achieved by implementing FUR data processing at the edge (e.g., using an edge compute unit) can ensure faster responses and decision-making based on the thermal information captured by the FLIR cameras. The reduction in latency and associated benefits may be particularly important in applications where timely identification is crucial, such as physical access control, security surveillance, safety, and/or border control, etc.

Example 4: 3D-Mapping and Localization 3D-mapping (also referred to as 3D-reconstruction or 3D-modeling), is a process of creating a three-dimensional representation of a real-world object, scene, or environment. 3D-mapping can be performed based on capturing and processing data from multiple sources (e.g., such as depth sensors, cameras (e.g., structure-from-motion or stereo, etc.), lidar, structured-light scanners, and/or point clouds, etc.) to generate a detailed and accurate textured model of the physical world in three dimensions. The resulting 3D map or model can be used for various applications, including autonomous navigation, virtual reality (VR), augmented reality (AR), mixed reality (MR), gaming, architectural visualization, simulation, cultural heritage preservation, and more.

Autonomous navigation (e.g., implemented and/or performed by an autonomous vehicle (AV)) often uses a technique called Simultaneous Localization and Mapping (SLAM) that enables the autonomous vehicle or robot to build a map of an unknown environment while simultaneously determining its own position within that environment. SLAM involves the estimation of both the vehicle's pose (e.g., position and orientation) and the map of the environment as the vehicle moves through the surrounding environment and gathers corresponding sensor data of one or more types. In some aspects, SLAM can be augmented with partial 3D models, fiducials/markers, GPS, and/or Inertial Navigation System (INS) data. The main goal of SLAM is to enable autonomous systems to navigate and operate in dynamic or cluttered environments without relying on detailed 3D models.

SLAM algorithms typically consume large amounts of sensor data that need to be processed and transmitted. By performing SLAM computations on one or more edge compute units managed by the presently disclosed systems and techniques for fleet and asset management for AI/ML edge computing, only relevant information-such as pose estimates of multiple autonomous vehicles (AVs) or textured-mesh 3D models-needs to be transmitted to other devices or central servers. The edge computing implementation for SLAM (among other 3D-mapping and localization techniques, algorithms, models, etc.) can reduce the amount of data transmitted over the network, conserves bandwidth, and lowers the communication costs associated with SLAM application. By eliminating the need to transmit raw sensor data, which may contain sensitive information about the environment, the SLAM processing is kept localized to the edge, thereby enhancing privacy and security, while also reducing the risk of unauthorized access or data breaches.

For instance, consider an example scenario in which an autonomous tractor (e.g., a type of AV and/or a type of robotic device) maps its surrounding environment while localizing itself within the same 3D-mapped environment. In other words, the autonomous tractor can simultaneously generate a 3D-mapping of its surrounding environment while also localizing itself within the currently generated 3D-mapping of the surrounding environment. In some aspects, multiple tractors and/or AVs can safely operate and collaborate in the same environment while a respective relative pose estimate/information is estimated and tracked by a local edge compute unit of the presently disclosed management and monitoring platform for AI/ML edge computation.

In such examples, performing SLAM computations on the local edge compute units can significantly reduce the latency between sensor data acquisition, processing, and output generation. This low latency enables faster updates of the localization and mapping information, thereby improving the overall performance of SLAM. Moreover, AVs can operate autonomously even in environments with limited or intermittent network connectivity. As such, the local edge compute units of the presently disclosed management and monitoring platform for AI/ML edge computation can continue to perform SLAM computations and update the localization and mapping information locally, ensuring uninterrupted operation and providing reliable localization and mapping even when offline.

In scenarios where the AVs and edge compute units are networked and connected to cloud infrastructure, some (or all) of the edge compute units can be configured to collaborate with the cloud for enhanced SLAM capabilities. For instance, some (or all) of the local edge compute units can perform local SLAM processing to provide real-time updates to the AVs/SLAM process, while the cloud can perform additional computations that are less time-sensitive or in need of real-time implementation (e.g., such as wide-area mapping, global optimization, and/or semantic understanding of the environment, etc.). This collaborative approach balances real-time requirements with more computationally intensive tasks, leveraging the strengths of both edge and cloud processing. As will be described in greater depth below, this collaborative cloud-edge computational approach can be implemented, mediated, managed, and/or monitored using the presently disclosed systems and techniques for an AI/ML edge computation platform.

Example 5: Natural Language Analysis and Synthesis

Natural language analysis and synthesis have recently benefited from the use of transformer-based machine learning models (also referred to simply as "transformers"), based largely on the ability of transformers to adapt and extend across multiple tasks-such as (in the context of natural language) interpreting commands, text summarization, response generation, and/or intent analysis, etc. Transformer-based models tend to be large, complex, and computationally intensive to implement due to their deep architecture and a high number of parameters. This can pose challenges for small edge devices with limited computational resources and storage capacity.

In one illustrative example, the edge compute units associated with the presently disclosed AI/ML edge computation platform can be configured to offer sufficient memory, compute, and storage for deploying one (or multiple) transformers at the edge. Moreover, the GPU compute capacity provided on the edge compute units can be used to make model size-reduction techniques (e.g., such as model compression, quantization, and/or knowledge distillation, etc.) feasible for implementation and use in an edge deployment. Efficient inference is crucial for real-time or near-real-time responses. Techniques like model pruning, quantization, or specialized hardware accelerators can additionally be employed on the edge compute units described herein in order to speed up inference without sacrificing performance.

In some aspects, transformer-based models, being self-contained, can operate offline without requiring constant network access—thereby making many transformer-based models suitable for use or implementation in industrial environments where continuous connectivity cannot be guaranteed. Pretrained models (e.g., pretrained transformer models) can be fine-tuned on edge-specific data, allowing for domain adaptation and improved performance on specific tasks. In this example, the edge-specific data can be domain and/or application-specific data (e.g., data that is collected by the sensors associated with the same edge compute unit, in the same environment and configured for the same task, as will be associated with the inference performed by the pretrained transformer model running on the edge compute unit).

In some aspects, this approach can be seen to reduce the training time and resource requirements for natural language applications. Once trained and finetuned, transformer-based models may need periodic updates or adaptations to maintain their performance over time. The presently disclosed edge compute units (and AI/ML edge computation management platform thereof) can facilitate localized model updates or fine-tuning using edge-specific data. This allows the models to adapt to changing conditions or requirements without relying heavily on external servers or cloud infrastructure. The edge compute units and presently disclosed AI/ML edge computation platform can additionally enable continuous training, online and incremental learning of these models deployed at the edge, thereby keeping them up-to-date on the most recent and relevant sensor data collected at the edge or elsewhere.

Another unique capability enabled by the systems and techniques described herein is collaborative or distributed inference for language models (e.g., AI or ML language models). In some aspects, transformer-based models can be partitioned across various high-performance compute nodes or servers (e.g., some or all of which may be implemented as edge compute units, at same or different/distributed geographic sites or locations). The distributed high-performance compute nodes or servers can be configured to collectively perform inference by sharing intermediate results or model parameters amongst one another. This approach reduces an individual server's computation and memory requirements while maintaining the benefits of transformer-based models and increasing resilience.

In some examples, transformer-based models trained on large-scale datasets may often raise privacy concerns when trained and deployed in the cloud. Self-contained edge compute units offer the ability to store and process sensitive data, personally identifiable information (PII), and/or protected health information (PHI) of customers on premises (e.g., at the edge/on an edge compute unit), thus minimizing the need to transmit such data to external servers. Such an approach enhances privacy and security by keeping the data such as text, images, videos, electronic health records, clinical notes, financial records, confidential information-within the local network of the edge compute unit(s). Government agencies, healthcare and financial institutions can use their own edge compute unit infrastructure to train and finetune their transformer-based Large Language Models (LLMs) and/or other Foundation Models (FMs). Subsequently, the trained and finetuned LLMs and FMs can be hosted on premises (e.g., using one or more edge compute units managed and monitored by the presently disclosed ML/AI edge computation management platform) behind a firewall to safeguard the knowledge encoded within the models' parameters.

Connected Edge and Cloud Implementations for AI and ML Workloads

AI and/or ML-based applications pose a set of challenges that can be uniquely addressed by edge computing. For instance, many AI and ML applications (e.g., AI and ML models) are data intensive and may need to be continually retrained to account for data drift. For instance, such AI/ML applications can require (or otherwise benefit from) monitoring of model degradation, regular training with new data and model parameters, etc. Consider one illustrative example in which an energy company that operates hundreds of oil drilling rigs around the globe generates terabytes of data from sensors and cameras provided on each rig. These streams of data can be aggregated to train models for purposes such as detecting process anomalies, increasing safety and reliability of operations, automated decision making, improving system performance and throughput, and/or updating maintenance schedules, etc.

As will be described in greater depth below with respect to FIG. 4, one illustrative example of a design pattern for deploying and maintaining these AI/ML models using the presently disclosed edge compute units and AI/ML edge computation management platform can be based on using the edge compute units to perform local data capture, ingestion, and processing using trained ML/AI models, while using an on-cloud implementation to perform training (including re-training and/or finetuning) of the ML/AI models that will be implemented locally by the edge compute units.

Figure 4:
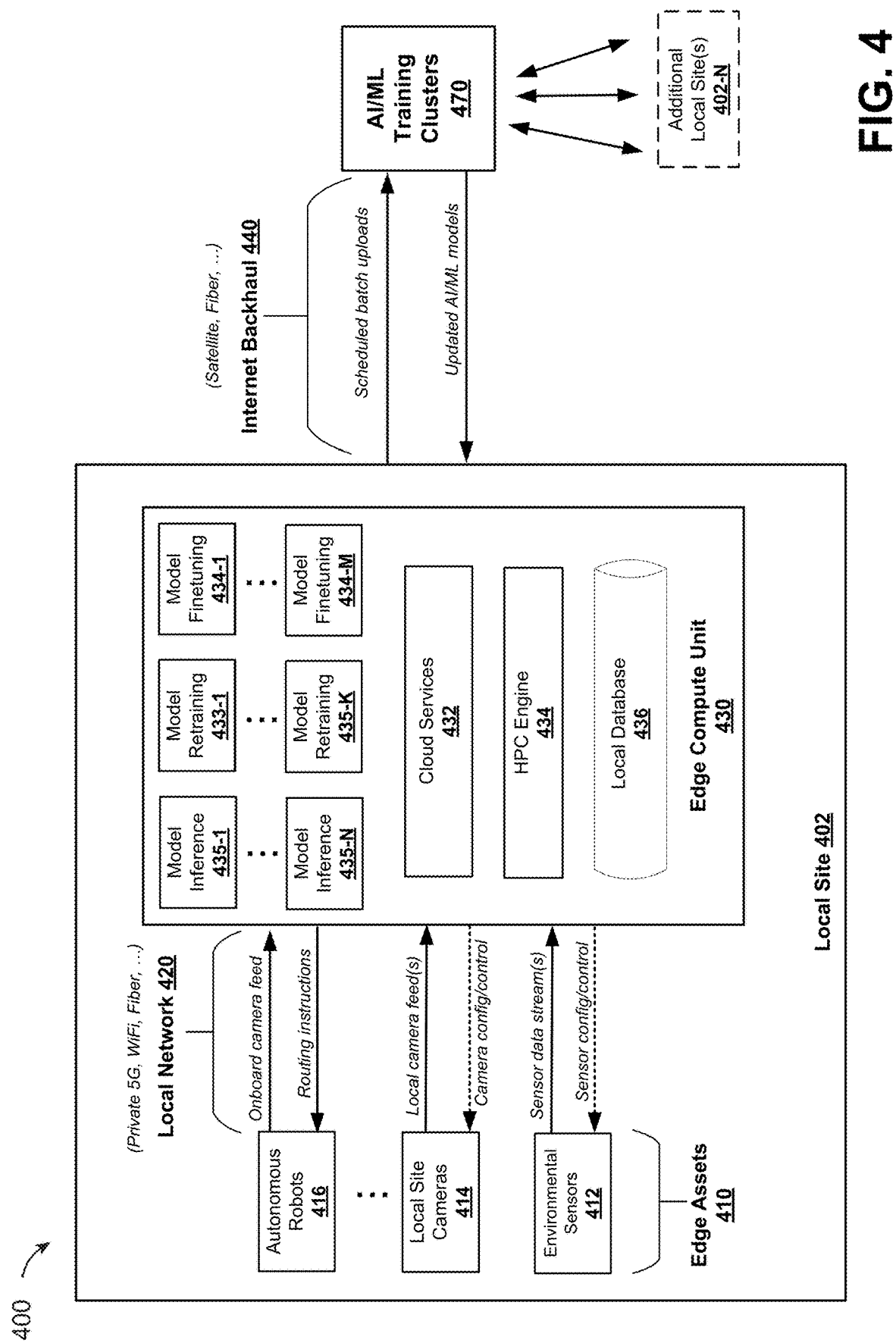
FIG. 4 is a diagram illustrating an example of an edge computing system for machine learning (ML) and/or artificial intelligence (AI) workloads, where the edge computing system includes one or more local sites each having one or more edge compute units, in accordance with some examples.

FIG. 4 is a diagram illustrating an example of an edge computing system 400 for machine learning (ML) and/or artificial intelligence (AI) workloads, where the edge computing system includes one or more local sites each having one or more edge compute units, in accordance with some examples.

For example, a local site 402 can be one of a plurality of local sites associated with the edge computing system 400 and/or the presently disclosed AI/ML edge computation platform. For example, the plurality of local sites can include the local site 402 and some quantity N of additional local sites 402-N, each of which may be the same as or similar to the local site 402 described below with respect to FIG. 4. The local site 402 can be a geographic location associated with an enterprise or other use of the presently disclosed AI/ML edge computation platform. The local site 402 can also be an edge location in terms of data network connectivity (i.e., local site 402 is both a local geographic location of an enterprise user and is an edge location in the corresponding data network topography).

In the example of FIG. 4, the local site 402 includes one or more edge compute units 430. Each edge compute unit 430 can be configured as a containerized edge compute unit or data center for implementing sensor data generation or ingestion and inference for one or more trained ML/AI models provided on the edge compute unit 430. For instance, edge compute unit 430 can include computational hardware components configured to perform inference for one or more trained AI/ML models. As illustrated, a first portion of the edge compute unit 430 hardware resources can be associated with or used to implement inference for a first AI/ML model 435-1, . . . , and an N-th AI/ML model 435-N. In other words, the edge compute unit 430 can be configured with compute hardware and compute capacity for implementing inference using a plurality of different AI/ML models. Inference for the plurality of AI/ML models can be performed simultaneously or in parallel for multiple ones of the N AI/ML models 435-1, . . . 435-N. In some aspects, inference can be performed for a first subset of the N AI/ML models for a first portion of time, can be performed for a second subset of the N AI/ML models for a second portion of time, etc. The first and second subsets of the AI/ML models can be disjoint or overlapping.

In some embodiments, edge compute unit 430 can include computational hardware components that can be configured to perform training, retraining, finetuning, etc., for one or more trained AI/ML models. In some aspects, at least a portion of the computational hardware components of edge compute unit 430 used to implement the AI/ML model inference 435-1, . . . , 435-N can also be utilized to perform AI/ML model retraining 433-1, . . . , 433-K and/or to perform AI/ML model finetuning 434-1, . . . , 434-M. For example, computational hardware components (e.g., CPUs, GPUs, NPUs, hardware accelerators, etc.) included in the edge compute unit 430 may be configured to perform various combinations of model inference, model retraining, and/or model finetuning at the edge (e.g., at the local edge site 402). At least a portion of the K AI/ML models 433-1, . . . , 433-K associated with model retraining at the edge can be included in the N AI/ML models associated with model inference at the edge. Similarly, at least a portion of the M AI/ML models 434-1, . . . , 434-M associated with model finetuning at the edge can be included in the N AI/ML models associated with model inference at the edge.

In some embodiments, for a given pre-trained AI/ML model received at the edge compute unit 430 (e.g., received from the AI/ML training clusters 470 in the cloud), the edge compute unit 430 can be configured to perform one or more (or all) of model inference 435, model retraining 433, and/or model finetuning 434 at the edge.

As illustrated in FIG. 4, retraining for a plurality of AI/ML models can be performed simultaneously or in parallel for multiple ones of the K AI/ML models 433-1, . . . , 435-K (which as noted above can be the same as or similar to the N AI/ML models 435-1, . . . , 435-N, or may be different; and/or can be the same as or similar to the M AI/ML models 434-1, . . . , 434-M, or may be different). In some aspects, retraining can be performed for a first subset of the K AI/ML models for a first portion of time, can be performed for a second subset of the K AI/ML models for a second portion of time, etc. The first and second subsets of the K AI/ML models can be disjoint or overlapping. Additionally, or alternatively, finetuning for a plurality of AI/ML models can be performed simultaneously or in parallel for multiple ones of the M AI/ML models 434-1, . . . , 434-M (which can be the same as, similar to, or disjoint from the N AI/ML models 435 and/or the K AI/ML models 433). In some aspects, finetuning can be performed for a first subset of the M AI/ML models for a first portion of time, can be performed for a second subset of the M AI/ML models for a second portion of time, etc. The first and second subsets of the M AI/ML models can be disjoint or overlapping.

Each edge compute unit 430 of the one or more edge compute units provided at each local site 402 of the plurality of local sites 402-N can additionally include cloud services 432, a high-performance compute (HPC) engine 434, and a local database 436. In some aspects, HPC engine 434 can be used to implement and/or manage inference associated with respective ones of the trained AI/ML models 435-1, . . . , 435-N provided on the edge compute unit 430.

In one illustrative example, the edge compute unit 430 can receive the trained AI/ML models 435-1, . . . , 435-N from a centralized AI/ML training clusters engine 470. The AI/ML training clusters engine 470 can be used to perform training (e.g., pre-training) of AI/ML models that can later be deployed to the edge compute unit 430 for inference and/or other implementations at the edge. For instance, the AI/ML training clusters 470 can be implemented in the cloud, as a central data center or on-premises infrastructure for the local site(s) 420, etc. Data network connectivity between edge compute unit 430 and AI/ML training clusters 470 can be provided using one or more internet backhaul communication links 440. For instance, the internet backhaul 440 can be implemented as a fiber communication link (e.g., wired fiber optic connectivity from the local site 402/edge compute unit 430 to internet infrastructure that is connectable to the AI/ML training clusters 470; a direct or point-to-point wired fiber optic connectivity from the local site 402/edge compute unit 430 to the AI/ML training clusters 470; etc.).

The internet backhaul 440 may additionally, or alternatively, be implemented using one or more satellite communication links. For instance, internet backhaul 440 can be a wireless communication link between edge compute unit 430/local site 402 and a satellite of a satellite internet constellation (e.g., such as the satellite internet constellation depicted in FIG. 2 and/or FIG. 3, etc.). In some examples, internet backhaul link 440 can be the same as or similar to one or more of the satellite internet constellation links 214, 212, 216, of FIG. 2 (in which example the UE 230 of FIG. 2 can be the same as or similar to the edge compute unit 430 of FIG. 4 and network 210 of FIG. 2 can be the internet providing a connection to AI/ML training clusters 470 of FIG. 4).

In another illustrative example, the internet backhaul link 440 may be the same as or similar to one or more of the satellite internet constellation links 352, 362a, 362b, 364, 354, 374, 372, etc. of FIG. 3 and the satellite internet constellation 300. In such examples, the edge compute unit 430/local site 402 can be represented as being the same as or similar to the UE 330 of FIG. 3; the AI/ML training clusters 470 of FIG. 4 can be the same as or similar to the data center 340 of FIG. 3, connected to the UE 330 (e.g., edge compute unit 430) via the satellite internet constellation links (e.g., internet backhaul link 440). Continuing in the example above, where edge compute unit 430 of FIG. 4 is the same as or similar to UE 330 of FIG. 3, in some aspects, it is contemplated that the edge compute unit 430 can include (or otherwise be associated with) one or more satellite transceivers for implementing satellite connectivity to and/or from the edge compute unit 430. For instance, the edge compute unit 430 can be the same as or similar to UE 330 of FIG. 3, and may include, be communicatively coupled with, and/or otherwise associated with one or more of the satellite transceivers 312, 314, 316 of FIG. 3. In some aspects, the one or more satellite transceivers can be integrated in or coupled to a housing (e.g., container, where edge compute unit 430 is a containerized data center) of the edge compute unit 430 and used to provide satellite connectivity capable of implementing the internet backhaul link 440 of FIG. 4. In another example, the one or more satellite transceivers can additionally, or alternatively, be provided at the local site 402 where edge compute unit 430 is deployed.

In some aspects, the internet backhaul link 440 between edge compute unit 430 and AI/ML training clusters 470 can be used to provide uplink (e.g., from edge compute unit 430 to AI/ML training clusters 470) of scheduled batch uploads of information corresponding to one or more of the AI/ML models 435-1, . . . , 435-N implemented by the edge compute unit 430, corresponding to one or more features (intermediate or output) generated by the AI/ML models implemented by edge compute unit 430, and/or corresponding to one or more sensor data streams generated by edge assets 410 provided at local site 402 and associated with the edge compute unit 430, etc. The internet backhaul link 440 may additionally be used to provide downlink (e.g., from AI/ML training clusters 470 to edge compute unit 430) of updated, re-trained, fine-tuned, etc. AI/ML models. For instance, as will be described in greater depth below, the updated, re-trained, or fine-tuned AI/ML models transmitted over internet backhaul link 440 from AI/ML training clusters 470 to edge compute unit 430 can be updated, re-trained, or fine-tuned based on the scheduled batch upload data transmitted on the uplink from edge compute unit 430 to AI/ML training clusters 470. In some aspects, the updated AI/ML models transmitted from AI/ML training clusters 470 to edge compute unit 430 can be updated versions of the same AI/ML models 435-1, . . . , 435-N already implemented on the edge compute unit 430 (e.g., already stored in local database 436 for implementation on edge compute unit 430). In other examples, the updated AI/ML models transmitted from AI/ML training clusters 470 to edge compute unit 430 can include one or more new AI/ML models that are not currently (and/or were not previously) included in the set of AI/ML models 435-1, . . . , 435-N that are either implemented on edge compute unit 430 or stored in local database 436 for potential implementation on edge compute unit 430.

In some cases, the AI/ML distributed computation platform 400 can use the one or more edge compute units 430 provided at each local site 402 to perform local data capture and transmission. In particular, the locally captured data can be obtained from one or more local sensors and/or other edge assets 410 provided at the local site 402. For instance, in the example of FIG. 4, the local edge assets/sensors 402 can include, but are not limited to, one or more autonomous robots 416, one or more local site cameras 414, one or more environmental sensors 412, etc. The local sensors and edge assets 410 can communicate with the edge compute unit 430 via a local network 420 implemented at or for local site 402.

For instance, local network 420 can be used to provide one or more communication links between the edge compute unit 430 and respective ones of the edge assets 410. In one illustrative example, local network 420 can be implemented as a private LTE, 4G, 5G or other private cellular network; can be implemented as a public LTE, 4G, 5G or other public cellular network; can be implemented as a WiFi, Bluetooth, Zigbee; Z-wave; Long Range (LoRa), Sigfox, Narrowband-IoT (NB-IoT), LTE for Machines (LTE-M), IPv6 Thread, or other short-range wireless network; can be implemented as a local wired or fiber-optic network; etc. As illustrated in the example of FIG. 4, the edge compute unit 430 can receive different types of data from different ones of the edge assets/sensors 410 and can transmit different types of configurations/controls to different ones of the edge assets/sensors 410. For instance, the edge compute unit 430 can receive onboard camera feed and other sensor information (including SLAM sensor information) from the autonomous robots 416, and can transmit in response routing instructions to the autonomous robots 416. The routing instructions can be generated or otherwise determined based on processing the onboard camera feed data from the autonomous robots 416 using an appropriate one (or more) of the trained AI/ML models 435-1, . . . , 435-N implemented on the edge compute unit 430 and/or using the HPC engine 434 of the edge compute unit 430.

In another example, the edge compute unit 430 can receive local camera feed(s) information from the local site cameras 414 and can transmit in response camera configuration and/or control information to the local site cameras 414. In some cases, the edge compute unit 430 may receive the local camera feed(s) information from the local site cameras 414 and transmit nothing in response. For instance, the camera configuration and/or control information can be used to re-position or re-configure one or more image capture parameters of the local site cameras 414—if no re-positioning or image capture parameter reconfiguration is needed, the edge compute unit 430 may not transmit any camera configuration/control information in response. In some aspects, the camera configuration and/or control information can be generated or otherwise determined based on processing the local camera feed data from the local site cameras 414 using an appropriate one (or more) of the trained AI/ML models 435-1, . . . , 435-N implemented on the edge compute unit 430 and/or using the HPC engine 434 of the edge compute unit 430.

In another example, the edge compute unit 430 can receive environmental sensor data stream(s) information from the environmental sensors 412 and can transmit in response sensor configuration/control information to the environmental sensors 412. In some cases, the edge compute unit 430 may receive the sensor data streams information from the environmental sensors 412 and transmit nothing in response. For instance, the sensor configuration and/or control information can be used to adjust or re-configure one or more sensor data ingestion parameters of the environmental sensors 412—if no adjustment or re-configuration of the environmental sensors 412 is needed, the edge compute unit 430 may not transmit any sensor configuration/control information in response. In some aspects, the sensor configuration and/or control information can be generated or otherwise determined based on processing the local environmental sensor data streams from the environmental sensors 412 using an appropriate one (or more) of the trained AI/ML models 435-1, . . . , 435-N implemented on the edge compute unit 430 and/or using the HPC engine 434 of the edge compute unit 430.

In some examples, the systems and techniques described herein can be used to drive local storage, inference, prediction, and/or response, performed by an edge compute unit (e.g., edge compute unit 430) with minimal or no reliance on cloud communications or cloud offloading of the computational workload (e.g., to cloud or on-premises AI/ML training clusters 470). The edge compute unit 430 can additionally be used to locally perform tasks such as background/batch data cleaning, ETL, feature extraction, etc. The local edge compute unit 430 may perform inference and generate prediction or inference results locally, for instance using one or more of the trained (e.g., pre-trained) AI/ML models 435-1, . . . , 435-N received by edge compute unit 430 from AI/ML training clusters 470. The local edge compute unit 430 may perform further finetuning or instruction tuning of the pre-trained model to a specified task (e.g., corresponding to at least one of model finetuning 433-1, . . . , 433-M, as described previously above).

The prediction or inference results (and/or intermediate features, associated data, etc.) can be compressed and periodically uploaded by edge compute unit 430 to the cloud or other centralized location (e.g., an on-premises location or data center, such as AI/ML training clusters 470 etc.). In one illustrative example, the compressed prediction or inference results can be uploaded to the cloud via a satellite communication link, such as a communication link to a satellite internet constellation configured to provide wireless satellite connectivity between the edge compute unit and existing terrestrial internet infrastructure. For instance, the compressed prediction or inference results can be included in the scheduled batch uploads transmitted over internet backhaul link 440 from edge compute unit 430 to AI/ML training clusters 470. In some cases, the prediction or inference results can be utilized immediately at the edge compute unit 430, and may later be transmitted (in compressed form) to the cloud or centralized location (e.g., AI/ML training clusters 470). In some aspects, satellite connectivity can be used to provide periodic transmission or upload of compressed prediction or inference results, such as periodic transmission during high-bandwidth or low-cost availability hours of the satellite internet constellation. In some cases, some (or all) of the compressed prediction or inference results can be transmitted and/or re-transmitted using wired or wireless backhaul means where available, including fiber-optic connectivity for internet backhaul, etc.

Notably, the systems and techniques can implement the tasks and operations described above locally onboard one or more edge compute units 430, while offloading more computationally intensive and/or less time-sensitive tasks from the edge compute unit to the cloud AI/ML training clusters 470. For instance, the AI/ML training clusters 470 can be used to provide on-demand AI/ML model training and fine tuning, corresponding to the updated AI/ML models shown in FIG. 4 as being transmitted from AI/ML training clusters 470 to edge compute unit 430 via internet backhaul 440. In some aspects, the AI/ML training clusters 470 can implement thousands of GPUs or other high-performance compute hardware, capable of training or fine-tuning an AI/ML model using thousands of GPUs for extended periods of time (e.g., days, weeks, or longer, etc.). In some aspects, AI/ML training clusters 470 can additionally, or alternatively, be used to perform on-cloud model compression and optimization prior to transmitting data indicative of the trained AI/ML models 435-1, . . . , 435-N to the edge compute unit 430 for local implementation using the sensor data generated by the associated edge assets 410. In some embodiments, the edge compute unit 430 can be configured to perform a scheduled or periodic download of fresh (e.g., updated or new) AI/ML models from AI/ML training clusters 470 via the internet backhaul link 440 (e.g., the updated or new AI/ML models can be distributed from AI/ML training clusters 470 to edge compute unit 430 in a pull fashion). In other examples, the updated or new AI/ML models can be distributed from AI/ML training clusters 470 to edge compute unit 430 in a push fashion, wherein the AI/ML training clusters 470 transmit the updated or new models to the edge compute unit 430 via internet backhaul link 440 as soon as the updated or new AI/ML model becomes available at the AI/ML training clusters 470.

Training the AI/ML models 435-1, . . . , 435-N may require massive amounts of data and processing power, which can be more efficiently implemented at the AI/ML training clusters 470 (and shared across the plurality of local site 402-N edge compute units 430) rather than implementing individually at each of the local sites 402-N and corresponding edge compute unit(s) 430. In some aspects, the quality of an AI/ML model can be directly correlated with the size of the training and testing (e.g., validation) data used to perform the training. Furthermore, in many cases, training large AI/ML models requires running thousands of GPUs, ingesting hundreds of terabytes of data, and performing these processes over the course of several weeks. Accordingly, in many cases, large-scale ML/AI model training is suited best for cloud or on-premises infrastructure and sophisticated MLOps. For instance, the training dataset associated with training a large-scale AI/ML model can be on the order of hundreds of TB—tens of petabytes (PB), or even larger. Thousands of GPUs and hours to weeks of training time can be needed, with the resulting size of the uncompressed, trained model exceeding hundreds or thousands of GB.

ML or AI inference (e.g., inference using a trained ML or AI model), on the other hand, can be implemented using far fewer resources than training, and may performed efficiently at the edge (e.g., by edge compute unit(s) 430 associated with the local site(s) 402 or 402-N). Indeed, in many cases, edge inferencing will provide better latency than cloud inferencing, as input sensor data generated at the edge (e.g., using edge assets 410) does not need to transit over an internet backhaul link 440 to the cloud region (e.g., cloud region associated with AIU/ML training clusters 470) before inference can begin. Accordingly, it is contemplated herein that the trained AI/ML models 435-1, . . . , 435-N can be created and trained in the cloud (e.g., at AI/ML training clusters 470), and additionally can be optimized and compressed significantly, enabling the systems and techniques described herein to distribute the optimized, compressed, and trained AI/ML models 435-1, . . . , 435-N to the edge locations associated with local sites 402 and corresponding edge compute unit(s) 430 where the optimized, compressed, and trained AI/ML models will be implemented for inferencing at the edge using local sensor data from edge assets 410.

For instance, the edge compute unit 430 can use one or more of the trained AI/ML models 435-1, . . . , 435-N to perform edge inferencing based on input data comprising the locally/edge-generated sensor data streams obtained from the edge assets 410 provided at the same local site 402 as the edge compute unit 430. In some aspects, the input data set for edge inferencing performed by edge compute unit 430 can comprise the real-time data feed from edge assets/sensors 410, which can be between tens of Mbps to 10s of Gbps (or greater). The edge compute unit 430 can, in at least some embodiments, include 10s of GPUs for performing local inferencing using the trained AI/ML models 435-1, . . . , 435-N. By performing local inferencing at edge compute unit 430, an inference response time or latency on the order of milliseconds (ms) can be achieved, significantly outperforming the inference response time or latency achievable using cloud-based or on-premises remote inferencing solutions.

In some aspects, the systems and techniques can be configured to implement a continuous feedback loop between edge compute unit(s) 430 and the AI/ML training cluster(s) 470. For instance, the continuous feedback loop can be implemented based on using the edge compute unit(s) and associated edge assets/sensors 410 to capture data locally, perform inference locally, and respond (e.g., based on the inference) locally. The edge compute unit(s) 430 can be additionally used to compress and transmit features generated during inference from the source data and/or to compress and transmit inference results efficiently to the AI/ML training clusters 470 (among other cloud or on-premises locations). In the continuous feedback loop, training and fine-tuning can subsequently be performed in the cloud, for instance by AI/ML training clusters 470 and using the batch uploaded sensor data and/or features uploaded by the edge compute unit(s) 430 to AI/ML training clusters 470. Based on the training and fine-tuning performed in the cloud by the AI/ML training clusters 470, new or updated AI/ML models are distributed from the AI/ML training clusters 470 back to the edge (e.g., to the edge compute unit(s) 430 and local site(s) 402). This continuous feedback loop for training and fine-tuning of AI/ML models can be seen to optimize the usage of cloud, edge, and bandwidth resources. The same AI/ML model may be finetuned across multiple edge nodes to optimize the usage of available compute at the nodes and the cloud. For instance, an AI/ML model can be finetuned across a set of edge nodes comprising at least the edge compute unit 430 and one or more edge compute units included in the additional local sites 402-N. In some cases, the distributed finetuning of an AI/ML model across multiple edge nodes can be mediated, supervised, and/or controlled, etc., by the AI/ML training clusters engine 470 (e.g., or various other cloud entities). In some examples, the distributed finetuning of an AI/ML model across multiple edge nodes can be supervised and/or controlled, etc., by a selected one or more edge nodes of the set of edge nodes associated with the distributed finetuning of the model. In one illustrative example, distributed finetuning or retraining of an AI/ML model across multiple edge nodes can be orchestrated by a respective fleet management client 770 of FIG. 7 that is implemented at or by each of the multiple edge nodes.

Edge AI/ML Monitoring and Management Platform—Software Stack and Services

FIG. 5 is a diagram illustrating an example software stack 500 associated with implementing an edge computing system for ML and/or AI workloads, in accordance with some examples. In particular, FIG. 5 depicts an example platform software stack 502 that can be used to provide single pane management of a fleet of deployed edge compute units, connected sensors and assets associated with an edge compute unit, and/or one or more AI/ML models that are pre-trained and deployed on an edge compute unit to process or otherwise analyze raw sensor data generated by the connected sensors and assets associated with the edge compute unit.

As illustrated, the example platform software stack 502 can include domain-specific application services 560, such as the example computer vision services 562 and industrial internet of things (IIoT) services 564 that are depicted as specific examples of domain-specific application services. The example platform software stack 502 can additionally include a qualified application repository 550, which can be implemented as a repository of pre-trained and/or pre-configured AI and/or ML applications capable of running on the edge compute unit to perform specific tasks or computations using specific types of sensors and/or sensor data streams available to or otherwise associated with the edge computing device. In some aspects, the qualified application repository 550 can be implemented as an application marketplace for third-party AI and/or ML applications that can be deployed to the edge compute unit for providing particular or desired computational capabilities and workflows. In comparison to the domain-specific application services 560, it is contemplated that in at least some embodiments, the domain-specific application services 560 can be provided as first-party or platform-level AI and/or ML applications and associated services, while the qualified application repository 550 can be used to provide third-party or developer-level AI and/or ML applications and associated services for implementation on the edge compute unit.

In some aspects, the platform software stack 502 can further include native or platform applications 540. In some embodiments, the application repository 550 can be a cloud-based repository of qualified AI/ML applications for deployment on one or more edge compute units 430. For instance, the application repository 550 can be a cloud-based marketplace for the management of customer and platform ML/AI applications. In some cases, customer applications can be third-party/developer applications, and the platform applications may be the same as or similar to the native/platform applications 540 and/or the domain-specific application services 560.

The native/platform applications 540 can be differentiated from the domain-specific application services 560 on the basis that the native/platform applications 540 are provided in a manner the same as or similar to the third-party or developer level AI/ML applications 550, in that both the native/platform applications 540 and third-party AI/ML applications 550 can be configured to perform a specific sensor data processing or analysis task that may make use of or call one or more of the domain-specific application services 560. In other words, the domain-specific application services 560 can be implemented as modules, engines, APIs, etc., that are configured to perform specific tasks in a generic manner that is independent of the specific implementation or intended use case of one of the native/platform applications 540 or third-party/developer applications 560.

For instance, FIG. 5 depicts the example domain-specific application services 560 in the form of computer vision services 562 and IIoT services 564. Various additional domain-specific application services 560 can be implemented or provided without departing from the scope of the present disclosure. For instance, the domain-specific application services 560 can include one or more of natural language services 563, reinforcement learning services 566, augmented and mixed reality services 565, robotic platform services 567, and/or localization, mapping, and navigation services 568, etc., among various other services. In one illustrative example, a domain-specific application service 560 (such as computer vision services 562) can be utilized by one or more native/platform applications 540 and can be utilized by one or more third-party/developer applications 550. For instance, the native/platform applications 540 can include a native/platform object recognition application that can be configured to perform object recognition of a specified object type or class within a specified or selected type of input data (e.g., human recognition in FUR camera data). To implement the human recognition in FLIR data native/platform application 540, a corresponding native/platform application 540 can be provided that makes use of the computer vision services 562 to provide the recognition functionality. In other words, the native/platform application 540 can be built on top of or incorporating the computer vision services 562, with the native/platform application 540 performing tasks such as data ingestion, organization, pre-processing, etc., that are needed to convert the raw FLIR camera data into the expected or required input format for processing the FUR camera data using the computer vision services 562.

A similar structure can be utilized for implementing the third-party/developer applications 550 to make use of the various domain-specific application services 560. In some aspects, a same or similar functionality can be provided by the third-party/developer applications 550 and the native/platform applications 540. In other examples, one or more functionalities and/or domain-specific application services 560 may be configured for use exclusively by one or more of the native/platform applications 540 (e.g., without the possibility of overlapping, same, or similar functionality by one of the third-party/developer applications 550). In some cases, the native/platform applications 540 can be implemented as Docker or Kubernetes Container environments that are deployable on or to the edge compute units described herein. In some aspects, native/platform applications 540 may be made available and/or distributed using the same marketplace mechanism associated with distributing the third-party/developer applications (e.g., the qualified application repository 550 may, in some embodiments, include both first-party platform/native applications 540 and third-party/developer applications). In other examples, native/platform applications 540 may be pre-loaded or pre-configured on the edge compute unit(s) at the time of deployment, with only the third-party/developer applications 550 being configurable or loadable to the edge compute unit at a later time (e.g., via selection in the qualified application repository 550).

In some embodiments, the platform software stack 502 can additionally include one or more knowledge bases and/or local data storages 545, which may be associated with and utilized by one or more of the third-party AI/ML applications 550 and/or one or more of the native platform applications 540. For instance, some applications may require knowledge bases and databases 545 to be hosted locally for use by the applications. The knowledge bases and databases 545 can be used to store information corresponding to a particular task or analytical/data processing operation implemented by an application that uses the knowledge bases and databases 545. In some cases, the knowledge bases and databases 545 can be logically delineated or separated on the basis of the corresponding application(s) that make use of each given one of the knowledge bases and databases 545. In some cases, the knowledge bases and databases 545 can be combined for different applications. In some embodiments, the knowledge bases and databases 545 can be included in and/or otherwise associated with the local database 436 of FIG. 4. In some aspects, one or more of the knowledge bases and databases 545 can be implemented locally at the edge (e.g., at local edge site 402 of FIG. 4), can be implemented in the cloud (e.g., a cloud associated with AI/ML training clusters 470 of FIG. 4), and/or can be implemented as a combination of edge and cloud resources.

The knowledge bases and databases 545 may also be referred to herein as a "local datastore/knowledge base" and/or a "local datastore and knowledge base." In some aspects, the local datastore and knowledge base can include content and information obtained over a data network such as the internet. For instance, local datastore and knowledge base content and information can be populated, updated, deliver, etc., via the internet backhaul link 440 shown in FIG. 4 between the local edge site 402 and the cloud cluster(s) 470. In some embodiments, local datastore and knowledge base 545 can be served content over a satellite internet constellation-based CDN (e.g., such as a satellite CDN described previously above with respect to FIG. 3). In some embodiments, the local datastore and knowledge base(s) 545 can be implemented at the edge compute unit 430 of FIG. 4, as noted above. It is further noted that the local datastore and knowledge base(s) 545 can be implemented based on or corresponding to a respective edge compute unit service (e.g., a corresponding edge service for local datastore and knowledge base(s) 545 can be included in the edge compute unit services 605 of FIG. 6, described subsequently below).

In one illustrative example, the local datastore and knowledge base(s) 545 can include publicly available data network content (e.g., web content). Notably, the local datastore and knowledge base(s) 545 can further include domain or niche knowledge of processes, devices, assets, personnel, tasks, tools, activities, etc., that are pertinent to the local and global operations of a user (e.g., enterprise user) of the edge compute unit and associated platform system(s) of the present disclosure. In some aspects, this domain or niche knowledge represented within the local datastore and knowledge base(s) 545 can be broadly referred to as domain-specific information, task-specific information, operations-specific information, private, proprietary or non-public information, etc. For instance, the local datastore and knowledge base(s) 545 can include domain or operations-specific data generated at the edge and ingested to one or more edge compute units 430 within the fleet of edge compute units of an enterprise user. This local domain or operation-specific edge-generated information may include, but is not limited to, information such as maintenance records, user reports, machine reports and logs, work summaries, activity reports, device/asset manuals, sensor specifications, etc.—some (or all) of which may be consumed at the edge by one or more AI/ML models. For instance, information and data from local datastore and knowledge base(s) 545 can be consumed at the edge during inference using one or more trained AI/ML models, may be consumed at the edge during retraining of one or more pre-trained AI/ML models, and/or may be consumed at the edge during finetuning of one or more pre-trained AI/ML models.

In some examples, the local datastore and knowledge base(s) 545 can include data that may be used for finetuning and/or instructing one or more AI/ML models for performing a specific task at the edge. For instance, the local datastore and knowledge base(s) 545 can include data for finetuning and/or instructing one or more of the AI/ML models 435-1, . . . , 435-N of edge compute unit 430 of FIG. 4 for performing a specific inference task at the edge. Local datastore and knowledge base 545 data can be utilized for one or more of the model finetuning instances 434-1, . . . , 434-M depicted for edge compute unit 430 in FIG. 4 and/or can be utilized for one or more of the model retraining instances 433-1, . . . , 433-K also depicted for edge compute unit 430 in FIG. 4.

In some aspects, the platform software stack 502 can further include a telemetry and monitoring engine 530 (also referred to herein as the "observer" or "observer engine"), a remote fleet management control plane 520, and a secure edge operating system (OS) 510. In some examples, one or more of the components of platform software stack 502 can be implemented in the cloud (e.g., remote from the edge, such as remote from the local site 402 and/or edge compute unit 430 of FIG. 4). Components of platform software stack 502 that are implemented in the cloud may be implemented with and/or collocated with the AI/ML training clusters 470 of FIG. 4, or may be separate from the AI/ML training clusters 470 of FIG. 4. In some cases, one or more of the components of platform software stack 502 can be implemented at the edge, for instance at local site 402 and/or on edge compute unit 430 of FIG. 4.

In one illustrative example, the domain-specific application services 560 can be implemented in the cloud, can be implemented at the edge, or can be implemented using a combination of cloud and edge deployments. For instance, domain-specific application services 560 may be provided locally on edge compute unit 430 of FIG. 4, particularly for instances where a given domain-specific application service 560 is used often by the edge compute unit 430 (e.g., is called or used by an application or AI/ML model running on the edge compute unit 430 of FIG. 4, such as a third-party/developer application from repository 550 and/or a native/platform application 540). In some examples, domain-specific application services 560 may be provided as cloud services that are reached from edge compute unit 430 via internet backhaul link 440. For instance, domain-specific application services 560 that are rarely or have yet to be used by edge compute unit 430 can remain as cloud services until a greater need emerges at some point in the future for the domain-specific application service 560 to be implemented locally at edge compute unit 430.

For instance, the process of installing a new AI/ML application or model to edge compute unit 430 (either in the form of a third-party application from repository 550 or in the form of a native/platform application 540) can include checking the application to be installed for dependencies on one or more domain-specific application services 560. A first portion of the dependencies for the to-be-installed application may already reside at the edge (e.g., may already be installed or available at edge compute unit 430) and no further action is needed. A second or remaining portion of the dependencies for the to-be-installed application may be new to the edge compute unit 430 of FIG. 4 (i.e., are not yet installed or available at the edge/at edge compute unit 430). In this case, installing a new AI/ML application to edge compute unit 430 can include obtaining and/or installing local edge copies or implementations of one or more domain-specific application services 560 that are needed or used by the to-be-installed application and were identified as not yet residing at the edge.

In some embodiments, the qualified application repository 550 (e.g., implemented as a marketplace of third-party AI/ML applications for edge compute unit 430) can reside in the cloud, with individual ones of the available AI/ML applications installed to edge compute units 430 based on an enterprise user selection of the AI/ML applications from the cloud-hosted qualified application repository 550. Similarly, native/platform applications 540 may reside in the cloud prior to installation on the edge compute unit 430. In some embodiments, some (or all) of the native/platform applications 540 can be pre-installed or pre-configured locally on the edge compute units, and may optionally be made also available in the cloud.

The observer engine 530 (e.g., telemetry and monitoring engine 530) can be implemented at the edge (e.g., on edge compute units 430) and/or can be implemented in the cloud. For instance, each edge compute unit 430 can run an instance of the observer engine 530 (or a portion thereof) locally, to capture telemetry and other critical environmental monitoring and observation data at the edge compute unit 430 and/or local site 402 associated with the edge compute unit 430. The telemetry and monitoring data from the local instance of the observer engine 530 at each edge compute unit 430 can be transmitted to a corresponding observer engine instance 530 running in the cloud.

For example, the local observer engine 530 instance at edge compute unit 430 can upload host and satellite constellation level metrics to a global observer engine instance that is associated with the cloud-based remote fleet management control plane 520. The cloud-based remote fleet management control plane 520 can be used to provide a single pane of glass interface to the fleet of edge compute units 420 and local sites 402 (e.g., 402, . . . , 402-N), and can display the observer engine telemetry and monitoring data from various edge compute units 430 using a global management console (also referred to herein as a global management portal). For instance, the remote fleet management control plane 520 can include or provide one or more graphical user interfaces (GUIs) indicative of various telemetry and monitoring data obtained from the deployed edge compute units 430 and local sites 402 (e.g., such as the GUIs 800 and 900 of FIGS. 8 and 9, respectively, discussed in greater detail below).

The secure edge OS 510 can be installed on the edge compute units 430, and may be used to provide operating system functionality for implementing computation operations and other functionalities at the edge compute unit 430 itself. The secure edge OS 510 can additionally be used to provide an interface and communications between the edge compute unit 430 and the remaining portions of the platform software stack 502. For instance, the secure edge OS 510 can be configured to communicate with the cloud-based components of the platform software stack 502, including the observer engine 530, remote fleet management control plane 520, domain-specific application services 560, qualified application repository 550, and/or native/platform applications 540.

FIG. 6 is a diagram illustrating an example architecture 600 for implementing platform (e.g., global) services 602 and edge compute services 605 of an edge computing system for ML and/or AI workloads, in accordance with some examples. In some embodiments, the platform services 602 of FIG. 6 can be the same as or similar to the platform software stack 502 of FIG. 5. In some cases, the edge compute services 605 of FIG. 6 can be the same as or similar to one or more services implemented on or for the edge compute unit 430 of FIG. 4. For instance, then edge compute services 605 of FIG. 6 can be deployed to and/or utilized by an edge compute unit such as edge compute unit 430 of FIG. 4.

In some aspects, the platform services 602 can include an application repository 650, which may be the same as or similar to the qualified application repository 550 of FIG. 5; a telemetry and monitoring observer engine 630, which may be the same as or similar to the telemetry and monitoring observer engine 530 of FIG. 5; and a global management console 620 that may be the same as or similar to the remote fleet management control plane 520 of FIG. 5. For instance, global management console 620 can be used to display one or more of the example GUIs 800 and 900 depicted in FIGS. 8 and 9, respectively. The platform services 602 can additionally include a Software-Defined Networking (SDN) network configuration service 660, a device/asset lifecycle management (DLM) engine 670, and a satellite edge connectivity management engine 680, each of which are described in turn below.

With respect to the edge compute unit services 605 of FIG. 6, as illustrated the edge compute unit services 605 can include user and platform applications 655, SDN network provisioning and management engine 665, a fleet management daemon 673, cloud connector services 677, a telemetry and monitoring stack 635, bare metal services 617, an edge OS 615, and a local management console 625. In some aspects, the user and platform applications 655 can be the same as or similar to (and/or can include) the trained AI/ML model inference instances 435-1, . . . , 435-N depicted in and described above with respect to the edge compute unit 430 of FIG. 4. The user and platform applications 655 of FIG. 6 can additionally be associated with one or more (or all) of the AI/ML model retraining instances 433-1, . . . , 435-K depicted within edge compute unit 430 of FIG. 4. In some aspects, the user and platform applications 655 of FIG. 6 can be additionally associated with one or more (or all) of the AI/ML mode finetuning instances 434-1, 434-M depicted within edge compute unit 430 of FIG. 4. In some cases, the SDN network provisioning and management engine 665 of the edge compute unit services 605 can correspond to the SDN network configuration service 660 of the platform services 602. In some embodiments, the fleet management daemon 673 can be associated with the cloud-based DLM engine 670 of the platform services 602. The edge-based telemetry and monitoring stack 635 can correspond to the cloud-based telemetry and monitoring observer engine 630 of the platform services 602. In some examples, the edge OS 615 can be the same as or similar to the secure edge OS 510 of FIG. 5.

In some embodiments, the edge compute unit services 605 can include one or more edge services associated with implementing, maintaining, updating, using, etc., local datastore and knowledge base information at and for an edge compute unit. For instance, the edge compute unit services 605 can include one or more edge services associated with implementing, maintaining, updating, using, etc., the local datastore and knowledge base(s) 545 depicted in FIG. 5 and described previously above. In some embodiments, one or more of the edge connector services 677 can be associated with implementing the local datastore and knowledge base (s) 545 of FIG. 5. In some aspects, one or more dedicated edge connector services (not shown) within the edge compute unit services 605 can be associated with implementing the local datastore and knowledge base(s) 545 of FIG. 5.

Global Management Console

In one illustrative example, the global management console 620 can provide users with single pane of glass access, insight, and/or management corresponding to each of the remaining modules of the platform services 602 and/or of the edge compute unit services 605. For instance, the global management console 620 can provide one or more GUIs corresponding to each of the platform services 602. For instance, the global management console 620 can be a cloud-hosted global management console configured to implement a comprehensive asset management portal.

In some embodiments, and as will be described in greater detail below, the global management console 620 can provide GUIs for monitoring, managing, configuring, interacting with, etc., one or more of: satellite internet constellation connectivity (e.g., based on information from the telemetry and monitoring observer engine 630 and/or satellite edge connectivity management engine 680 included in the platform services 602); host-level metrics (e.g., edge compute unit 430—level metrics) based on information from the telemetry and monitoring observer engine 630 included in the platform services 602 and/or the telemetry and monitoring stack 635 included in the edge compute unit services 605; support forms; management functions (e.g., pause/move satellite internet constellation connectivity service, change plans), login and administrative or user account management tasks; AI/ML marketplace and deployment functionality associated with the cloud-based AI/ML application repository 650 and edge-deployed AI/ML user and platform applications 655; user management; notifications and alarms; etc.

As contemplated herein, the global management console 620 can provide a comprehensive and unified software solution designed to simplify and streamline the management of an enterprise customer's fleet of edge-deployed assets, including edge compute units 430 and/or other connected sensors and edge assets 410 deployed at a local edge site 402 in conjunction with one or more edge compute units 430. In one illustrative example, global management console 620 can be configured to provide a single intuitive interface with one or more GUIs corresponding to each of the platform services 602 and/or corresponding to one or more of the edge compute unit services 605. Using the global management console 620 and its corresponding GUIs, the systems and techniques described herein can be used to implement complete and superior remote visibility and control over all aspects of edge asset and edge compute device 430 operations.

For instance, the global management console 620 can be used to provide physical asset management with full oversight of the location, power, storage, data, and connectivity associated with a fleet of edge compute devices 430 and connected edge assets 410 of a local edge site 402. The physical asset management provided by global management console 620 can be used to achieve optimal resource allocation and performance at the edge. The platform services 602 can be used to monitor real-time energy consumption, data usage, utilized storage, and/or network connectivity (among various other parameters and data streams) to minimize downtime and maximize efficiency at the edge.

Figure 9:
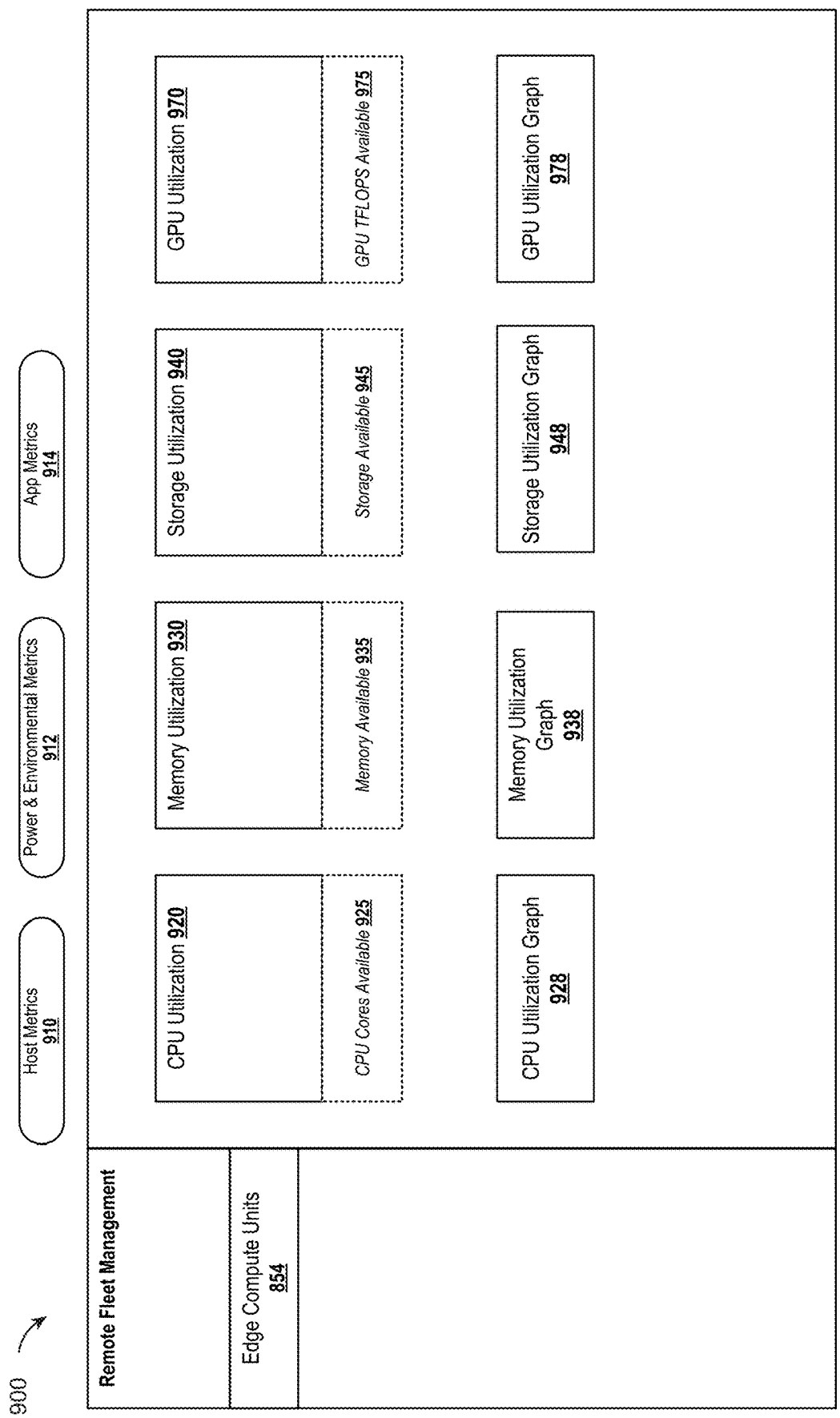
FIG. 9 is a diagram illustrating another example GUI of a global management console associated with asset management and telemetry observation for a fleet of edge compute units of an edge computing system for ML and/or AI workloads, in accordance with some examples.

For instance, FIG. 9 depicts an example GUI 900 that can be presented by the global management console 620 and used to monitor edge compute unit metrics (e.g., "Host Metrics") such as CPU utilization (current and historical), memory utilization (current and historical), storage utilization (current and historical), GPU or any high-performance compute (e.g., NPU, hardware accelerator, etc.) utilization (current and historical), as well as to provide visualizations of respective monitored edge compute unit metrics. In some cases, the global management console 620 and/or example monitoring GUI 900 can include GUI elements for setting, defining, and/or triggering alerts based on monitored parameters exceeding one or more thresholds or otherwise satisfying user or platform-specified rules and conditions (e.g., "Set Alert" in FIG. 9). In addition to the "Host Metrics" shown in the example GUI 900 of FIG. 9, the global management console 620 can provide physical asset management that includes visibility and insight into "Power and Environmental" telemetry and monitoring data, which may be obtained and monitored based on the cloud-based telemetry and monitoring observer 630 included in the platform services 602 and the edge-based telemetry and monitoring stack 635 included in the edge compute unit services 605 (both of which are described in greater detail below).

In some aspects, the global management console 620 can provide physical asset management that includes visibility and insight into "App Metrics," as depicted in the example monitoring GUI 900 of FIG. 9. The "App Metrics" can correspond to monitoring information for AI/MK workloads implemented at the edge, such as on an edge compute device 430. For instance, the "App Metrics" may correspond to one or more (or all) of the AI/ML inference workloads 435-1, . . . , 435-N depicted running on the edge compute unit 430 of FIG. 4.

In some aspects, the global management console 620 can be used to provide application management for deployed AI/ML applications running on the edge compute unit 430. For instance, global management console 620 can provide application management for the deployed user and platform AI/ML applications 655 included in the edge compute unit services 605 running on edge compute unit 430. In some aspects, global management console 620 can provide application management for deployed AI/ML applications to simplify the deployment and management of the AI/ML applications with asset-aware resource provisioning. In such examples, enterprise users of the global management console 620 can easily deploy, update, and remove AI/ML applications on multiple assets (e.g., multiple edge compute units 430) at once. In some embodiments, application management via global management console 620 can be combined with or implemented in conjunction with the cloud-based application repository 650 that is used to install and manage some (or all) of the user and platform AI/ML applications 655 on the edge compute unit 430.

In some embodiments, the global management console 620 can be used to provide workload management for the deployed AI/ML applications running on the edge compute unit 430. For instance, global management console 620 can provide workload management for some (or all) of the deployed user and platform AI/ML applications 655 of FIG. 6, for some (or all) of the deployed AI/ML model inference instances 435-1, . . . , 435-N running on the edge compute unit 430 of FIG. 4, etc. In some cases, workload management can be implemented based on using the global management console 620 to manage AI/ML workloads deployed to one or more edge assets of an enterprise user (e.g., deployed to one or more edge compute units 430/local sites 402 of the enterprise user).

Workload management for AI/ML workloads can include, but is not limited to, automatic resource provisioning, sensor suite selection, job assignment, job cancellation features, etc. In some aspects, enterprise users of the global management console 620/platform services 602 can see which assets (e.g., edge compute units 430, or assets/compute components thereof) are currently available and capable of performing an AI/ML workload either now or at a scheduled time in the future. In some embodiments, workload management for AI/ML workloads on an edge compute device 430 can include scheduling the AI/ML workload for a future time when bandwidth, data, computation, and/or energy is projected or estimated to be more available, is projected or estimated to be cheaper, etc.

In still further example, the global management console 620 can be used to provide security and access control to enterprise users' local sites 402 and/or to the edge compute units 430 and/or connected edge assets 410 deployed to the respective local sites 402. For instance, the enterprise users may utilize global management console 620 to manage the physical, network, and software security associated with their edge assets, including (but not limited to), actions such as user creation, access permission configuration, and credential management, etc. The global management console 620 and security and access control features can be utilized to ensure that only authorized personnel of the enterprise user can access sensitive data and resources, while maintaining full audit trails at the edge compute units 430 and local sites 402 (as well as cloud user environments 690) for compliance purposes.

Local Management Console

In some cases, the local management console 625 can be an offline or offline-capable, local edge version or implementation of the global management console 620 of platform services 602. In some cases, the local management console 625 can be similar to an offline and/or local edge implementation of the remote fleet management control plane 520 of FIG. 5. For instance, the local management console 625 can be the same as or similar to the global management console 520, 620, with the constraint that the local management console 625 operates without reliance on connection to a remote network, data center, cloud, on-premises infrastructure, etc. For instance, in the context of the example of FIG. 4, the local management console 625 may operate within local site 402, using the available local network(s) 420 to communicate with and between edge compute unit 430 and the various edge assets 410, and without using communications over internet backhaul link 440 or to/from any cloud or on-premises data center locations.

For instance, the local management console 625 can be used to implement a customer local portal at the edge compute unit 430 and/or local site 402 depicted in FIG. 4. The local management console 625 can be an out of band management portal that acts as a local management portal in case of lost connectivity to the (cloud-based) global management console/portal 620. For instance, if the internet backhaul link 440 of FIG. 4 goes down or becomes unavailable, local management can still be performed for the edge compute unit 430 and connected local edge assets 410 using the local management console 625, which does not depend on cloud connectivity or the internet backhaul link 440 to operate. In some aspects, the local management console 625 can be included or implemented in the control plane of the edge compute unit 430/edge compute unit services 605. In some embodiments, the local management console 625 can provide a read-only view into HCl and satellite internet connectivity/constellation metrics that can be determined locally at the edge compute unit 430.

Application Repository/Marketplace

In some examples, global management console 620 can provide a first GUI corresponding to application repository 650, which can be used to view available AI/ML applications that can be deployed to an edge compute unit (e.g., an edge compute unit 430 of FIG. 4 and/or other edge compute unit corresponding to the edge compute unit services 605 of FIG. 6). In some cases, the first GUI corresponding to application repository 650 can display a listing of only third-party/developer AI/ML applications. In some examples, the application repository 650 GUI presented by global management console 620 can display a listing of only first-party native/platform AI/ML applications, such as the native/platform applications 540 of FIG. 5. In some cases, the application repository 650 GUI can display a listing of one or more (or all) of the domain-specific application services 560 of FIG. 5, although in some cases the domain-specific application services 560 may be hidden or not listed in the application repository 650 GUI. In some aspects, the application repository 650 GUI can display a listing that combines one or more of the third-party/developer AI/ML applications, first-party native/platform AI/ML applications, and/or the domain-specific application services.

As illustrated in FIG. 6, the application repository 650 of platform services 602 can correspond to the user and platform applications 655 of the edge compute unit services 605. For instance, the user and platform applications 655 can comprise a selection or a subset of the complete listing of applications available in application repository 650, where the selection or subset of the AI/ML applications represents those AI/ML applications that an enterprise user has selected for installation or deployment on the edge compute unit 430. Installing or deploying an AI/ML application on the edge compute unit 430 can be based on including the AI/ML application in the user and platform applications 655 of the edge compute unit services 605. Installing or deploying an AI/ML application on the edge compute unit 430 may additionally include configuring or providing on the edge compute unit 430 (or at local edge site 402) one or more corresponding sensors, devices, and/or robotic assets, etc., associated with, used by, or required for the particular AI/ML application.

In some aspects, the edge compute unit services 605 can be connected to various sensors, external devices (e.g., displays, handhelds, personal devices, etc.), robotic assets, etc., that are provided or deployed at the edge (e.g., deployed in association with one or more edge compute units 430). For example, one or more edge services of the edge compute unit services 605 can be used to configure and manage connectivity to the sensors, external devices, robotic assets, etc., at the edge. In some examples, one or more edge services of the edge compute unit services 605 can be used to configure and manage the local network 420 connectivity shown in FIG. 4 between the edge compute unit 430 and the autonomous robotic assets 416, local site cameras 414, environmental sensors 412, etc. More generally, in some examples, the one or more edge services of the edge compute unit services 605 can be used to configure and manage connectivity to the edge assets 410 across one or more local edge sites 402 (e.g., including additional local site(s) 402-N) and/or across one or more edge compute units 430.

In some embodiments, the AI/ML applications that can be deployed on a given edge compute unit 430 can depend at least in part on the available compute, storage, and local connectivity capabilities or options at the edge compute unit. For instance, AI/ML applications can be associated with corresponding minimum required computational hardware or capabilities, minimum required storage capacity or availability, minimum required local data I/O or read/write speed, minimum required memory capacity, minimum required local connectivity, etc. In some embodiments, the application repository 650 can be indicative of minimum requirements or required edge configurations for implementing a particular AI/ML application that is made available via the application repository 650. In some aspects, the requirements or configurations for implementing a particular AI/ML application can apply to both the available hardware of the edge compute unit 430 as well as the available edge assets 410 for the edge compute unit 430. For instance, some AI/ML applications deployable from the application repository 650 may require certain configurations or quantities of various types of sensors, external devices, and/or robotic assets, etc., among various other examples of connected or connectable edge assets 410. In some examples, an AI or ML application that can be deployed on an edge compute unit 430 (e.g., that meets or exceeds the corresponding minimum requirements or capabilities for the given AI or ML application) can be referred to as an AI or ML application qualified for deployment on the edge compute unit.

In one illustrative example, an AI/ML SLAM (simultaneous localization and mapping) application may be unable to be deployed to an edge compute unit (e.g., unable to be deployed into the user and platform applications 655) unless the edge compute unit has both the requisite local network (e.g., WiFi, 4G, 5G, etc.) connectivity and bandwidth and the appropriate camera hardware (e.g., at the necessary resolution, frame rate, field-of-view, lighting, etc.) connected to the edge compute unit over the local network. In another illustrative example, one or more (or all) of the respective AI/ML applications included in the plurality of AI/ML applications of the application repository 650 can include corresponding requirements or configurations associated with input data for the respective AI/ML application. For instance, the corresponding requirement(s) or configuration(s) information for deploying an AI/ML application from the application repository 650 to an edge compute unit 430 can be indicative of one or more types of input data required to run the AI/ML application. In some embodiments, the input data requirement(s) can be indicative of a data type(s) required by the AI/ML application, optionally or preferably used by the AI/ML application, etc. The input data requirement(s) may additionally, or alternatively, be indicative of data types that are not supported or used by the AI/ML application, etc. In one illustrative example, the different data type requirements or configurations for an AI/ML application of application repository 650 can correspond to one or more of a structured data type(s), semi-structured data type(s), and/or unstructured data type(s), etc. In some embodiments, the different data type requirements or configurations for an AI/ML application of application repository 650 can correspond to one or more of a machine-generated data type(s), sensor-generated data type(s), user-generated data type(s), etc. In some embodiments, the input data requirement(s) and/or configuration(s) can be included in a connected edge asset requirement of an AI/ML application deployable from the application repository 650, and/or can be included in an edge compute device requirement of an AI/ML application deployable from the application repository 650.

In one illustrative example, the platform applications represented in the software stack (e.g., included in the user and platform applications 655 deployed at the edge, included in the application repository 650 in the cloud, etc.) can be used to enable enterprise user's AI/ML workloads to be run on the edge compute units 430. For instance, the platform AI/ML applications can be based on a core orchestration layer of platform services 602/edge compute unit services 605 to account for redundancy and resiliency. In some embodiments, the platform AI/ML applications can utilize or be based on open-source distributed computing platforms for data processing, storage, and movement (e.g., Spark, MinIO, Kafka, etc.). In some aspects, the platform AI/ML applications can be fully managed applications, for instance in terms of tuning, updates, addressing of critical vulnerabilities, etc.

In some embodiments, the application repository 650 can include first-party/platform AI/ML applications and can include third-party/developer AI/ML applications. In some examples, first-party/platform AI/ML applications can be configured as a core suite of AI and ML applications, models, networks, etc., that are trained and selected to solve or otherwise address various unsolved and/or underserved enterprise user use cases in the edge computing space. In one illustrative example, the first-party/platform AI/ML applications can be deployed and managed through a cloud-based application marketplace (e.g., application repository 650). The first-party/platform AI/ML applications can be tuned and right-sized (e.g., scaled up or down, compressed, optimized, etc.) for the various hardware configurations available for the edge compute units 430, and can be designed or purpose-built to maximize resource utilize at the edge and when deployed on the edge compute units 430. For instance, the edge compute unit 430 can be associated with a plurality of pre-configured compute hardware options. Some (or all) of the first-party/platform AI/ML applications can be provided to the cloud-based application repository in a form or version optimally corresponding to various ones of the plurality of pre-configured compute hardware options available for implementing the edge compute unit. For instance, a first compute hardware configuration of the edge compute unit 430 may be more powerful (e.g., more GPUs, more powerful GPUs, more RAM, etc.) than a second compute hardware configuration of the edge compute unit 430 (e.g., fewer GPUs, less powerful GPUs, fewer available GPU cores, lower GPU data transfer speed, less RAM, etc.). Some (or all) of the pre-trained and pre-tuned first-party/platform AI/ML applications can have at least a first version optimized to run on the first compute hardware configuration of the edge compute unit 430 and a second (smaller and more lightweight) version optimized to run on the second compute hardware configuration of the edge compute unit 430, etc.

In some cases, application repository 650 can be implemented as a cloud-based marketplace for the management of customer and platform AI/ML applications (e.g., including the deployed user and platform applications 655 provided in the edge compute unit services 605). For instance, the application repository 650 (e.g., AI/ML application marketplace) can be used to provide fully managed applications that are subjected to a qualification and certification process prior to being on-boarded to the cloud-based application repository/marketplace 650 for deployment to various enterprise user local edge sites 402 and corresponding edge compute units 430. In some cases, the qualification and certification process for onboarding a third-party/developer ML/AI application to the marketplace can be performed to determine runtime fidelity and viability of the third-party ML/AI application for deployment on the edge compute units 430. In some embodiments, the application repository/marketplace 650 can be configured to provide one-click deployment and observability for the application lifecycle (e.g., from the cloud to the edge compute unit 430, and vice versa), obviating or reducing the need for cost and time intensive application and platform management as would conventionally be required.

In one illustrative example, application repository 650 can be used to deploy workloads into HCl through the global management console 620 (e.g., a corresponding GUI of the global management console 620 for the application repository/marketplace 650). For instance, one or more AI/ML applications can be selected from the application repository 650 (e.g., selected from a plurality of ML or AI applications included in the application repository 650) for installation or deployment onto one or more edge compute units 430, where the selection is made using global management console 620 and/or a GUI thereof. For instance, one or more AI/ML applications can be obtained from the application repository 650 and deployed to one or more edge compute units based on receiving a request indicative of the one or more AI/ML applications that are to be deployed. The request can be received using the global management console 620 and/or a GUI thereof. The request can be indicative of a selection of one or more ML or AI applications qualified for deployment on a particular edge compute unit(s) (e.g., one or more ML or AI applications having minimum requirements that are met or exceeded by the particular edge compute unit corresponding to the request).

In some embodiments, the request indicative of the selection of the one or more qualified ML or AI applications can be a user request selecting from the application repository 650 (e.g., a manual request, user input to a GUI of global management console 620 and/or a user input to a GUI for the application repository 650, etc.). In some examples, the request indicative of the selection of the one or more qualified ML or AI applications can be automatically generated at the edge compute unit 430, at the global management console 620, at the application repository 650, etc. For example, an automatic request for deployment of an AI or ML application from the application repository 650 to an edge compute unit 430 can be indicative of an automatically determined selection from the application repository 650. The automatic selection can be based on, in at least some examples, factors associated with the edge compute unit 430, such as the particular configuration, capabilities, deployment location (e.g., corresponding local edge site 402), deployment scenario or deployment objectives, configured or available edge assets 410, types of input or output data streams, existing model deployment instances 435, 433, 435 on the edge compute unit 430, etc.

In some cases, the application repository 650 and/or global management console 620 can be used to manage the lifecycle of deployed AI/ML apps from the application repository 650 (e.g., can be used to manage the lifecycle of the deployed user and platform AI/ML applications 655). In some examples, the cloud-based application repository/marketplace 650 can be used to implement management of the AI/ML applications 655 on bare metal (e.g., on bare metal services 617 of an edge compute unit 430).

In some aspects, the platform services 602 can further include an application orchestration engine (not shown) that can be used for the deployment of Kubernetes on the edge compute units 430. For instance, in some embodiments, the application orchestration engine can be used to provide standalone Kubernetes clusters and Tanzu Kubernetes clusters on HCl. In some aspects, the application orchestration engine can be used to provide automated Kubernetes cluster lifecycle management using helm and ArgoCD.

SDN Network Configuration Provisioning Management, Intelligent Routing

The platform services 602 can further include an SDN network configuration service 660, which may be used to provide management of networking functionality (e.g., SDN networking functionality) from the cloud. The SDN network configuration service 660 included in platform services 602 can correspond to or be associated with the SDN network provisioning and management engine 665 included in the edge compute unit services 605 implemented on each of the edge compute units 430. In one illustrative example, the SDN networking can be used to enable disparate connectivity options across different enterprise users' fleets of edge compute units 430 and/or across the constituent edge compute units 430 and local sites 402 of a single enterprise user's fleet of edge assets.

For instance, a network configuration manager (e.g., the cloud-based SDN network configuration service 660 and/or edge-based SDN network provisioning and management engine 665) can be used to enable multiple different backhaul communication links to be established and configured for connection to a data network such as the internet. In particular, the network configuration manager can be used to enable multiple different backhauls to be configured to provide the internet backhaul link 440 depicted in FIG. 4. For instance, the multiple backhauls can use different communication modalities (e.g., such as wired connectivity, fiber connectivity, public or private 5G or other cellular network connectivity, satellite internet constellation connectivity, etc.). The multiple backhauls may be used individually or may be multiplexed together to provide internet backhaul communications over a plurality of backhaul links at the same time. The multiplexed backhaul links may be of the same modality (e.g., all fiber backhaul links, all wireless cellular links, all satellite internet constellation links) and/or may be of mixed modalities (e.g., internet backhaul traffic multiplexed over a combination of fiber, cellular, and/or satellite internet constellation communication links.

In some aspects, the network configuration manager can enable multiple internet backhauls to be configured between the edge compute units 430/local sites 402 and the platform services 602/cloud user environments 690/AI and ML training clusters 470. The multiple backhauls can be configured based on leveraging network virtualization and remote management of network assets to thereby expand the connectivity options at the edge (e.g., true edge). For instance, network virtualization and remote management of network assets can be configured or controlled through the global management console 620, to expand the connectivity options at the edge compute units 430 and corresponding local edge site locations 402 associated with an enterprise customer and/or the enterprise customer's fleet of managed edge assets registered to the platform services 602. In some aspects, the use of network virtualization can enable customer data traffic, log/metrics/telemetry traffic, and management/control plane traffic to be prioritized differently within one or more (or both) of the local edge network 420 at the local site 402 and within the one or more internet backhaul 440 networks between the local site 402/edge compute unit 430 and the platform services 602/cloud user environments 690.

In one illustrative example, the SDN network configuration service 660 can have a corresponding GUI that is presented in global management console 620, and can be used to perform SDN configuration and management for an SDN associated with one or more edge compute units 430, local sites 402, edge compute unit services 605, etc. As illustrated, the SDN network configuration service 660 of the platform services 602 can correspond to an SDN network provisioning and management engine 665 included in the edge compute unit services 605. In some examples, the SDN network configuration service 660 can receive one or more user inputs indicative of network configuration parameters, changes, updates, etc., and can transmit the SDN network configuration information to the SDN network provisioning and management engine 665 for application at the edge compute unit 430.

In some aspects, the SDN network configuration service 660 can be a cloud-based service of the platform services 602. The SDN network provisioning and management engine 665 of the edge compute unit services 605 can be a locally implemented edge service (e.g., implemented on the edge compute unit 430) that utilizes cloud-based communication to receive configuration information to be applied to SDN networking associated with the edge compute unit 430 and/or edge compute unit services 605. In some cases, the SDN network provisioning and management engine 665 can be responsible for network-level optimization and intelligent routing to/from the edge compute unit 430.

In some cases, the SDN network provisioning and management engine 665 can be used to multiplex data transmission over multiple satellite internet constellation transceivers (e.g., uplink from edge compute unit 430 to the cloud can be multiplexed over a first satellite internet constellation link provided by a first satellite transceiver at the local site 402, a second satellite internet constellation link provided by a second satellite transceiver at the local site 402, a third satellite internet constellation link provided by a third satellite transceiver at the local site 402, . . . , etc.). In some cases, the SDN network provisioning and management engine 665 and/or the cloud-based SDN network configuration service 660 can be used to generate, collect, and/or display associated metrics for the SDN networking, satellite internet constellation connectivity and/or associated multiplexing, etc. In some aspects, the SDN network configuration service 660 and the SDN network provisioning and management engine 665 can support multiple data network modalities, including private 5G or other wireless cellular networks, wired fiber (e.g., fiber optic) connectivity, satellite internet constellation connectivity, etc.

Device/Asset Lifecycle Management & Fleet Management Daemon

The platform services 602 are depicted in FIG. 6 as further including a device/asset lifecycle management (DLM) engine 670. The DLM engine 670 can be used to perform tasks and operations such as provisioning, adding/removing, and managing connected assets associated with the platform services 602. For instance, the DLM engine 670 can be used to perform asset management relating to the one or more edge compute units 430 provided at the plurality of local sites 402, . . . , 402-N of FIG. 4. Connected assets managed by the DLM engine 670 can additionally include various sensors and other assets, computing devices, etc., provided at the edge and/or otherwise associated with an edge compute unit 430. For instance, the DLM engine 670 can be used to perform asset management relating to the plurality of sensors or sensor packages that are provided at a local site 402 and/or associated with generating input sensor data used by an edge compute unit 430. For instance, the edge assets 410 of FIG. 4 (e.g., autonomous robots 416, local site cameras 414, environmental sensors 412, etc.) can each be managed by the DLM engine 670 of FIG. 6.

In some examples, the DLM engine 670 can be a cloud-based component or module of the platform services 602. In one illustrative example, the DLM engine 670 can be associated with a corresponding GUI presented in the global management console 620. For example, the DLM engine 670 can correspond to a GUI that is the same as or similar to the 'Fleet Map' GUI illustrated in the example GUI 800 of FIG. 8. In some aspects, the DLM engine 670 can additionally (or alternatively) correspond to an 'Assets' GUI, shown as a selectable option in the left-hand sidebar menu of GUI 800 of FIG. 8 and GUI 900 of FIG. 9.

In some cases, the DLM engine 670 GUI can display a listing or visual depiction of the various assets that have been deployed, registered, provisioned, etc., for the enterprise user of platform services 602. For instance, the assets managed by DLM engine 670 can be separated, filtered, stored, etc., based on factors such as asset type, asset location, asset age, asset status, asset task or usage, etc.

In some embodiments, the functionality of DLM engine 670 can be provided by a DLM asset service and a DLM provisioning service that are both included in DLM engine 670. For instance, the DLM asset service and the DLM provisioning service can be sub-services implemented by DLM engine 670 in the platform services 602. The DLM asset service and DLM provisioning service can both be cloud-based services. In some examples, the DLM asset service is a cloud-based service used to manage the assets (e.g., edge compute units 430, connected sensors, and/or other edge assets 410 provided at a local site 402 edge location, etc.) belonging to an organization. In some examples, the DLM asset service can be a cloud-based service configured to add assets to an organization, remove assets from an organization, list assets, manage additional properties like endpoints, etc. In some cases, the DLM asset service can have an expanded schema to include a satellite internet constellation internal representation within the scope of managed or monitored assets of the DLM asset service and/or DLM engine 670. In some cases, the satellite internet constellation internal representation can be implemented based at least in part on the satellite edge connectivity management engine 680 included in the platform services 602 (as will be described in greater detail below).

The DLM provisioning service can be a separate cloud-based service that is used to recognize assets belonging to an organization and register them as such. For instance, when a new edge asset, connected sensor, or edge compute unit, etc. is provided at a local site 402, the new edge asset, connected sensor, or edge compute unit can initially connect to and communicate with the DLM provisioning service of the DLM engine 670 (e.g., via the internet backhaul communication link 440 of FIG. 4). Based on the initial connection between the new edge device and the DLM provisioning service of the DLM engine 670, provisioning can be performed such that the new edge device can be registered to and associated with the enterprise user or organization that operates the local site 402. In some embodiments, the DLM provisioning service can register or provision assets as belonging to an organization based on hardcoding HCl assets as belonging to the particular organization. In some embodiments, the DLM provisioning service can provision assets using certificates (CA), if turned on or enabled at the local customer/enterprise site (e.g., local site 402 of FIG. 4). In some cases, the DLM provisioning service can hardcode satellite internet constellation assets as belonging to the organization. For instance, a satellite internet constellation transceiver coupled to or otherwise in communication with the edge compute unit 430 (e.g., a satellite internet constellation transceiver provided at or near the local site 402) can be hardcoded as belonging to the organization using the DLM provisioning service of the DLM engine 670. The satellite internet constellation transceiver(s) may be the same as or similar to one or more of the satellite transceivers 312, 314, 316, 321, 323, 325 of FIG. 3, etc.

In some embodiments, the DLM engine 670 can further include a DLM cloud control plane service (not shown). The DLM cloud control plane service can be used to implement a cloud component for the control plane responsible for device management. For instance, the DLM cloud control plane service can be used to deploy workloads, grab (e.g., retrieve or obtain) the live state of various HCl hosts (e.g., edge compute units 430 or compute hardware/HCl hosts running thereon). In some embodiments, the DLM cloud control plane service can be used to send curated commands and control indications to an edge compute unit 430, where the commands may be user-initiated, automatically or system initiated, or a combination of the two. For instance, a user input or configuration action provided to a GUI of the global management console 620 corresponding to the DLM engine 670 (or other component of platform services 602) can be automatically translated into control plane signaling by the DLM cloud control plane service, and can be pushed to the appropriate services of the edge compute unit 430 (e.g., translated and pushed from the cloud-based DLM cloud control plane service within platform services 602, to the appropriate or corresponding one(s) of the edge compute unit services 605 running on the edge compute unit 430). In some aspects, the DLM cloud control plane service can be implemented based on a scalable design for control plane and additional management APIs.

In some examples, DLM engine 670 can further include or otherwise be associated with an edge compute unit cloud control plane service (not shown). The edge compute unit cloud control plane service can be implemented at the edge compute unit 430 (e.g., can be included in the edge compute unit services 605) and may provide a resident control plane that provides an interface into a given edge compute unit 430 from the cloud. For instance, the edge compute unit cloud control plane service can provide an interface from the global management console 620 (and/or other platform services 602) into a given edge compute unit 430. The interface into a given edge compute unit 430 can be mediated by the DLM cloud control plane service (on the cloud side) and the edge compute unit cloud control plane service (on the edge side). In some aspects, the edge compute unit cloud control plane service can be used to implement REST endpoints for deploying applications (e.g., the user and platform applications 655, deployed to the edge from the cloud-based application repository 650), servicing curated commands, etc.

In some aspects, the DLM engine 670 of platform services 602 can correspond to or otherwise be associated with an edge-based fleet management daemon 673 that is included in the edge compute unit services 605 and/or deployed on the edge compute unit(s) 430. For instance, the edge-based fleet management daemon 673 can be configured to provide node-level data and metrics (where the node-level corresponds to the level of individual edge compute units 430). More generally, the edge-based fleet management daemon 673 can be configured to perform collection of vital statistics and data related to nodes/edge compute units 430 registered with the platform services 602 and needed for display, management, monitoring, or other interaction through the global management console 620. In some cases, the edge-based fleet management daemon 673 can additionally, or alternatively, be used to implement a coredump collector that is in communication with the cloud-based DLM engine 670.

As illustrated in FIG. 6, the edge compute unit services 605 can further include connector services 677, which may also be referred to as cloud connector services 677. For instance, the cloud connector services 677 can include a plurality of different cloud connectors for various cloud platforms associated with the cloud user environments 690. The cloud user environments 690 can be public or private clouds that are used to implement some (or all) of the platform services 602 of FIG. 6, the platform software stack 502 of FIG. 5, the AI/ML training clusters 470 of FIG. 4, etc. In some embodiments, the cloud connector services 677 can include a first cloud connector corresponding to a first public cloud infrastructure, a second cloud connector corresponding to a second public cloud infrastructure, a third cloud connector corresponding to a first private cloud infrastructure, a fourth cloud connector corresponding to a second private cloud infrastructure, etc. The cloud connector services 677 can be used to route or bridge traffic appropriately between the edge compute unit 430 and edge compute unit services 605 to the appropriate one of the cloud user environments 690 where the platform services 602 are implemented, provided, or located, etc. In some cases, the cloud connector services 677 can be used to connect nodes of the edge compute unit 430/the edge compute unit 430 itself to the appropriate user-specified cloud user environments 690. In some cases, the cloud connector services 677 can be configured to upload logs related to platform AI/ML applications included in the user and platform applications 655 running on the edge compute unit 430. In some cases, the cloud connector services 677 can be configured to provide mechanisms for data plane interaction with the various third-party or private cloud providers associated with the cloud user environments 690.

Observer—Telemetry and Monitoring

The platform services 602 can further include the telemetry and monitoring observer engine 630, which can correspond to or otherwise be associated with the telemetry and monitoring stack 635 implemented on the edge compute unit 430 among the edge compute unit services 605. In some aspects, the observer can be used to provide hardware and critical environment observability designed to be part of a comprehensive and unified software solution to simplify and streamline the management of a customer' fleet of edge compute units 430 and associated edge assets 410. For instance, the telemetry and monitoring observer engine 630 and/or the telemetry and monitoring stack 635 can enable system-wide visibility, command, and control of the fleet's hardware systems (e.g., the hardware systems of the edge compute units 430 and/or the hardware systems of the connected edge assets 410). The fleet's hardware systems that may be associated with, viewed, commanded, controlled, etc., by the telemetry and monitoring observer engine 630 and/or the telemetry and monitoring stack 635 can include, but are not limited to: power distribution systems or sub-systems, thermal management functionality, internal environmental control systems and functionalities, data connectivity (e.g., both backhaul and device), physical security systems (e.g., at local site 402, associated with edge compute unit 430, associated with connected edge assets 410, etc.).

In some aspects, the telemetry and monitoring stack 635 implemented on the edge compute unit 430 (e.g., included in the edge compute unit services 605) can include one or more cloud-based services or sub-services. In some aspects, the telemetry and monitoring stack 635 can comprise a plurality of sub-services each running from the cloud, with the telemetry and monitoring stack 635 itself running from the edge compute unit 430. In some embodiments, the telemetry and monitoring stack 635 can run at the edge and can include cloud-based services or sub-services configured to upload host-level and satellite internet constellation level metrics to provide an observation view of telemetry and monitoring information from the cloud-based global management console/portal 620.

For instance, the telemetry and monitoring stack 635 can include a network telemetry and monitoring service that runs in the cloud (e.g., is a cloud-based service) and is configured to provide network usage statistics corresponding to one or more of a local network 420 associated with the edge compute unit 430, SDN networking associated with the edge compute unit 430 (e.g., SDN networking implemented based on the SDN network configuration service 660 and SDN network provisioning and management engine 665), and/or internet backhaul 440 associated with the edge compute unit 430 and cloud user environments 690. In some cases, the cloud-based network telemetry and monitoring service can be included in, associated with, etc., one or more of the cloud-based SDN network configuration service 660 included in the platform services 602 and/or the edge-based SDN network provisioning and management engine 665 included in the edge compute unit services 605 deployed on the edge compute unit 430.

In some embodiments, the telemetry and monitoring stack 635 can include a satellite internet constellation telemetry and monitoring service that runs in the cloud (e.g., is a cloud-based service) and is configured to provide network usage statistics and satellite internet constellation metrics corresponding to connectivity between the local site 402/edge compute unit 430 and one or more bird (e.g., satellites) of the satellite internet constellation. In some aspects, the cloud-based satellite internet constellation telemetry and monitoring service can be included in, associated with, etc., the satellite edge connectivity management engine 680 included in the platform services 602.

In some cases, the telemetry and monitoring stack 635 can further include a critical environment telemetry and monitoring service running locally at the edge (e.g., on the edge compute unit 430/included in the edge compute unit services 605). The critical environment telemetry and monitoring service can display data from one or more APIs associated with or provided with the containerized data center used to implement the edge compute unit 430, and corresponding to telemetry and monitoring information for components within the edge compute unit 430 (e.g., including ambient environmental parameters such as temperature or humidity, power consumption, etc.; including monitoring parameters for various compute hardware included in the HPC engine 434 of edge compute unit 430; etc.). In some aspects, the critical environment telemetry and monitoring service can upload HCI/satellite internet constellation metrics to the cloud (e.g., platform services 602 and/or cloud user environments 690) for display in the global management console 620.

In some embodiments, the telemetry and monitoring stack 635 can further include a host level telemetry and monitoring (compute and storage) service running locally at the edge (e.g., on the edge compute unit 430/included in the edge compute unit services 605). The host-level telemetry and monitoring (compute and storage) service can be used to collect and/or display data from local edge hosts (e.g., edge compute units 430) and/or Kubernetes clusters associated with the local edge compute host units 430. The host-level telemetry and monitoring (compute and storage) service can upload HCI level host, virtual machine (VM), and/or Kubernetes data and metrics to the cloud (e.g., platform services 602 and/or cloud user environments 690) for display in the global management console 620.

In some aspects, the telemetry and monitoring stack 635 can further include a network telemetry and monitoring service running locally at the edge (e.g., on the edge compute unit 430/included in the edge compute unit services 605) and configured to provide combined network and satellite internet constellation connectivity metrics, network usage statistics, etc. The network telemetry and monitoring service can upload satellite internet constellation metrics, HCI network utilization metrics, etc., to the cloud (e.g., platform services 602 and/or cloud user environments 690) for display in the global management console 620.

Satellite Internet Constellation Edge Connectivity Management

In one illustrative example, the platform services 602 can include a satellite edge connectivity management engine 680. The satellite edge connectivity management engine 680 can be a cloud-based service or engine, and may correspond to a satellite internet constellation connectivity module (e.g., edge module included in edge compute unit 430 or deployed at the local site 402 and in communication with edge compute unit 430). In some cases, the satellite internet constellation connectivity management engine 680 can comprise bundled software associated with the satellite internet constellation edge module (e.g., satellite internet constellation transceiver provided at the local site 402/edge compute unit 430). In some embodiments, the satellite edge connectivity management engine 680 can be associated with a corresponding GUI of the global management console 620, where the corresponding GUI runs or presents the bundled software associated with the satellite internet constellation edge hardware module and/or presents an interface or portal for management of the satellite internet constellation internet connectivity. In some cases, the corresponding GUI of the global management console 620 for the satellite internet constellation connectivity management engine 680 can display some (or all) of the satellite internet constellation metrics collected by the telemetry and monitoring stack 635. In some cases, the satellite internet constellation metrics collected by the telemetry and monitoring stack 635 may be presented in global management console 620 in the dedicated GUI corresponding to the satellite internet constellation edge connectivity management engine 680, can be presented in global management console 620 in a different dedicated GUI corresponding to the telemetry and monitoring observer engine 630, and/or can be presented across both/multiple GUIs of the global management console 620.

In some aspects, the platform services 602 can further include a satellite internet constellation service backend module (not shown), either as a standalone engine/service and/or as a sub-engine/sub-service of the satellite edge connectivity management engine 680 included in the platform services 602. For example, the satellite internet constellation service backend module can be used to provide management and/or monitoring of the service backend associated with using the satellite internet constellation to implement internet backhaul (e.g., internet backhaul link 440 of FIG. 4) between the cloud user environments 690/platform services 602 and the edge compute device 430/local site 402. In some cases, the satellite internet constellation service backend module can include or provide a support ticket creation backend. The satellite internet constellation service backend module may additionally provide satellite internet constellation management and/or connectivity management using one or more enterprise APIs associated with or configured for use with the satellite internet constellation. In some aspects, the satellite internet constellation service backend module can include the support ticket creation backend, and can additionally include satellite internet constellation management functionalities (e.g., such as pause service, move service, change plans, etc.) using corresponding appropriate enterprise APIs for the satellite internet constellation.

FIG. 7 is a diagram illustrating an example infrastructure and architecture 700 for implementing an edge computing system for ML and/or AI workloads, according to aspects of the present disclosure. For instance, FIG. 7 includes a global management platform 702 that can be a cloud-based platform that can include one or more components that are the same as or similar to corresponding components within the platform services 602 of FIG. 6 and/or within the platform software stack 502 of FIG. 5. FIG. 7 additionally includes a plurality of edge compute units 704 (e.g., a fleet of edge compute units 704), each of which may be the same as or similar to the edge compute unit 430 of FIG. 4 and/or can include one or more components that are the same as or similar to corresponding components within the edge compute unit services 605 of FIG. 6. In particular, each edge compute unit 704 of the plurality of edge compute units can implement, include, or comprise an edge compute unit host 705, which can be the same as or similar to the edge compute unit services 605 of FIG. 6.

For instance, a global management platform 702 can include the application repository 650 and global management console 620 of FIG. 6, in addition to the remote fleet management control plane 520 of FIG. 5. The global management platform 702 can be a cloud-hosted and/or on-premises computing system that is remote from the respective local edge sites associated with various edge compute units 704 of the fleet (e.g., plurality) of edge compute units 704. For instance, global management platform 702 of FIG. 7 can be associated with one or more of the cloud-based AI/ML training clusters 470 of FIG. 4, the cloud user environments 690 of FIG. 6, etc.

The remote fleet management control plane 520 can include an organization and onboarding service 722 that can be used to perform organization-specific tasks corresponding to an enterprise organization (e.g., enterprise user) of the global management platform 702 and/or the infrastructure and architecture 700 for edge computing of ML and AI workloads. For example, the onboarding service 722 can be used to onboard users for the enterprise organization, based on creating one or more user accounts for the global management console 602 and/or the local management console 625 of FIG. 7. The remote fleet management control plane 520 can additionally include a provisioning service 724 that can be used to provision various edge assets associated with (e.g., deployed by) the enterprise user. For instance, the provisioning service 724 can be associated with provisioning satellite internet constellation transceivers or connectivity units for the edge compute units 704, can be associated with provisioning the edge compute units 704, can be associated with provisioning one or more user devices (e.g., such as the user device 795), can be associated with provisioning one or more connected edge assets 710-1, . . . , 710-N (e.g., which can be the same as or similar to the connected edge assets 410 of FIG. 4), etc.

The remote fleet management control plane can include and/or can be associated with one or more databases, such as a fleet datastore 747 and a metrics datastore 749. In some aspects, the fleet datastore 747 can store data or information associated with the fleet of deployed edge compute units 704. For instance, fleet datastore 747 can communicate with one or more (or all) of the organization and onboarding service 722, the provisioning service 724, the device lifecycle management service 670, etc. In some aspects, the fleet datastore 747 and/or the metrics datastore 749 can communicate with and be accessed by the global management console 620. For instance, global management console 620 can access and communicate with the metrics datastore 749 for metrics visualization corresponding to one or more of the deployed edge compute units 704 of the fleet (e.g., plurality) of deployed edge compute units 704. In some embodiments, the fleet datastore 747 can include the local knowledge base/datastore 545 of FIG. 5, described previously above.

As mentioned previously, the global management platform 702 can be associated with and used to manage the deployment of a fleet of edge compute units 704. The various edge compute units 704 can be deployed to different edge locations. For instance, one or more edge compute units 704 can be deployed to each respective edge location that is associated with (e.g., is managed by and communicates with) the global management platform 702. As illustrated in the example of FIG. 7, a first edge location may have four edge compute units deployed (e.g., left-most deployment shown in FIG. 7), a second edge location may have two edge compute units deployed (e.g., center deployment shown in FIG. 7), a third edge location may have three edge compute units deployed (e.g., right-most deployment shown in FIG. 7), etc. A greater or lesser number of edge site locations can be utilized, each with a greater or lesser number of edge compute units 704, without departing from the scope of the present disclosure.

Each edge compute unit can be associated with an edge compute unit host 705, which is shown in the illustrative example of FIG. 7 as corresponding to a single one of the plurality of edge compute units 704. In particular, each edge compute unit 704 of the plurality of edge compute units can implement, include, or comprise an edge compute unit host 705, which can be the same as or similar to the edge compute unit services 605 of FIG. 6, and/or can include or implement one or more of the components of edge compute unit 430 of FIG. 4, etc. The edge compute unit host 705 can include the local management console 625 of FIG. 6, which may be associated with a metrics datastore 742. The metrics datastore 742 can be used to collect and store local telemetry and other metrics information generated and/or received at the edge compute unit host 705 and/or corresponding local edge site of the edge compute unit host 705. In some aspects, information included in the local metrics datastore 742 can be the same as or similar to at least a portion of the information included in the global management platform 702 metrics datastore 749. In some cases, information included in the local metrics datastore 742 can be separate or disjoint from at least a portion of the information included in the global management platform 702 metrics datastore 749.

In some examples, the local management console 625 can be communicatively coupled with the local metrics datastore 742, and can be configured to provide metrics readout information and/or visualization to one or more user devices 795 that are local to the same edge location as the edge compute unit host 705 and that are authorized to access and interface with the local management console 625 (e.g., access control and authorization may be implemented based on the organization and onboarding service 722 of the global management platform 702). The user devices 795 can include various computing devices, including but not limited to, desktop computers, laptop computers, tablet computers, smartphones, wearable computing devices, output devices or equipment, display devices or equipment, personal computing devices, mobile computing devices, portable hand units or terminals, display monitors, etc.) that may be present within or otherwise associated with the local edge site of the edge compute unit host 705.

The local management console 625 can additionally communicate with an edge observer engine 760, which can correspond to the telemetry and monitoring stack 635 of the edge compute unit services 605 of FIG. 6. In some embodiments, the edge observer engine 760 can be the same as or similar to the telemetry and monitoring stack 635 of FIG. 6. The edge observer engine 760 can include a host-level telemetry service 737 and a critical environment monitoring service 739 (one or more, or both, of which can be included in the telemetry and monitoring stack 635 of FIG. 6). The critical environment monitoring service 739 can be used to monitor environmental parameters of the edge compute unit 704/edge compute unit host 705, such as temperature, humidity, airflow, vibrations, energy consumption, etc. The critical environment monitoring service 739 can ingest, obtain, or otherwise access corresponding sensor data or sensor data streams from environmental monitoring sensors, which can include one or more (or all) of the environmental sensors 412 of FIG. 4. In some aspects, the edge observer engine 760 can additionally include an application deployer 757, which can communicate with the cloud-based application repository 650 of the global management platform 702 (e.g., the cloud-based application repository 650 of FIG. 6). In some embodiments, log data from the edge observer engine 760 can be transmitted (e.g., as a log stream) from the edge observer engine 760 to a log archival agent 775 of a fleet management client 770 included in the edge compute unit host 705. The log archival agent 775 can, in some aspects, parse and/or archive (e.g., store or transmit for storage) some or all of the log stream data received from and/or generated by the edge observer engine 760. For instance, the log archival agent 775 of the fleet management client 770 can transmit the log stream data received from and/or generated by the edge observer engine 760 to the cloud-based metrics datastore 749 of the global management platform 702, where the transmitted log stream data from the cloud-based metrics datastore 749 can be used for metrics visualization at or using the global management console 620 (also of the global management platform 702).

In some aspects, the fleet management client 770 included in or deployed on the edge compute unit host 705 can be associated with the fleet of deployed edge compute units 704. For instance, the fleet management client 770 can associate the particular edge compute unit host 705 with the corresponding additional edge compute unit hosts 705 that are also included in the same fleet. In some aspects, the fleet management client 770 can be used to coordinate and implement distributed operations (e.g., computational operations, such as finetuning, retraining, etc., of one or more AI/ML models) across multiple edge compute units 704 of the fleet. For instance, in one illustrative example, distributed finetuning or retraining of an AI/ML model across multiple edge compute units 704 be orchestrated by a respective fleet management client 770 that is implemented at or by each of the multiple edge compute units 704. As illustrated, the fleet management client 770 can include the fleet management daemon 673 described above with respect to FIG. 6. The fleet management daemon 673 of the fleet management client 770 provided on each edge compute unit host 705 can communicate with the device lifecycle management service 670 of the remote fleet management control plane 520 implemented in the global management platform 702. In some aspects, the fleet management daemon 673 of the fleet management client 770 provided on each edge compute unit host 705 can communicate with the remote fleet management control plane 520, the global management console 620, and/or various other component and services within the global management platform 702 of FIG. 7.

In some aspects, the edge compute unit host 705 can communicate with a plurality of connected edge assets 710-1, . . . , 710-N. As noted previously, the connected edge assets 710-1, . . . , 710-N can be the same as or similar to the connected edge assets 410 of FIG. 4, and can include various sensors, computing devices, etc., that are associated with an edge deployment location of the edge compute unit host 705. For instance, the connected edge assets 710-1, . . . , 710-N in communication with the edge compute unit host 705 can include, but are not limited to, one or more of sensors such as cameras, thermal imagers, lidars, radars, gyroscopes, accelerometers, vibrometers, acoustic sensors or acoustic sensor arrays, sonar sensors or sonar sensor arrays, pressure sensors, temperature sensors, X-ray units, magnetic resonance imaging (MRI) units, electroencephalogram (EEG) units, electrocardiogram (ECG) units, inertial navigation system (INS) units, inertial measurement units (IMUs), GPS modules, positioning system modules, compass sensors, directional sensors, magnetic field sensors, robotic platforms, robotic units, robotic devices, etc., among various others. In some aspects, the connected edge assets 710-1, . . . , 710-N associated with the edge compute unit host 705 can include all devices connected to edge compute units that have local ingress and egress of data.

Edge AI/ML Monitoring and Management Platform—Management Console GUI Examples

Figure 8:
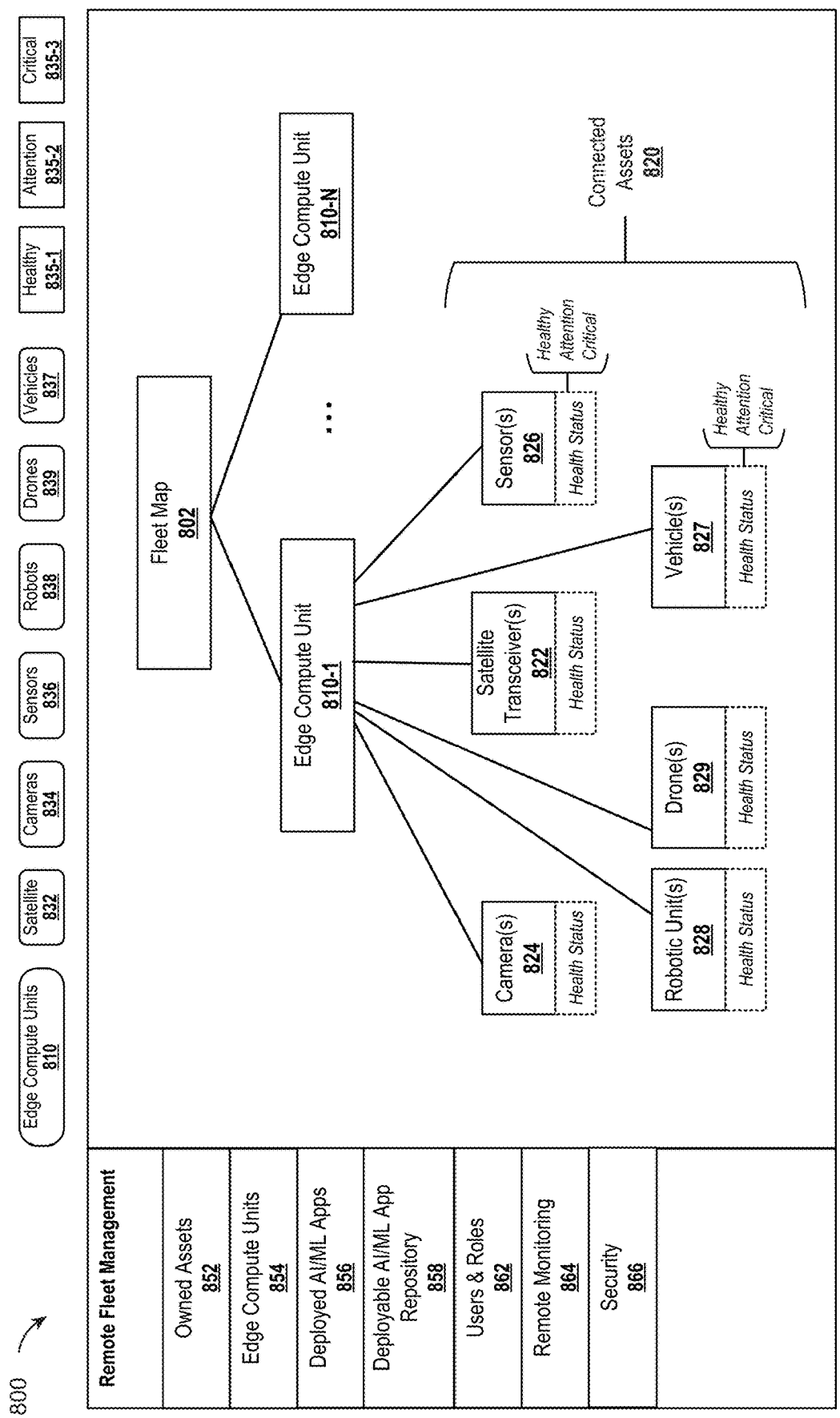
FIG. 8 is a diagram illustrating an example graphical user interface (GUI) of a global management console associated with asset management and telemetry observation for a fleet of edge compute units of an edge computing system for ML and/or AI workloads, in accordance with some examples.

FIG. 8 is a diagram illustrating an example graphical user interface (GUI) 800 of a global management console associated with asset management and telemetry observation for a fleet of edge compute units of an edge computing system for ML and/or AI workloads, in accordance with some examples. For instance, the GUI 800 can correspond to a "Remote Fleet Management" GUI of the global management platform 702 of FIG. 7. In some aspects, the Remote Fleet Management GUI 800 of FIG. 8 can be presented using the Global Management Console 620 of FIG. 6 and FIG. 7. In some cases, the Remote Fleet Management GUI 800 of FIG. 8 can additionally, or alternatively, be associated with the remote fleet management control plane 520 of FIG. 5 and FIG. 7.

The Remote Fleet Management GUI 800 can include user interface elements corresponding to different platform services. For instance, the user interface elements (e.g., presented in the left-hand column of the Remote Fleet Management GUI 800) can include, but are not limited to, an owned assets 852 UI element (e.g., corresponding to a display of the owned assets associated with or registered to an enterprise user's fleet); an edge compute units 852 UI element (e.g., corresponding to a display of the edge compute units 810, . . . , 810-N associated with or registered to an enterprise user's fleet); a deployed AI/ML applications 856 UI element (e.g., corresponding to a display of the selection of AI/ML applications deployed to the enterprise user's fleet of edge compute units); a deployable AI/ML application repository 858 UI element (e.g., corresponding to a display of available AI/ML applications that can be deployed from the repository 550 of FIG. 5 or the repository 650 of FIGS. 6 and 7); a users and roles 862 UI element (e.g., corresponding to a display of registered users and roles for interacting with the remote fleet management system and/or the global management console 620 of FIGS. 6 and 7); a remote monitoring 864 UI element (e.g., corresponding to a display of remote monitoring and telemetry data, such as data from the edge observer 760 of FIG. 7 and deployed on each edge compute unit of the enterprise user's fleet); and a security 866 UI element (e.g., corresponding to a display of security information, alerts, monitoring information, etc.).

A plurality of user interface elements presented in the horizontal row at the top of the example Remote Fleet Management GUI 800 can be used to filter a display of the fleet map 802 information within the GUI 800. For instance, the edge compute units UI element 810 can be used to select for display the plurality (e.g., fleet) of edge compute units 810-1, . . . , 810-N included in the fleet map 802. The satellites UI element 832 can be used to select for display the satellite transceiver units 822 included in the fleet map 802 and associated with particular ones of the edge compute units 810-1, . . . , 810-N. The cameras UI element 834 can be used to select for display the cameras 824 included in the fleet map 802 and associated with particular ones of the edge compute units 810-1, . . . , 810-N. The sensors UI element 836 can be used to select for display the sensors 826 included in the fleet map 802 and associated with particular ones of the edge compute units 810-1, . . . , 810-N. The robots UI element 838 can be used to select for display the robotic units 828 included in the fleet map 802 and associated with particular ones of the edge compute units 810-1, . . . , 810-N. The drones UI element 839 can be used to select for display the drone units 829 included in the fleet map 802 and associated with particular ones of the edge compute units 810-1, . . . , 810-N. The vehicles UI element 837 can be used to select for display the vehicle units 827 included in the fleet map 802 and associated with particular ones of the edge compute units 810-1, . . . , 810-N.

In some aspects, the cameras 824, satellite transceivers 822, sensors 826, robotic units 828, drones 829, and vehicles 827 can be included in a set of connected assets 820 of the fleet map 802. The connected assets 820 of FIG. 8 can be the same as or similar to one or more of the connected assets 410 of FIG. 4 and/or the connected assets 710-1, . . . , 710-N of FIG. 7. In some aspects, each connected assets 820 instance (e.g., each individual asset) may be associated with a respective one of the edge compute units 810-1, . . . , 810-N. In some embodiments, one or more connected assets 820 instances (e.g., one or more individual assets within the fleet map 802) may be provided at an edge location without being associated with a respective one of the edge compute units 810-01, . . . , 810-N. For instance, an edge location may include a satellite transceiver 822 and one or more connected sensors 826, without including an edge compute unit 810 at the edge location. In another example, an edge location may include one or more satellite transceivers 822 configured to act as a communications relay for various other edge locations and edge compute units 810, without include an edge compute unit 810 at the edge location of the relay satellite transceiver(s) 822, etc.

In some aspects, each asset of the connected assets 820 included within the fleet map 802 can be associated with a corresponding health status information, as shown in the example Remote Fleet Management GUI 800 of FIG. 8. For instance, the corresponding health status information for each respective asset of the plurality of connected assets 820 can include a selection between one of a 'Healthy' status, an 'Attention' status, or a 'Critical' status. In some aspects, the corresponding health status information for each respective asset of the plurality of connected assets 820 can be selected for display within the GUI 800 using the corresponding health status selection UI elements 835-1, 835-2, and 835-3. For instance, the healthy assets UI selection element 835-1 can trigger display of the subset of assets within the plurality of connected assets 820 that are currently associated with the 'Healthy' status. The attention assets UI selection element 835-2 can trigger display of the subset of assets within the plurality of connected assets 820 that are currently associated with the 'Attention' status. The critical assets UI selection element 835-3 can trigger display of the subset of assets within the plurality of connected assets 820 that are currently associated with the 'Critical' status.

FIG. 9 is a diagram illustrating another example GUI 900 of a global management console associated with asset management and telemetry observation for a fleet of edge compute units of an edge computing system for ML and/or AI workloads, in accordance with some examples. In one illustrative example, the GUI 900 of FIG. 9 can correspond to selection of the edge compute units UI element 854 of the Remote Fleet Management GUI 800 of FIG. 8 (e.g., and the GUI 800 of FIG. 8 can correspond to selection of the owned assets UI element 852). The GUI 900 of FIG. 9 can be indicative of drill-down or detailed information corresponding to a selected edge compute unit of the plurality of edge compute units 810-1, . . . , 810-N of the fleet map 802 of FIG. 8. For instance, the selected edge compute unit can correspond to a specific location (e.g., Houston, TX) of the edge site deployment location and/or can be identified in the GUI 900 based on a unique name or identifier of the selected edge compute unit (e.g., GAL-TX-R76A). The GUI 900 can include a UI element 910 for displaying host metrics information of the selected edge compute unit; a UI element 912 for displaying power and environmental metrics information of the selected edge compute unit; and a UI element 914 for displaying app metrics information of the selected edge compute unit. In some aspects, the app metrics UI element 914 can correspond to application metrics associated with a subset of the AI/ML applications 856 of FIG. 8, where the subset comprises the particular AI/ML applications that are deployed on the selected edge compute unit.

In one illustrative example, the GUI 900 of FIG. 9 can correspond to the selection of the host metrics UI element 910. The host metrics display of GUI 900 can include a CPU utilization information 920, which can be indicative of CPU utilization information (e.g., a percentage) of the selected edge compute unit relative to a total CPU cores available 925 for the selected edge compute unit. The host metrics display of GUI 900 can include a memory utilization information 930, which can be indicative of memory utilization information (e.g., a percentage) of the selected edge compute unit relative to a total memory available 935 for the selected edge compute unit. The host metrics display of GUI 900 can include a storage utilization information 940, which can be indicative of storage utilization information (e.g., a percentage) of the selected edge compute unit relative to a total storage available 935 for the selected edge compute unit. The host metrics display of GUI 900 can include a GPU utilization information 970, which can be indicative of GPU utilization information (e.g., a percentage) of the selected edge compute unit relative to a total GPU TFLOPS available 975 for the selected edge compute unit.

In some embodiments, some (or all) of the host utilization information 920, 930, 940, 970 can be displayed within GUI 900 in combination with a corresponding utilization graph and/or historical utilization information at the selected edge compute unit. For instance, the CPU utilization information 920 can correspond to a CPU utilization graph 928 and/or other time-based or historical CPU utilization information at the selected edge compute unit. The memory utilization information 930 can correspond to a memory utilization graph 938 and/or other time-based or historical memory utilization information at the selected edge compute unit. The storage utilization information 940 can correspond to a storage utilization graph 948 and/or other time-based or historical storage utilization information at the selected edge compute unit. The GPU utilization information 970 can correspond to a GPU utilization graph 978 and/or other time-based or historical GPU utilization information at the selected edge compute unit.

In some examples, the systems and techniques described herein can be implemented or otherwise performed by a computing device, apparatus, or system. In one example, the systems and techniques described herein can be implemented or performed by a computing device or system having the computing device architecture 1000 of FIG. 10. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Processes described herein can comprise a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
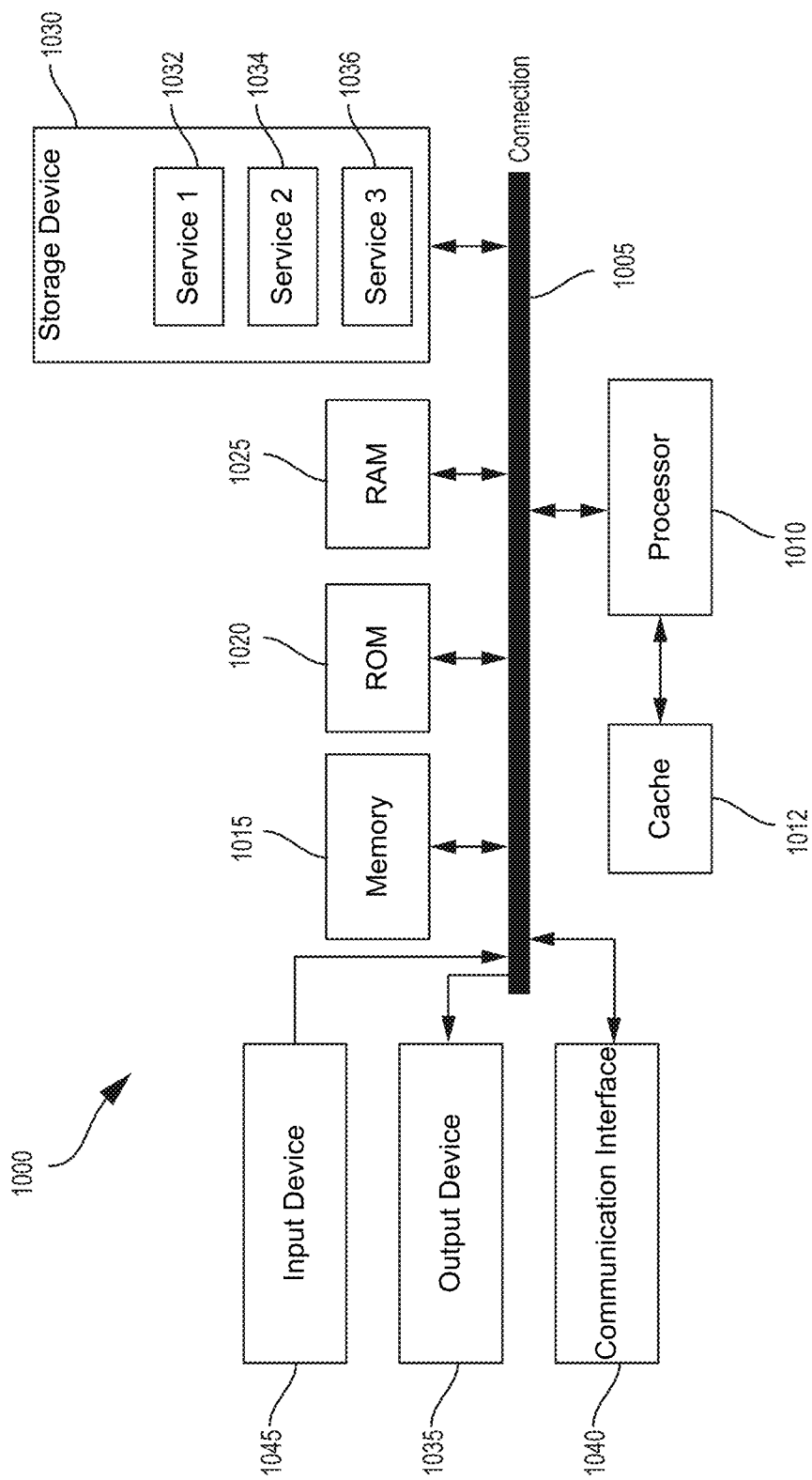
FIG. 10 is a block diagram illustrating an example of a computing system architecture that can be used to implement one or more aspects described herein, in accordance with some examples.

FIG. 10 illustrates an example computing device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1000 are shown in electrical communication with each other using connection 1005, such as a bus. The example computing device architecture 1000 includes a processing unit (CPU or processor) 1010 and computing device connection 1005 that couples various computing device components including computing device memory 1015, such as read only memory (ROM) 1020 and random-access memory (RAM) 1025, to processor 1010.

Computing device architecture 1000 can include a cache of high-speed memory connected directly with, in close proximity to, or integrated as part of processor 1010. Computing device architecture 1000 can copy data from memory 1015 and/or the storage device 1030 to cache 1012 for quick access by processor 1010. In this way, the cache can provide a performance boost that avoids processor 1010 delays while waiting for data. These and other engines can control or be configured to control processor 1010 to perform various actions. Other computing device memory 1015 may be available for use as well. Memory 1015 can include multiple different types of memory with different performance characteristics. Processor 1010 can include any general-purpose processor and a hardware or software service, such as service 1 1032, service 2 1034, and service 3 1036 stored in storage device 1030, configured to control processor 1010 as well as a special-purpose processor where software instructions are incorporated into the processor design. Processor 1010 may be a self-contained system, containing multiple cores or processors, a bus, memory controller, cache, etc. A multi-core processor may be symmetric or asymmetric.

To enable user interaction with the computing device architecture 1000, input device 1045 can represent any number of input mechanisms, such as a microphone for speech, a touch-sensitive screen for gesture or graphical input, keyboard, mouse, motion input, speech and so forth. Output device 1035 can also be one or more of a number of output mechanisms known to those of skill in the art, such as a display, projector, television, speaker device, etc. In some instances, multimodal computing devices can enable a user to provide multiple types of input to communicate with computing device architecture 1000. Communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. Storage device 1030 can include services 1032, 1034, 1036 for controlling processor 1010. Other hardware or software modules or engines are contemplated. Storage device 1030 can be connected to the computing device connection 1005. In one aspect, a hardware module that performs a particular function can include the software component stored in a computer-readable medium in connection with the necessary hardware components, such as processor 1010, connection 1005, output device 1035, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method comprising: obtaining a pre-trained machine learning model corresponding to a request; transmitting the pre-trained machine learning model to an edge compute unit associated with the request, wherein the edge compute unit is deployed to an edge location and configured to perform inference using the pre-trained machine learning model and one or more sensor data streams obtained at the edge location; receiving, from the edge compute unit, one or more batch uploads of information associated with inference performed by the edge compute unit and using the pre-trained machine learning model; generating one or more updated machine learning models corresponding to the pre-trained machine learning model, based on using the batch uploads of information from the edge compute unit to retrain or finetune the pre-trained machine learning model; and transmitting the updated machine learning model to the edge compute unit, wherein transmission of the updated machine learning model is responsive to receiving the one or more batch uploads of information.

Aspect 2. The method of Aspect 1, wherein: the request is indicative of a selection of a machine learning (ML) or artificial intelligence (AI) application qualified for deployment on the edge compute unit; and the ML or AI application qualified for deployment on the edge compute unit is selected from a repository including a plurality of ML or AI applications.

Aspect 3. The method of Aspect 2, wherein the selected ML or AI application utilizes one or more pre-trained machine learning models, including the pre-trained machine learning model corresponding to the request.

Aspect 4. The method of any of Aspects 2 to 3, wherein the ML or AI application is qualified for deployment on the edge compute unit based on one or more of: a comparison between a computational hardware configuration requirement of the ML or AI application and a respective computational hardware deployment of the edge compute unit; or a comparison between a connected edge asset requirement of the ML or AI application and a respective connected edge asset deployment associated with the edge compute unit.

Aspect 5. The method of Aspect 4, wherein the connected edge asset requirement of the ML or AI application is indicative of one or more types of input data required for the ML or AI application, and wherein the one or more types of input data required correspond to a set of connected edge asset types.

Aspect 6. The method of any of Aspects 4 to 5, wherein: the connected edge asset requirement is indicative of one or more different modalities of the one or more sensor data streams for inference using the pre-trained machine learning model; and the comparison between the connected edge asset requirement and the respective connected edge asset deployment associated with the edge compute unit is based on a determination of one or more sensor data stream modalities available at the edge compute unit.

Aspect 7. The method of any of Aspects 4 to 6, wherein the connected edge asset requirement is indicative of one or more sensor types for generating the one or more sensor data streams obtained at the edge location.

Aspect 8. The method of any of Aspects 4 to 7, wherein the connected edge asset requirement is indicative of one or more robotic assets associated with obtaining the one or more sensor data streams at the edge location.

Aspect 9. The method of any of Aspects 2 to 8, wherein: the ML or AI application is configured to generate as output one or more control commands for a respective edge device type; and the ML or AI application is qualified for deployment on the edge compute unit based on a determination that the edge compute unit is communicatively coupled to at least one edge device of the respective edge device type and provided at the edge location.

Aspect 10. The method of Aspect 9, wherein: the ML or AI application is configured to generate as output routing instructions for one or more drones or robotic units provided at the edge location and communicatively coupled to the edge compute unit.

Aspect 11. The method of any of Aspects 1 to 10, wherein: the edge compute unit comprises an edge infrastructure node having self-contained storage hardware, computational hardware, and connectivity hardware within a single housing.

Aspect 12. The method of Aspect 11, wherein the edge infrastructure node is a containerized edge data center unit.

Aspect 13. The method of any of Aspects 1 to 12, further comprising: receiving the request from the edge compute unit, wherein the request is received from the edge compute unit using a satellite internet constellation connectivity link associated with one or more satellite transceivers of the edge compute unit.

Aspect 14. The method of any of Aspects 1 to 13, wherein the pre-trained machine learning model is transmitted to the edge compute unit using satellite internet constellation connectivity.

Aspect 15. The method of any of Aspects 1 to 14, wherein the pre-trained machine learning model is transmitted to the edge compute unit from a cloud deployment of a plurality of ML or AI training clusters.

Aspect 16. The method of Aspect 15, wherein: obtaining the pre-trained machine learning model comprises training a baseline machine learning model using the cloud deployment of the plurality of ML or AI training clusters; and training is performed based at least in part on training data corresponding to one or more sensor data streams at the edge location and associated with the edge compute unit.

Aspect 17. The method of any of Aspects 1 to 16, wherein the one or more batch uploads of information are indicative of performance metrics associated with the inference performed by the edge compute unit, and wherein the method further comprises: analyzing the performance metrics associated with the inference performed by the edge compute unit; and based on a determination that inference performance of the edge compute unit is below a configured threshold, generating and transmitting the updated machine learning model to the edge compute unit.

Aspect 18. The method of Aspect 17, further comprising: analyzing the performance metrics associated with the inference performed by the edge compute unit; and based on a determination that inference performance of the edge compute unit is below a configured threshold, transmitting to the edge compute unit a command to perform one or more of model retraining or model finetuning for the pre-trained machine learning model.

Aspect 19. The method of Aspect 18, further comprising transmitting, to the edge compute unit, supplemental information for performing the one or more of model retraining or model finetuning.

Aspect 20. The method of Aspect 19, wherein: the supplemental information for model retaining or model finetuning is generated based on respective batch upload information received from one or more additional edge compute units different from the edge compute unit; and the one or more additional edge compute units are configured to perform inference using the same pre-trained machine learning model.

Aspect 21. An apparatus comprising means for performing any of the operations of Aspects 1 to 20.

Aspect 22. A non-transitory computer-readable storage medium having stored thereon instructions which, when executed by one or more processors, cause the one or more processors to perform any of the operations of Aspects 1 to 20.

Aspect 23. An apparatus, comprising: at least one memory; and at least one processor coupled to the at least one memory, the at least one processor configured to: obtain a pre-trained machine learning model corresponding to a request; transmit the pre-trained machine learning model to an edge compute unit associated with the request, wherein the edge compute unit is deployed to an edge location and configured to perform inference using the pre-trained machine learning model and one or more sensor data streams obtained at the edge location; receive, from the edge compute unit, one or more batch uploads of information associated with inference performed by the edge compute unit and using the pre-trained machine learning model; generate one or more updated machine learning models corresponding to the pre-trained machine learning model, based on using the batch uploads of information from the edge compute unit to retrain or finetune the pre-trained machine learning model; and transmit the updated machine learning model to the edge compute unit, wherein transmission of the updated machine learning model is responsive to receiving the one or more batch uploads of information.

Aspect 24. The apparatus of Aspect 23, wherein: the request is indicative of a selection of a machine learning (ML) or artificial intelligence (AI) application qualified for deployment on the edge compute unit; and the at least one processor is configured to select the ML or AI application qualified for deployment on the edge compute unit from a repository including a plurality of ML or AI applications.

Aspect 25. The apparatus of Aspect 24, wherein the selected ML or AI application utilizes one or more pre-trained machine learning models, including the pre-trained machine learning model corresponding to the request.

Aspect 26. The apparatus of any of Aspects 24 to 25, wherein the at least one processor is configured to determine the ML or AI application is qualified for deployment on the edge compute unit based on one or more of: a comparison between a computational hardware configuration requirement of the ML or AI application and a respective computational hardware deployment of the edge compute unit; or a comparison between a connected edge asset requirement of the ML or AI application and a respective connected edge asset deployment associated with the edge compute unit.

Aspect 27. The apparatus of Aspect 26, wherein the connected edge asset requirement of the ML or AI application is indicative of one or more types of input data required for the ML or AI application, and wherein the one or more types of input data required correspond to a set of connected edge asset types.

Aspect 28. The apparatus of any of Aspects 26 to 27, wherein: the connected edge asset requirement is indicative of one or more different modalities of the one or more sensor data streams for inference using the pre-trained machine learning model; and the at least one processor is configured to perform the comparison between the connected edge asset requirement and the respective connected edge asset deployment associated with the edge compute unit based on a determination of one or more sensor data stream modalities available at the edge compute unit.

Aspect 29. The apparatus of any of Aspects 26 to 28, wherein the connected edge asset requirement is indicative of one or more sensor types for generating the one or more sensor data streams obtained at the edge location.

Aspect 30. The apparatus of any of Aspects 26 to 29, wherein the connected edge asset requirement is indicative of one or more robotic assets associated with obtaining the one or more sensor data streams at the edge location.

Aspect 31. The apparatus of any of Aspects 24 to 30, wherein: the ML or AI application is configured to generate as output one or more control commands for a respective edge device type; and the ML or AI application is qualified for deployment on the edge compute unit based on a determination that the edge compute unit is communicatively coupled to at least one edge device of the respective edge device type and provided at the edge location.

Aspect 32. The apparatus of Aspect 31, wherein: the ML or AI application is configured to generate as output routing instructions for one or more drones or robotic units provided at the edge location and communicatively coupled to the edge compute unit.

Aspect 33. The apparatus of any of Aspects 23 to 32, wherein: the edge compute unit comprises an edge infrastructure node having self-contained storage hardware, computational hardware, and connectivity hardware within a single housing.

Aspect 34. The apparatus of Aspect 33, wherein the edge infrastructure node is a containerized edge data center unit.

Aspect 35. The apparatus of any of Aspects 23 to 34, wherein the at least one processor is further configured to: receive the request from the edge compute unit, wherein the request is received from the edge compute unit using a satellite internet constellation connectivity link associated with one or more satellite transceivers of the edge compute unit.

Aspect 36. The apparatus of any of Aspects 23 to 35, wherein the at least one processor is configured to transmit the pre-trained machine learning model to the edge compute unit using satellite internet constellation connectivity.

Aspect 37. The apparatus of any of Aspects 23 to 36, wherein the at least one processor is configured to transmit the pre-trained machine learning model to the edge compute unit from a cloud deployment of a plurality of ML or AI training clusters.

Aspect 38. The apparatus of Aspect 37, wherein: to obtain the pre-trained machine learning model, the at least one processor is configured to train a baseline machine learning model using the cloud deployment of the plurality of ML or AI training clusters; and to train the baseline machine learning model, the at least one processor is configured to perform training based at least in part on training data corresponding to one or more sensor data streams at the edge location and associated with the edge compute unit.

Aspect 39. The apparatus of any of Aspects 23 to 38, wherein the one or more batch uploads of information are indicative of performance metrics associated with the inference performed by the edge compute unit, and wherein the at least one processor is further configured to: analyze the performance metrics associated with the inference performed by the edge compute unit; and based on a determination that inference performance of the edge compute unit is below a configured threshold, generate and transmit the updated machine learning model to the edge compute unit.

Aspect 40. The apparatus of Aspect 39, wherein the at least one processor is further configured to: analyze the performance metrics associated with the inference performed by the edge compute unit; and based on a determination that inference performance of the edge compute unit is below a configured threshold, transmit to the edge compute unit a command to perform one or more of model retraining or model finetuning for the pre-trained machine learning model.

Aspect 41. The apparatus of Aspect 40, wherein the at least one processor is configured to transmit, to the edge compute unit, supplemental information for performing the one or more of model retraining or model finetuning.

Aspect 42. The apparatus of Aspect 41, wherein: the at least one processor is configured to generate the supplemental information for model retaining or model finetuning based on respective batch upload information received from one or more additional edge compute units different from the edge compute unit; and the one or more additional edge compute units are configured to perform inference using the same pre-trained machine learning model.

Aspect 43. A method comprising operations according to any of Aspects 23 to 42.

Aspect 44. A non-transitory computer-readable storage medium having stored thereon instructions which, when executed by one or more processors, cause the one or more processors to perform any of the operations of Aspects 23 to 42.

Aspect 45. A method comprising: transmitting, from an edge compute unit, a request corresponding to a pre-trained machine learning model; receiving, from a cloud management platform and by the edge compute unit, the pre-trained machine learning model, wherein the edge compute unit is deployed to an edge location and configured to obtain one or more sensor data streams at the edge location; transmitting, from the edge compute unit, one or more batch uploads of information associated with inference performed by the edge compute unit using the pre-trained machine learning model and the one or more sensor data streams, wherein the one or more batch uploads of information are transmitted to the cloud management platform; and receiving, by the edge compute unit, one or more updated machine learning models generated by the cloud management platform responsive to the one or more batch uploads of information, wherein the one or more updated machine learning models are based on retraining or finetuning of the pre-trained machine learning model with the one or more batch uploads of information.

Aspect 46. The method of Aspect 45, wherein: the request is indicative of a selection of a machine learning (ML) or artificial intelligence (AI) application qualified for deployment on the edge compute unit; and the ML or AI application qualified for deployment on the edge compute unit is selected from a repository including a plurality of ML or AI applications.

Aspect 47. The method of Aspect 46, wherein the selected ML or AI application utilizes one or more pre-trained machine learning models, including the pre-trained machine learning model corresponding to the request.

Aspect 48. The method of any of Aspects 46 to 47, wherein the ML or AI application is qualified for deployment on the edge compute unit based on one or more of: a comparison between a computational hardware configuration requirement of the ML or AI application and a respective computational hardware deployment of the edge compute unit; or a comparison between a connected edge asset requirement of the ML or AI application and a respective connected edge asset deployment associated with the edge compute unit.

Aspect 49. The method of Aspect 48, wherein the connected edge asset requirement of the ML or AI application is indicative of one or more types of input data required for the ML or AI application, and wherein the one or more types of input data required correspond to a set of connected edge asset types.

Aspect 50. The method of any of Aspects 48 to 49, wherein: the connected edge asset requirement is indicative of one or more different modalities of the one or more sensor data streams for inference using the pre-trained machine learning model; and the comparison between the connected edge asset requirement and the respective connected edge asset deployment associated with the edge compute unit is based on a determination of one or more sensor data stream modalities available at the edge compute unit.

Aspect 51. The method of any of Aspects 48 to 50, wherein the connected edge asset requirement is indicative of one or more sensor types for generating the one or more sensor data streams obtained at the edge location.

Aspect 52. The method of any of Aspects 48 to 51, wherein the connected edge asset requirement is indicative of one or more robotic assets associated with obtaining the one or more sensor data streams at the edge location.

Aspect 53. The method of any of Aspects 46 to 52, wherein: the ML or AI application is configured to generate as output one or more control commands for a respective edge device type; and the ML or AI application is qualified for deployment on the edge compute unit based on a determination that the edge compute unit is communicatively coupled to at least one edge device of the respective edge device type and provided at the edge location.

Aspect 54. The method of Aspect 53, wherein: the ML or AI application is configured to generate as output routing instructions for one or more drones or robotic units provided at the edge location and communicatively coupled to the edge compute unit.

Aspect 55. The method of any of Aspects 45 to 54, wherein: the edge compute unit comprises an edge infrastructure node having self-contained storage hardware, computational hardware, and connectivity hardware within a single housing.

Aspect 56. The method of Aspect 55, wherein the edge infrastructure node is a containerized edge data center unit.

Aspect 57. The method of any of Aspects 45 to 56, further comprising: transmitting the request from the edge compute unit and to the cloud management platform using a satellite internet constellation connectivity link associated with one or more satellite transceivers of the edge compute unit.

Aspect 58. The method of any of Aspects 45 to 57, wherein the pre-trained machine learning model is received from the cloud management platform and by the edge compute unit using satellite internet constellation connectivity.

Aspect 59. The method of any of Aspects 45 to 58, wherein the pre-trained machine learning model is received by the edge compute unit from a cloud deployment of a plurality of ML or AI training clusters, the cloud deployment associated with or included in the cloud management platform.

Aspect 60. The method of Aspect 59, wherein: the pre-trained machine learning model comprises a baseline machine learning model trained by the cloud deployment of the plurality of ML or AI training clusters; and the baseline machine learning model is trained based at least in part on training data corresponding to the one or more sensor data streams at the edge location, wherein the edge compute unit is configured to transmit the one or more sensor data streams to the cloud management platform.

Aspect 61. The method of any of Aspects 45 to 60, wherein the one or more batch uploads of information are indicative of performance metrics associated with the inference performed by the edge compute unit, and wherein the edge compute unit receives the one or more updated machine learning models based on a determination that inference performance of the edge compute unit is below a configured threshold.

Aspect 62. The method of Aspect 61, further comprising: based on a determination that inference performance of the edge compute unit is below a configured threshold, receiving from the cloud management platform and by the edge compute unit, a command to perform one or more of model retraining or model finetuning for the pre-trained machine learning model; and performing, by the edge compute unit, the commanded one or more of model retraining or model finetuning for the pre-trained machine learning model.

Aspect 63. The method of Aspect 62, further comprising receiving, from the cloud management platform and by the edge compute unit, supplemental information for performing the commanded one or more of model retraining or model finetuning.

Aspect 64. The method of Aspect 63, wherein: the supplemental information for model retaining or model finetuning is generated based on respective batch upload information received from one or more additional edge compute units different from the edge compute unit; and the one or more additional edge compute units are configured to perform inference using the same pre-trained machine learning model.

Aspect 65. An apparatus comprising means for performing any of the operations of Aspects 45 to 64.

Aspect 66. A non-transitory computer-readable storage medium having stored thereon instructions which, when executed by one or more processors, cause the one or more processors to perform any of the operations of Aspects 45 to 64.

Aspect 67. An apparatus of an edge compute unit, comprising: at least one memory; and at least one processor coupled to the at least one memory, the at least one processor configured to: transmit, from the edge compute unit, a request corresponding to a pre-trained machine learning model; receive, from a cloud management platform and by the edge compute unit, the pre-trained machine learning model, wherein the edge compute unit is deployed to an edge location and configured to obtain one or more sensor data streams at the edge location; transmit, from the edge compute unit, one or more batch uploads of information associated with inference performed by the edge compute unit using the pre-trained machine learning model and the one or more sensor data streams, wherein the at least one processor is configured to transmit the one or more batch uploads of information to the cloud management platform; and receive, by the edge compute unit, one or more updated machine learning models generated by the cloud management platform responsive to the one or more batch uploads of information, wherein the one or more updated machine learning models are based on retraining or finetuning of the pre-trained machine learning model with the one or more batch uploads of information.

Aspect 68. The apparatus of Aspect 67, wherein: the request is indicative of a selection of a machine learning (ML) or artificial intelligence (AI) application qualified for deployment on the edge compute unit; and the ML or AI application qualified for deployment on the edge compute unit is selected from a repository including a plurality of ML or AI applications.

Aspect 69. The apparatus of Aspect 68, wherein the selected ML or AI application utilizes one or more pre-trained machine learning models, including the pre-trained machine learning model corresponding to the request.

Aspect 70. The apparatus of any of Aspects 68 to 69, wherein the ML or AI application is qualified for deployment on the edge compute unit based on one or more of: a comparison between a computational hardware configuration requirement of the ML or AI application and a respective computational hardware deployment of the edge compute unit; or a comparison between a connected edge asset requirement of the ML or AI application and a respective connected edge asset deployment associated with the edge compute unit.

Aspect 71. The apparatus of Aspect 70, wherein the connected edge asset requirement of the ML or AI application is indicative of one or more types of input data required for the ML or AI application, and wherein the one or more types of input data required correspond to a set of connected edge asset types.

Aspect 72. The apparatus of any of Aspects 70 to 71, wherein: the connected edge asset requirement is indicative of one or more different modalities of the one or more sensor data streams for inference using the pre-trained machine learning model; and the comparison between the connected edge asset requirement and the respective connected edge asset deployment associated with the edge compute unit is based on a determination of one or more sensor data stream modalities available at the edge compute unit.

Aspect 73. The apparatus of any of Aspects 70 to 72, wherein the connected edge asset requirement is indicative of one or more sensor types for generating the one or more sensor data streams obtained at the edge location.

Aspect 74. The apparatus of any of Aspects 70 to 73, wherein the connected edge asset requirement is indicative of one or more robotic assets associated with obtaining the one or more sensor data streams at the edge location.

Aspect 75. The apparatus of any of Aspects 68 to 74, wherein: the ML or AI application is configured to generate as output one or more control commands for a respective edge device type; and the ML or AI application is qualified for deployment on the edge compute unit based on a determination that the edge compute unit is communicatively coupled to at least one edge device of the respective edge device type and provided at the edge location.

Aspect 76. The apparatus of Aspect 75, wherein: the ML or AI application is configured to generate as output routing instructions for one or more drones or robotic units provided at the edge location and communicatively coupled to the edge compute unit.

Aspect 77. The apparatus of any of Aspects 67 to 76, wherein: the edge compute unit comprises an edge infrastructure node having self-contained storage hardware, computational hardware, and connectivity hardware within a single housing.

Aspect 78. The apparatus of Aspect 77, wherein the edge infrastructure node is a containerized edge data center unit.

Aspect 79. The apparatus of any of Aspects 67 to 78, wherein, to transmit the request from the edge compute unit and to the cloud management platform, the at least one processor is configured to: use a satellite internet constellation connectivity link associated with one or more satellite transceivers of the edge compute unit to transmit the request.

Aspect 80. The apparatus of Aspect 67, wherein, to receive the pre-trained machine learning model, the at least one processor is configured to: use satellite internet constellation connectivity to receive the pre-trained machine learning model from the cloud management platform.

Aspect 81. The apparatus of any of Aspects 67 to 80, wherein, to receive the pre-trained machine learning model, the at least one processor is configured to: receive the pre-trained machine learning model from a cloud deployment of a plurality of ML or AI training clusters, the cloud deployment associated with or included in the cloud management platform.

Aspect 82. The apparatus of Aspect 81, wherein: the pre-trained machine learning model comprises a baseline machine learning model trained by the cloud deployment of the plurality of ML or AI training clusters; and the baseline machine learning model is trained based at least in part on training data corresponding to the one or more sensor data streams at the edge location, wherein the at least one processor is configured to transmit the one or more sensor data streams to the cloud management platform.

Aspect 83. The apparatus of any of Aspects 67 to 82, wherein the one or more batch uploads of information are indicative of performance metrics associated with the inference performed by the edge compute unit, and wherein the at least one processor is configured to receive the one or more updated machine learning models based on a determination that inference performance of the edge compute unit is below a configured threshold.

Aspect 84. The apparatus of Aspect 83, wherein the at least one processor is further configured to: receive, from the cloud management platform and based on a determination that inference performance of the edge compute unit is below a configured threshold, a command to perform one or more of model retraining or model finetuning for the pre-trained machine learning model; and perform the commanded one or more of model retraining or model finetuning for the pre-trained machine learning model.

Aspect 85. The apparatus of Aspect 84, wherein the at least one processor is further configured to: receive, from the cloud management platform, supplemental information for performing the commanded one or more of model retraining or model finetuning.

Aspect 86. The apparatus of Aspect 85, wherein: the supplemental information for model retaining or model finetuning is generated based on respective batch upload information received from one or more additional edge compute units different from the edge compute unit; and the one or more additional edge compute units are configured to perform inference using the same pre-trained machine learning model.

Aspect 87. A method comprising operations according to any of Aspects 67 to 42.

Aspect 88. A non-transitory computer-readable storage medium having stored thereon instructions which, when executed by one or more processors, cause the one or more processors to perform any of the operations of Aspects 67 to 86.

Aspect 89. A method comprising: receiving monitoring information from each respective edge compute unit of a plurality of edge compute units, wherein the monitoring information includes information associated with one or more machine learning (ML) or artificial intelligence (AI) workloads implemented by the respective edge compute unit; receiving respective status information corresponding to a plurality of connected edge assets, wherein each connected edge asset is associated with one or more edge compute units of the plurality of edge compute units, and wherein the plurality of edge compute units and the plurality of connected edge assets are included in a fleet of edge devices; displaying, using a remote fleet management graphical user interface (GUI), at least a portion of the monitoring information or the status information corresponding to a selected subset of the fleet of edge devices, wherein the selected subset is determined based on one or more user selection inputs to the remote fleet management GUI; receiving, using the remote fleet management GUI, one or more user configuration inputs indicative of an updated configuration for at least one workload associated with at least one workload of at least one edge compute unit of the selected subset of the fleet of edge devices, the at least one workload corresponding to a pre-trained ML or AI model deployed on the at least one edge compute unit; and transmitting, from a cloud computing environment associated with the remote fleet management GUI, control information corresponding to the updated configuration, wherein the control information is transmitted to the at least one edge compute unit of the selected subset.

Aspect 90. The method of Aspect 89, wherein the one or more user configuration inputs are indicative of an updated configuration for a respective ML or AI workload of the one or more ML or AI workloads.

Aspect 91. The method of any of Aspects 89 to 90, wherein the updated configuration for the respective ML or AI workload corresponds to a pre-trained ML or AI model associated with the respective ML or AI workload.

Aspect 92. The method of Aspect 91, wherein the updated configuration is configured to cause the at least one edge compute unit of the selected subset to perform local retraining of the pre-trained ML or AI model at an edge location of the at least one edge compute unit.

Aspect 93. The method of Aspect 92, wherein the updated configuration further includes retraining information for the local retraining of the pre-trained ML or AI model at the edge location.

Aspect 94. The method of Aspect 93, wherein the retraining information is generated by the cloud computing environment based on information obtained across the plurality of edge compute units included in the fleet of edge devices.

Aspect 95. The method of any of Aspects 91 to 94, wherein the updated configuration is configured to cause the at least one edge compute unit of the selected subset to perform local finetuning of the pre-trained ML or AI model at an edge location of the at least one edge compute unit.

Aspect 96. The method of Aspect 95, wherein the updated configuration further includes finetuning information for the local finetuning of the pre-trained ML or AI model at the edge location.

Aspect 97. The method of Aspect 96, wherein the finetuning information is generated by the cloud computing environment based on information obtained across the plurality of edge compute units included in the fleet of edge devices.

Aspect 98. The method of any of Aspects 91 to 97, wherein the updated configuration is configured to cause a subset of edge compute units of the plurality of edge compute units of the fleet of edge devices to perform distributed retraining of the pre-trained ML or AI model, and wherein the updated configuration information includes orchestration information for distributing a retraining workload across the respective edge compute units of the subset of edge compute units.

Aspect 99. The method of any of Aspects 91 to 98, wherein the updated configuration is configured to cause a subset of edge compute units of the plurality of edge compute units of the fleet of edge devices to perform distributed finetuning of the pre-trained ML or AI model, and wherein the updated configuration information includes orchestration information for distributing a finetuning workload across the respective edge compute units of the subset of edge compute units.

Aspect 100. The method of any of Aspects 89 to 99, wherein the one or more user configuration inputs are indicative of an updated network connectivity configuration applicable to at least a portion of the selected subset of the fleet of edge devices.

Aspect 101. The method of Aspect 100, wherein: the updated network connectivity configuration corresponds to a local edge network implemented at an edge deployment location of a plurality of edge deployment locations for the fleet of edge devices; and the local edge network is implemented at the edge deployment location by a corresponding edge compute unit of the fleet of edge devices.

Aspect 102. The method of Aspect 101, wherein the local edge network is configured for wireless communications between the corresponding edge compute unit and the respective connected edge assets associated with the corresponding edge compute unit.

Aspect 103. The method of Aspect 102, wherein the updated network connectivity configuration corresponds to updated provisioning information for deploying one or more additional connected edge assets to the fleet of edge devices and within the edge deployment location.

Aspect 104. The method of any of Aspects 100 to 103, wherein the one or more user configuration inputs are indicative of an updated network connectivity configuration applicable to one or more internet backhaul links between the fleet of edge devices and the cloud computing environment associated with the remote fleet management GUI.

Aspect 105. The method of Aspect 104, wherein each internet backhaul link of the one or more internet backhaul links is configured between a respective edge deployment location of a plurality of edge deployment locations for the fleet of edge devices and the cloud computing environment associated with the remote fleet management GUI.

Aspect 106. The method of any of Aspects 104 to 105, wherein each internet backhaul link of the one or more internet backhaul links comprises a satellite internet constellation backhaul link between at least one edge device of the fleet of edge devices and at least one satellite of a satellite internet constellation.

Aspect 107. The method of Aspect 106, wherein the one or more user configuration inputs are indicative of updated subscription information between the satellite internet constellation and a satellite internet constellation transceiver terminal associated with an edge compute unit of the fleet of edge devices.

Aspect 108. The method of any of Aspects 100 to 107, wherein the updated network connectivity configuration corresponds to a Software-Defined Networking (SDN) layer associated with the fleet of edge devices, and wherein the updated network connectivity configuration is indicative of one or more updated SDN layer configurations for at least a portion of the plurality of edge compute units of the fleet of edge devices.

Aspect 109. An apparatus comprising means for performing any of the operations of Aspects 89 to 108.

Aspect 110. A non-transitory computer-readable storage medium having stored thereon instructions which, when executed by one or more processors, cause the one or more processors to perform any of the operations of Aspects 89 to 108.

Aspect 111. An apparatus comprising: at least one memory; and at least one processor coupled to the at least one memory, the at least one processor configured to: receive monitoring information from each respective edge compute unit of a plurality of edge compute units, wherein the monitoring information includes information associated with one or more machine learning (ML) or artificial intelligence (AI) workloads implemented by the respective edge compute unit; receive respective status information corresponding to a plurality of connected edge assets, wherein each connected edge asset is associated with one or more edge compute units of the plurality of edge compute units, and wherein the plurality of edge compute units and the plurality of connected edge assets are included in a fleet of edge devices; display, using a remote fleet management graphical user interface (GUI), at least a portion of the monitoring information or the status information corresponding to a selected subset of the fleet of edge devices, wherein the selected subset is determined based on one or more user selection inputs to the remote fleet management GUI; receive, using the remote fleet management GUI, one or more user configuration inputs indicative of an updated configuration for at least one workload associated with at least one workload of at least one edge compute unit of the selected subset of the fleet of edge devices, the at least one workload corresponding to a pre-trained ML or AI model deployed on the at least one edge compute unit; and transmit, from a cloud computing environment associated with the remote fleet management GUI, control information corresponding to the updated configuration, wherein the control information is transmitted to the at least one edge compute unit of the selected subset.

Aspect 112. The apparatus of Aspect 111, wherein the one or more user configuration inputs are indicative of an updated configuration for a respective ML or AI workload of the one or more ML or AI workloads.

Aspect 113. The apparatus of any of Aspects 111 to 112, wherein the updated configuration for the respective ML or AI workload corresponds to a pre-trained ML or AI model associated with the respective ML or AI workload.

Aspect 114. The apparatus of Aspect 113, wherein the updated configuration is configured to cause the at least one edge compute unit of the selected subset to perform local retraining of the pre-trained ML or AI model at an edge location of the at least one edge compute unit.

Aspect 115. The apparatus of Aspect 114, wherein the updated configuration further includes retraining information for the local retraining of the pre-trained ML or AI model at the edge location.

Aspect 116. The apparatus of Aspect 115, wherein the retraining information is generated by the cloud computing environment based on information obtained across the plurality of edge compute units included in the fleet of edge devices.

Aspect 117. The apparatus of any of Aspects 113 to 116, wherein the updated configuration is configured to cause the at least one edge compute unit of the selected subset to perform local finetuning of the pre-trained ML or AI model at an edge location of the at least one edge compute unit.

Aspect 118. The apparatus of Aspect 117, wherein the updated configuration further includes finetuning information for the local finetuning of the pre-trained ML or AI model at the edge location.

Aspect 119. The apparatus of Aspect 118, wherein the finetuning information is generated by the cloud computing environment based on information obtained across the plurality of edge compute units included in the fleet of edge devices.

Aspect 120. The apparatus of any of Aspects 113 to 119, wherein the updated configuration is configured to cause a subset of edge compute units of the plurality of edge compute units of the fleet of edge devices to perform distributed retraining of the pre-trained ML or AI model, and wherein the updated configuration information includes orchestration information for distributing a retraining workload across the respective edge compute units of the subset of edge compute units.

Aspect 121. The apparatus of any of Aspects 113 to 120, wherein the updated configuration is configured to cause a subset of edge compute units of the plurality of edge compute units of the fleet of edge devices to perform distributed finetuning of the pre-trained ML or AI model, and wherein the updated configuration information includes orchestration information for distributing a finetuning workload across the respective edge compute units of the subset of edge compute units.

Aspect 122. The apparatus of any of Aspects 111 to 121, wherein the one or more user configuration inputs are indicative of an updated network connectivity configuration applicable to at least a portion of the selected subset of the fleet of edge devices.

Aspect 123. The apparatus of Aspect 122, wherein: the updated network connectivity configuration corresponds to a local edge network implemented at an edge deployment location of a plurality of edge deployment locations for the fleet of edge devices; and the local edge network is implemented at the edge deployment location by a corresponding edge compute unit of the fleet of edge devices.

Aspect 124. The apparatus of Aspect 123, wherein the local edge network is configured for wireless communications between the corresponding edge compute unit and the respective connected edge assets associated with the corresponding edge compute unit.

Aspect 125. The apparatus of Aspect 124, wherein the updated network connectivity configuration corresponds to updated provisioning information for deploying one or more additional connected edge assets to the fleet of edge devices and within the edge deployment location.

Aspect 126. The apparatus of any of Aspects 122 to 125, wherein the one or more user configuration inputs are indicative of an updated network connectivity configuration applicable to one or more internet backhaul links between the fleet of edge devices and the cloud computing environment associated with the remote fleet management GUI.

Aspect 127. The apparatus of Aspect 126, wherein each internet backhaul link of the one or more internet backhaul links is configured between a respective edge deployment location of a plurality of edge deployment locations for the fleet of edge devices and the cloud computing environment associated with the remote fleet management GUI.

Aspect 128. The apparatus of any of Aspects 126 to 127, wherein each internet backhaul link of the one or more internet backhaul links comprises a satellite internet constellation backhaul link between at least one edge device of the fleet of edge devices and at least one satellite of a satellite internet constellation.

Aspect 129. The apparatus of Aspect 129, wherein the one or more user configuration inputs are indicative of updated subscription information between the satellite internet constellation and a satellite internet constellation transceiver terminal associated with an edge compute unit of the fleet of edge devices.

Aspect 130. The apparatus of any of Aspects 122 to 129, wherein the updated network connectivity configuration corresponds to a Software-Defined Networking (SDN) layer associated with the fleet of edge devices, and wherein the updated network connectivity configuration is indicative of one or more updated SDN layer configurations for at least a portion of the plurality of edge compute units of the fleet of edge devices.

Aspect 131. A method comprising operations according to any of Aspects 111 to 130.

Aspect 132. A non-transitory computer-readable storage medium having stored thereon instructions which, when executed by one or more processors, cause the one or more processors to perform any of the operations of Aspects 111 to 130.

Aspect 133. A method comprising: receiving monitoring information from each respective edge compute unit of a plurality of edge compute units, wherein the monitoring information includes information associated with one or more machine learning (ML) or artificial intelligence (AI) workloads implemented by the respective edge compute unit; receiving respective status information corresponding to a plurality of connected edge assets, wherein each connected edge asset is associated with one or more edge compute units of the plurality of edge compute units, and wherein the plurality of edge compute units and the plurality of connected edge assets are included in a fleet of edge devices; displaying, using a remote fleet management graphical user interface (GUI), at least a portion of the monitoring information or the status information corresponding to a selected subset of the fleet of edge devices, wherein the selected subset is determined based on one or more user selection inputs to the remote fleet management GUI; receiving, using the remote fleet management GUI, one or more user configuration inputs indicative of an updated configuration associated with at least one edge compute unit of the selected subset of the fleet of edge devices; and transmitting, from a cloud computing environment associated with the remote fleet management GUI, control information corresponding to the updated configuration, wherein the control information is transmitted to the at least one edge compute unit of the selected subset.

Aspect 134. The method of Aspect 133, wherein: the one or more user selection inputs are indicative of one or more edge deployment locations associated with the fleet of edge devices.

Aspect 135. The method of Aspect 134, wherein each respective edge deployment location of the one or more edge deployment locations includes at least one of: an edge compute unit of the plurality of edge compute units; or a satellite internet constellation transceiver configured to provide internet backhaul communications between the respective edge deployment location and the cloud computing environment associated with the remote fleet management GUI.

Aspect 136. The method of Aspect 135, wherein: the selected subset of the plurality of edge compute units comprises respective edge compute units deployed at one of the one or more edge deployment locations; and the selected subset of the plurality of connected edge assets comprises respective connected edge assets deployed at one of the one or more edge deployment locations.

Aspect 137. The method of any of Aspects 133 to 136, wherein displaying the at least a portion of the monitoring information or the status information corresponding to the selected subset of the fleet of edge devices comprises: receiving, using the remote fleet management GUI, the one or more user selection inputs; determining a first filtered subset of the plurality of edge compute units and a second filtered subset of the plurality of connected edge assets, the first filtered subset and the second filtered subset based on filtering selection information included in the one or more user selection inputs; and outputting for display, the at least a portion of the monitoring information or the status information corresponding to the first filtered subset of edge compute units and the second filtered subset of connected edge assets.

Aspect 138. The method of any of Aspects 133 to 137, further comprising: receiving, using the remote fleet management GUI, the one or more user selection inputs, each respective user selection input of the one or more user selection inputs indicative of a filtering selection corresponding to a respective dimension of the monitoring information and the status information for the fleet of edge devices; and updating a display output of the remote fleet management GUI based on the filtering selection indicated by each respective user selection input.

Aspect 139. The method of any of Aspects 133 to 138, wherein the remote fleet management GUI comprises a single pane of glass interface corresponding to the respective monitoring information and the respective status information for the edge compute units and the connected edge assets of the fleet of edge devices.

Aspect 140. The method of Aspect 139, wherein the single pane of glass interface includes one or more user interface input elements for receiving the one or more user configuration inputs.

Aspect 141. The method of any of Aspects 133 to 140, wherein one or more of the remote fleet management GUI or the cloud computing environment associated with the remote fleet management GUI corresponds to a plurality of user accounts uniquely associated with and provisioned for access to the monitoring information or the status information corresponding to the fleet of edge devices.

Aspect 142. The method of any of Aspects 133 to 141, wherein the fleet of edge devices is associated with a plurality of different edge deployment locations, each edge deployment location associated with a respective first subset of the plurality of edge compute units and a respective second subset of the plurality of connected edge assets.

Aspect 143. The method of any of Aspects 133 to 142, wherein the monitoring information includes a plurality of environmental sensor data streams corresponding to an internal environment of the respective edge compute unit.

Aspect 144. The method of any of Aspects 133 to 143, wherein the respective edge compute unit comprises a containerized edge data center unit including self-contained storage hardware, computational hardware, and connectivity hardware.

Aspect 145. The method of Aspect 144, wherein: the plurality of environmental sensor data streams correspond to an internal environment of the containerized edge data center unit; and the monitoring information further includes utilization information or health status information for one or more of the self-contained storage hardware, computational hardware, or connectivity hardware of the containerized edge data center unit.

Aspect 146. The method of any of Aspects 133 to 145, wherein receiving the respective status information corresponding to the plurality of connected edge assets comprises: receiving, from a first edge compute unit of the plurality of edge compute units, respective status information corresponding to a first subset of the plurality of connected edge assets, wherein the first subset of connected edge assets is associated with the first edge compute unit and a same first edge location as the first edge compute unit; and receiving, from a second edge compute unit of the plurality of edge compute units, respective status information corresponding to a second subset of the plurality of connected edge assets, wherein the second subset of connected edge assets is associated with the second edge compute unit and a same second edge location as the second edge compute unit.

Aspect 147. The method of any of Aspects 133 to 146, wherein the respective status information corresponding to the plurality of connected edge assets is indicative of one or more of health status information for a connected edge asset or connectivity status information for a connected edge asset.

Aspect 148. The method of Aspect 147, wherein the connectivity status information is indicative of a local edge network connectivity status between the connected edge asset and a corresponding edge compute unit of the plurality of edge compute units.

Aspect 149. The method of Aspect 148, wherein the corresponding edge compute unit is associated with the connected edge asset and provides a local edge network for connectivity with the connected edge asset.

Aspect 150. The method of any of Aspects 133 to 149, wherein the plurality of connected edge assets include one or more of: one or more satellite internet constellation transceiver units; one or more cameras; one or more local edge sensors; one or more deployable robotic units controllable by a respective edge compute unit of the plurality of edge compute units; one or more drone units controllable by a respective edge compute unit of the plurality of edge compute units; or one or more vehicles associated with a respective edge compute unit of the plurality of edge compute units; and wherein each connected edge asset of the plurality of edge assets is communicatively coupled with an edge compute unit of the plurality of edge compute units.

Aspect 151. The method of any of Aspects 133 to 150, wherein: the one or more user configuration inputs are indicative of an updated network connectivity configuration applicable to at least a portion of the selected subset of the fleet of edge devices; the updated network connectivity configuration corresponds to a configuration of redundant internet backhaul links between the fleet of edge devices and the cloud computing environment associated with the remote fleet management GUI; and the redundant internet backhaul links include satellite internet constellation internet backhaul links, 4G or 5G cellular internet backhaul links, and fiber optic internet backhaul links.

Aspect 152. The method of Aspect 151, wherein the updated network connectivity configuration is indicative of one or more updated network virtualization parameters for network virtualization across at least the fiber optic internet backhaul links and the satellite internet constellation internet backhaul links.

Aspect 153. An apparatus comprising means for performing any of the operations of Aspects 133 to 152.

Aspect 154. A non-transitory computer-readable storage medium having stored thereon instructions which, when executed by one or more processors, cause the one or more processors to perform any of the operations of Aspects 133 to 152.

Aspect 155. An apparatus comprising: at least one memory; and at least one processor coupled to the at least one memory, the at least one processor configured to: receive monitoring information from each respective edge compute unit of a plurality of edge compute units, wherein the monitoring information includes information associated with one or more machine learning (ML) or artificial intelligence (AI) workloads implemented by the respective edge compute unit; receive respective status information corresponding to a plurality of connected edge assets, wherein each connected edge asset is associated with one or more edge compute units of the plurality of edge compute units, and wherein the plurality of edge compute units and the plurality of connected edge assets are included in a fleet of edge devices; display, using a remote fleet management graphical user interface (GUI), at least a portion of the monitoring information or the status information corresponding to a selected subset of the fleet of edge devices, wherein the selected subset is determined based on one or more user selection inputs to the remote fleet management GUI; receive, using the remote fleet management GUI, one or more user configuration inputs indicative of an updated configuration associated with at least one edge compute unit of the selected subset of the fleet of edge devices; and transmit, from a cloud computing environment associated with the remote fleet management GUI, control information corresponding to the updated configuration, wherein the control information is transmitted to the at least one edge compute unit of the selected subset.

Aspect 156. The apparatus of Aspect 155, wherein: the one or more user selection inputs are indicative of one or more edge deployment locations associated with the fleet of edge devices.

Aspect 157. The apparatus of Aspect 156, wherein each respective edge deployment location of the one or more edge deployment locations includes at least one of: an edge compute unit of the plurality of edge compute units; or a satellite internet constellation transceiver configured to provide internet backhaul communications between the respective edge deployment location and the cloud computing environment associated with the remote fleet management GUI.

Aspect 158. The apparatus of Aspect 157, wherein: the selected subset of the plurality of edge compute units comprises respective edge compute units deployed at one of the one or more edge deployment locations; and the selected subset of the plurality of connected edge assets comprises respective connected edge assets deployed at one of the one or more edge deployment locations.

Aspect 159. The apparatus of any of Aspects 155 to 158, wherein displaying the at least a portion of the monitoring information or the status information corresponding to the selected subset of the fleet of edge devices comprises: receiving, using the remote fleet management GUI, the one or more user selection inputs; determining a first filtered subset of the plurality of edge compute units and a second filtered subset of the plurality of connected edge assets, the first filtered subset and the second filtered subset based on filtering selection information included in the one or more user selection inputs; and outputting for display, the at least a portion of the monitoring information or the status information corresponding to the first filtered subset of edge compute units and the second filtered subset of connected edge assets.

Aspect 160. The apparatus of any of Aspects 155 to 159, further comprising: receiving, using the remote fleet management GUI, the one or more user selection inputs, each respective user selection input of the one or more user selection inputs indicative of a filtering selection corresponding to a respective dimension of the monitoring information and the status information for the fleet of edge devices; and updating a display output of the remote fleet management GUI based on the filtering selection indicated by each respective user selection input.

Aspect 161. The apparatus of any of Aspects 155 to 160, wherein the remote fleet management GUI comprises a single pane of glass interface corresponding to the respective monitoring information and the respective status information for the edge compute units and the connected edge assets of the fleet of edge devices.

Aspect 162. The apparatus of Aspect 161, wherein the single pane of glass interface includes one or more user interface input elements for receiving the one or more user configuration inputs.

Aspect 163. The apparatus of any of Aspects 155 to 162, wherein one or more of the remote fleet management GUI or the cloud computing environment associated with the remote fleet management GUI corresponds to a plurality of user accounts uniquely associated with and provisioned for access to the monitoring information or the status information corresponding to the fleet of edge devices.

Aspect 164. The apparatus of any of Aspects 155 to 163, wherein the fleet of edge devices is associated with a plurality of different edge deployment locations, each edge deployment location associated with a respective first subset of the plurality of edge compute units and a respective second subset of the plurality of connected edge assets.

Aspect 165. The apparatus of any of Aspects 155 to 164, wherein the monitoring information includes a plurality of environmental sensor data streams corresponding to an internal environment of the respective edge compute unit.

Aspect 166. The apparatus of any of Aspects 155 to 165, wherein the respective edge compute unit comprises a containerized edge data center unit including self-contained storage hardware, computational hardware, and connectivity hardware.

Aspect 167. The apparatus of Aspect 166, wherein: the plurality of environmental sensor data streams correspond to an internal environment of the containerized edge data center unit; and the monitoring information further includes utilization information or health status information for one or more of the self-contained storage hardware, computational hardware, or connectivity hardware of the containerized edge data center unit.

Aspect 168. The apparatus of any of Aspects 155 to 167, wherein receiving the respective status information corresponding to the plurality of connected edge assets comprises: receiving, from a first edge compute unit of the plurality of edge compute units, respective status information corresponding to a first subset of the plurality of connected edge assets, wherein the first subset of connected edge assets is associated with the first edge compute unit and a same first edge location as the first edge compute unit; and receiving, from a second edge compute unit of the plurality of edge compute units, respective status information corresponding to a second subset of the plurality of connected edge assets, wherein the second subset of connected edge assets is associated with the second edge compute unit and a same second edge location as the second edge compute unit.

Aspect 169. The apparatus of any of Aspects 155 to 168, wherein the respective status information corresponding to the plurality of connected edge assets is indicative of one or more of health status information for a connected edge asset or connectivity status information for a connected edge asset.

Aspect 170. The apparatus of Aspect 169, wherein the connectivity status information is indicative of a local edge network connectivity status between the connected edge asset and a corresponding edge compute unit of the plurality of edge compute units.

Aspect 171. The apparatus of Aspect 170, wherein the corresponding edge compute unit is associated with the connected edge asset and provides a local edge network for connectivity with the connected edge asset.

Aspect 172. The apparatus of any of Aspects 155 to 171, wherein the plurality of connected edge assets include one or more of: one or more satellite internet constellation transceiver units; one or more cameras; one or more local edge sensors; one or more deployable robotic units controllable by a respective edge compute unit of the plurality of edge compute units; one or more drone units controllable by a respective edge compute unit of the plurality of edge compute units; or one or more vehicles associated with a respective edge compute unit of the plurality of edge compute units; and wherein each connected edge asset of the plurality of edge assets is communicatively coupled with an edge compute unit of the plurality of edge compute units.

Aspect 173. The apparatus of any of Aspects 155 to 172, wherein: the one or more user configuration inputs are indicative of an updated network connectivity configuration applicable to at least a portion of the selected subset of the fleet of edge devices; the updated network connectivity configuration corresponds to a configuration of redundant internet backhaul links between the fleet of edge devices and the cloud computing environment associated with the remote fleet management GUI; and the redundant internet backhaul links include satellite internet constellation internet backhaul links, 4G or 5G cellular internet backhaul links, and fiber optic internet backhaul links.

Aspect 174. The apparatus of Aspect 173, wherein the updated network connectivity configuration is indicative of one or more updated network virtualization parameters for network virtualization across at least the fiber optic internet backhaul links and the satellite internet constellation internet backhaul links.

Aspect 175. A method comprising operations according to any of Aspects 155 to 174.

Aspect 176. A non-transitory computer-readable storage medium having stored thereon instructions which, when executed by one or more processors, cause the one or more processors to perform any of the operations of Aspects 155 to 174.

What is claimed is:
1. A method comprising:
receiving monitoring information from a respective containerized edge compute unit of a plurality of containerized edge compute units included within a fleet of edge devices, wherein the monitoring information is indicative of: local telemetry information corresponding to an edge deployment environment of the respective containerized edge compute unit, and inference performance information associated with a configured machine learning (ML) or artificial intelligence (AI) inference workload implemented locally within the edge deployment environment by the respective containerized edge compute unit;

displaying, using a remote fleet management graphical user interface (GUI): at least a portion of the monitoring information from the respective containerized edge compute unit, and additional monitoring information corresponding to a selected subset of the fleet of edge devices, wherein the selected subset is determined based on one or more user selection inputs to the remote fleet management GUI, and wherein the selected subset includes the respective containerized edge compute unit;

receiving, using the remote fleet management GUI, one or more user configuration inputs indicative of an updated configuration for the configured ML or AI inference workload implemented by the containerized edge compute unit, wherein: the configured ML or AI inference workload corresponds to a pre-trained ML or AI model deployed on the respective edge compute unit, and the updated configuration corresponds to a request to finetune the pre-trained ML or AI model; and transmitting, from a cloud computing environment associated with the remote fleet management GUI, control information corresponding to the updated configuration, the control information obtained based on the one or more user configuration inputs and comprising model finetuning information generated responsive to the request, wherein the control information is transmitted to at least the respective containerized edge compute unit of the selected subset thereby causing the respective containerized edge compute unit of the selected subset to apply the control information to update the configured ML or AI inference workload.

2. The method of claim 1, wherein:
the one or more user selection inputs are indicative of the edge deployment environment associated with the respective containerized edge compute unit, the edge deployment environment included within one or more edge deployment locations associated with the fleet of edge devices.

3. The method of claim 2, wherein each respective edge deployment location of the one or more edge deployment locations includes:
an edge compute unit of the plurality of containerized edge compute units included within the fleet; and
a satellite internet constellation transceiver configured to provide internet backhaul communications between the respective edge deployment location and the cloud computing environment associated with the remote fleet management GUI.

4. The method of claim 3, wherein:
the selected subset of the fleet of edge devices comprises containerized edge compute units deployed locally within the same edge deployment environment as the respective containerized edge compute unit; and
the selected subset further includes respective connected edge assets deployed at locally within the same edge deployment environment and associated with at least one containerized edge compute unit of the selected subset.

5. The method of claim 1, further comprising:
receiving, using the remote fleet management GUI, the one or more user selection inputs;
determining a first filtered subset of the plurality of containerized edge compute units and a second filtered subset of a plurality of connected edge assets included within the fleet of edge devices, the first filtered subset and the second filtered subset based on filtering selection information included in the one or more user selection inputs; and
outputting for display, the at least a portion of the monitoring information from the respective containerized edge compute unit and the additional monitoring information corresponding to the first filtered subset of containerized edge compute units and the second filtered subset of connected edge assets.

6. The method of claim 1, further comprising:
receiving, using the remote fleet management GUI, the one or more user selection inputs, each respective user selection input of the one or more user selection inputs indicative of a filtering selection corresponding to a respective dimension of the monitoring information and the status information for the fleet of edge devices; and
updating a display output of the remote fleet management GUI based on the filtering selection indicated by each respective user selection input.

7. The method of claim 1, wherein the remote fleet management GUI comprises a single pane of glass interface corresponding to the monitoring information and the additional monitoring information for the containerized edge compute units and the selected subset of the fleet of edge devices.

8. The method of claim 7, wherein the single pane of glass interface includes one or more user interface input elements for receiving the one or more user configuration inputs.

9. The method of claim 1, wherein one or more of the remote fleet management GUI or the cloud computing environment associated with the remote fleet management GUI corresponds to a plurality of user accounts uniquely associated with and provisioned for access to the monitoring information or the additional monitoring information corresponding to the fleet of edge devices.

10. The method of claim 1, wherein the fleet of edge devices is associated with a plurality of different edge deployment locations, each edge deployment location associated with a respective subset of the plurality of containerized edge compute units and a respective second subset of a plurality of connected edge assets.

11. The method of claim 1, wherein the monitoring information includes a plurality of environmental sensor data streams corresponding to an internal environment of the respective containerized edge compute unit.

12. The method of claim 11, wherein the respective containerized edge compute unit comprises a containerized edge data center unit including self-contained storage hardware, computational hardware, and connectivity hardware.

13. The method of claim 12, wherein:
the plurality of environmental sensor data streams correspond to an internal environment of the containerized edge data center unit; and
the monitoring information further includes utilization information or health status information for one or more of the self-contained storage hardware, computational hardware, or connectivity hardware of the containerized edge data center unit.

14. The method of claim 13, further comprising receiving respective status information corresponding to a plurality of connected edge assets included within the fleet of edge devices, based on:

receiving, from a first containerized edge compute unit of the plurality of containerized edge compute units, respective status information corresponding to a first subset of the plurality of connected edge assets, wherein the first subset of connected edge assets is associated with the first containerized edge compute unit and a same first edge location as the first containerized edge compute unit; and receiving, from a second containerized edge compute unit of the plurality of containerized edge compute units, respective status information corresponding to a second subset of the plurality of connected edge assets, wherein the second subset of connected edge assets is associated with the second containerized edge compute unit and a same second edge location as the second containerized edge compute unit.

15. The method of claim 14, wherein the respective status information corresponding to the plurality of connected edge assets is indicative of one or more of health status information for a connected edge asset or connectivity status information for a connected edge asset.

16. The method of claim 15, wherein the connectivity status information is indicative of a local edge network connectivity status between the connected edge asset and a corresponding containerized edge compute unit of the plurality of containerized edge compute units.

17. The method of claim 16, wherein the corresponding containerized edge compute unit is associated with the connected edge asset and provides a local edge network for connectivity with the connected edge asset.

18. The method of claim 1, wherein the plurality of connected edge assets include one or more of:

one or more satellite internet constellation transceiver units;

one or more cameras;

one or more local edge sensors;

one or more deployable robotic units controllable by a respective containerized edge compute unit of the plurality of containerized edge compute units;

one or more drone units controllable by a respective containerized edge compute unit of the plurality of containerized edge compute units; or one or more vehicles associated with a respective containerized edge compute unit of the plurality of containerized edge compute units;

and wherein each connected edge asset of the plurality of edge assets is communicatively coupled with containerized edge compute unit of the plurality of containerized edge compute units.

19. The method of claim 1, wherein:

the one or more user configuration inputs are indicative of an updated network connectivity configuration applicable to at least a portion of the selected subset of the fleet of edge devices;

the updated network connectivity configuration corresponds to a configuration of redundant internet backhaul links between the fleet of edge devices and the cloud computing environment associated with the remote fleet management GUI; and the redundant internet backhaul links include satellite internet constellation internet backhaul links, 4G or 5G cellular internet backhaul links, and fiber optic internet backhaul links.

20. The method of claim 19, wherein the updated network connectivity configuration is indicative of one or more updated network virtualization parameters for network virtualization across at least the fiber optic internet backhaul links and the satellite internet constellation internet backhaul links.

* * * * *